United States Patent
Jeon et al.

(10) Patent No.: US 12,010,634 B2
(45) Date of Patent: Jun. 11, 2024

(54) POWER CONTROL FOR MESSAGE TRANSMISSIONS

(71) Applicant: Comcast Cable Communications, LLC, Philadelphia, PA (US)

(72) Inventors: Hyoungsuk Jeon, Centreville, VA (US); Esmael Hejazi Dinan, McLean, VA (US); Hua Zhou, Vienna, VA (US); Kai Xu, Herndon, VA (US); Alireza Babaei, Fairfax, VA (US); Kyungmin Park, Vienna, VA (US); Ali Cagatay Cirik, Chantilly, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/730,918

(22) Filed: Apr. 27, 2022

(65) Prior Publication Data

US 2022/0264479 A1    Aug. 18, 2022

Related U.S. Application Data

(63) Continuation of application No. 17/039,414, filed on Sep. 30, 2020, which is a continuation of application
(Continued)

(51) Int. Cl.
*H04W 52/36* (2009.01)
*H04W 52/22* (2009.01)
(Continued)

(52) U.S. Cl.
CPC ......... *H04W 52/36* (2013.01); *H04W 52/228* (2013.01); *H04W 52/48* (2013.01); *H04W 74/0866* (2013.01)

(58) Field of Classification Search
CPC ... H04W 52/36; H04W 52/228; H04W 52/48; H04W 74/0866; H04W 52/50
See application file for complete search history.

(56) References Cited

U.S. PATENT DOCUMENTS 9,674,727 B2  6/2017  Damnjanovic et al.
9,894,686 B2  2/2018  Di Girolamo et al.
(Continued)

FOREIGN PATENT DOCUMENTS

EP   3525516 A1   8/2019
WO   2017136706 A1   8/2017
(Continued)

OTHER PUBLICATIONS

R2-1814940 3GPP TSG RAN WG2 Meeting #103bis, Chengdu, China, Oct. 8-12, 2018, Source: Nokia, Nokia Shanghai Bell, Title: Correction to preamble power ramping.
(Continued)

*Primary Examiner* — Shaima Q Aminzay
(74) *Attorney, Agent, or Firm* — Banner & Witcoff, Ltd.

(57) ABSTRACT

A wireless device may use power ramping for transmissions of message preambles and/or transport blocks. A first ramped transmission power may be used to transmit a preamble of a message, and a second ramped transmission power may be used to transmit a transport block of the message. Channel access procedures may be used to determine clear channel or busy channel for transmissions.

30 Claims, 46 Drawing Sheets

Related U.S. Application Data

No. 16/586,515, filed on Sep. 27, 2019, now Pat. No. 10,856,239.

(60) Provisional application No. 62/737,685, filed on Sep. 27, 2018.

(51) Int. Cl.
*H04W 52/48* (2009.01)
*H04W 74/08* (2009.01)

(56) References Cited

U.S. PATENT DOCUMENTS

| | | | |
|---|---|---|---|
| 10,856,239 B2 * | 12/2020 | Jeon | H04W 52/36 |
| 11,363,540 B2 * | 6/2022 | Jeon | H04W 52/228 |
| 2011/0243278 A1 | 10/2011 | Cheng | |
| 2013/0195025 A1 | 8/2013 | Chatterjee et al. | |
| 2014/0044083 A1 | 2/2014 | Kim et al. | |
| 2015/0189574 A1 | 7/2015 | Ng et al. | |
| 2015/0327107 A1 | 11/2015 | Kim et al. | |
| 2015/0381255 A1 | 12/2015 | Kuo | |
| 2018/0020503 A1 | 1/2018 | Deenoo et al. | |
| 2018/0034525 A1 | 2/2018 | Park et al. | |
| 2018/0115357 A1 | 4/2018 | Park et al. | |
| 2018/0124687 A1 | 5/2018 | Park et al. | |
| 2018/0124822 A1 | 5/2018 | Wang et al. | |
| 2018/0132266 A1 | 5/2018 | Chen et al. | |
| 2018/0139787 A1 | 5/2018 | Islam et al. | |
| 2018/0176937 A1 | 6/2018 | Chen et al. | |
| 2018/0205516 A1 | 7/2018 | Jung et al. | |
| 2018/0227805 A1 | 8/2018 | Jang et al. | |
| 2018/0242307 A1 | 8/2018 | Chen et al. | |
| 2018/0249460 A1 | 8/2018 | Seo et al. | |
| 2018/0270713 A1 | 9/2018 | Park et al. | |
| 2018/0278383 A1 | 9/2018 | Kim et al. | |
| 2019/0037577 A1 | 1/2019 | Sun et al. | |
| 2019/0104477 A1 | 4/2019 | MolavianJazi et al. | |
| 2019/0132882 A1 | 5/2019 | Li et al. | |
| 2019/0141677 A1 | 5/2019 | Harrison et al. | |
| 2019/0387480 A1 | 12/2019 | Dinan | |

FOREIGN PATENT DOCUMENTS

| | | | |
|---|---|---|---|
| WO | 2017161590 A1 | 9/2017 |
| WO | 2017196243 A1 | 11/2017 |
| WO | 2018029382 A1 | 2/2018 |
| WO | 2018084544 A1 | 5/2018 |
| WO | 2018144155 A1 | 8/2018 |

OTHER PUBLICATIONS

R2-1815281 3GPP TSG RAN WG2 Meeting #103bis, Chengdu, China, Oct. 8-12, 2018, Source: LG Electronics Inc., Title: Remaining issue with Power Ramping Counter.

RP-181463 3GPP TSG RAN Meeting #80, La Jolla, USA, Jun. 11-14, 2018, Source: CATT, CMCC, vivo, CATR, Qualcomm, MediaTek, Title: New SID: Study on UE Power Saving in NR.

R1-1709016 3GPP TSG RAN WG1 Meeting #89, Hangzhou, China, May 15-19, 2017, Source: InterDigital Inc., Title: Control Channels Monitoring with Multiple CORESETs.

R1-1714117 3GPP TSG RAN WG1 Meeting #90, Prague, Czech Republic, Aug. 21-25, 2017, Source: InterDigital Inc., Title: Remaining details of BWP.

R2-1802001 3GPP TSG RAN WG2 Meeting #101, Athens, Greece, Feb. 26-Mar. 2, 2018, Source: vivo, Title: Restart Scell inactive timer due to configuration grant.

R1-142925 3GPP TSG RAN WG1 Meeting #78, Dresden, Germany, Aug. 18-22, 2014, Source: Fujitsu, Title: Discussion of on/off transitions and related procedures.

Oct. 18, 2019—European Extended Search Report—EP 19187310.8.

Jan. 17, 2020—European Extended Search Report—EP 19198650.4.

Feb. 4, 2020—European Extended Search Report—EP 19200133.7.

R1-164988 3GPP TSG RAN WG1 Metting #85, Nanjing, China, May 23-27, 2016, Source: Nokia, Alcatel-Lucent Shanghai Bell, Title: Discussion on PRACH design for eLAA.

Oct. 29, 2020, European Office Action, EP 19200133.7.

R1-1718337 3GPP TSG RAN WG1 Meeting #90bis, Prague, Czech Republic, Oct. 9-13, 2017, Source: MediaTek, Inc., Title: Remaining details for CSI reporting.

R1-1718432 3GPP TSG RAN WG1 Meeting #90bis, Prague, Czech Republic, Oct. 9-13, 2017, Source: Ericsson, Title: On remaining details of CSI reporting.

R1-1718442 3GPP TSG RAN WG1 Meeting #90bis, Prague, Czech Republic, Oct. 9-13, 2017, Source: Ericsson, Title: On semi-persistent CSI reporting on PUSCH.

R1-1718443 3GPP TSG RAN WG1 Meeting #90bis, Prague, Czech Republic, Oct. 9-13, 2017, Source: Ericsson, Title: On aperiodic and semi-persistent CSI reporting on PUCCH.

R1-1718481 3GPP TSG RAN WG1 Meeting #90bis, Prague, Czech Republic, Oct. 9-13, 2017, Source: InterDigital, Inc., Title: Remaining issues on CSI reporting.

R1-1718510 3GPP TSG RAN WG1 Meeting #90bis, Prague, Czech Republic, Oct. 9-13, 2017, Source: Nokia, Nokia Shanghai Bell, Title: Remaining details on CSI reporting for Type II and Type I codebook.

R1-1718540 3GPP TSG RAN WG1 Meeting #90bis, Prague, Czech Republic, Oct. 9-13, 2017, Source: Qualcomm Incorporated, Title: On Remaining Issues of CSI Reporting.

R1-1718910 3GPP TSG RAN WG1 Meeting #90bis, Prague, Czech Republic, Oct. 9-13, 2017, Source: ZTE, Sanechips, Title: Summary of CSI measurement.

R1-1719142 3GPP TSG RAN WG1 Meeting #90bis, Prague, Czech Republic, Oct. 9-13, 2017, Source: Ericsson, Title: Offline session notes CSI reporting (AI 7.2.2.2).

R1-1719425 3GPP TSG RAN WG1 Meeting #91, Reno, USA, Nov. 27-Dec. 1, 2017, Source: Huawei, HiSilicon, Title: Remaining issues for CSI reporting.

R1-1719434 3GPP TSG RAN WG1 Meeting #91, Reno, USA, Nov. 27-Dec. 1, 2017, Source: Huawei, HiSilicon, Title: Remaining details of UL power control design.

R1-1719435 3GPP TSG RAN WG1 Meeting #91, Reno, USA, Nov. 27-Dec. 1, 2017, Source: Huawei, HiSilicon, Title: Designs on power headroom calculation and reporting.

R1-1719488 3GPP TSG RAN WG1 Meeting #91, Reno, USA, Nov. 27-Dec. 1, 2017, Source: Mitsubishi Electric, Title: UL transmission power control.

R1-1719532 3GPP TSG RAN WG1 Meeting #91, Reno, USA, Nov. 27-Dec. 1, 2017, Source: ZTE, Sanechips, Title: Remaining details on CSI reporting.

R1-1719547 3GPP TSG RAN WG1 Meeting #91, Reno, USA, Nov. 27-Dec. 1, 2017, Source: ZTE, Sanechips, Title: On NR Power Control Framework.

R1-1719564 3GPP TSG RAN WG1 Meeting #91, Reno, USA, Nov. 27-Dec. 1, 2017, Source: MediaTek Inc., Title: Remaining details for CSI reporting.

R1-1719650 3GPP TSG RAN WG1 Meeting #91, Reno, USA, Nov. 27-Dec. 1, 2017, Source: AT&T, Title: Remaining details on bandwidth parts.

R1-1719651 3GPP TSG RAN WG1 Meeting #91, Reno, USA, Nov. 27-Dec. 1, 2017, Source: AT&T, Title: Remaining details on carrier aggregation.

R1-1719653 3GPP TSG RAN WG1 Meeting #91, Reno, USA, Nov. 27-Dec. 1, 2017, Source: AT&T, Title: Dynamic Power Control and Coverage Impact.

R1-1719696 3GPP TSG RAN WG1 Meeting #91, Reno, USA, Nov. 27-Dec. 1, 2017, Source: Spreadtrum Communications, Title: Remaining issues on CSI feedback.

R1-1719768 3GPP TSG RAN WG1 Meeting #91, Reno, USA, Nov. 27-Dec. 1, 2017, Source: vivo, Title: Remaining details on CSI reporting.

(56) References Cited

OTHER PUBLICATIONS

R1-1719779 3GPP TSG RAN WG1 Meeting #91, Reno, USA, Nov. 27-Dec. 1, 2017, Source: vivo, Title: Remaining issues on NR UL power control.
R1-1719820 3GPP TSG RAN WG1 Meeting #91, Reno, USA, Nov. 27-Dec. 1, 2017, Source: Huawei, HiSilicon, Title: Power control design for SUL and LNC.
R1-1719906 3GPP TSG RAN WG1 Meeting #91, Reno, USA, Nov. 27-Dec. 1, 2017, Source: LG Electronics, Title: Discussions on CSI reporting.
R1-1719932 3GPP TSG RAN WG1 Meeting #91, Reno, USA, Nov. 27-Dec. 1, 2017, Source: LG Electronics, Title: Remaining issues on UL data transmission procedure.
R1-1719944 3GPP TSG RAN WG1 Meeting #91, Reno, USA, Nov. 27-Dec. 1, 2017, Source: LG Electronics, Title: Discussion on UL power control for NR non-CA case.
R1-1719968 3GPP TSG RAN WG1 Meeting #91, Reno, USA, Nov. 27-Dec. 1, 2017, Source: OPPO, Title: On uplink power control for NR.
R1-1719989 3GPP TSG RAN WG1 Meeting #91, Reno, USA, Nov. 27-Dec. 1, 2017, Source: OPPO, Title: Discussion on Remaining Issues for LTE-NR Dual Connectivity.
R1-1720070 3GPP TSG RAN WG1 Meeting #91, Reno, USA, Nov. 27-Dec. 1, 2017, Source: Intel Corporation, Title: Remaining issues on CSI reporting.
R1-1720104 3GPP TSG RAN WG1 Meeting #91, Reno, USA, Nov. 27-Dec. 1, 2017, Source: Intel Corporation, Title: Remaining Details On UL Power Control Framework.
R1-1720105 3GPP TSG RAN WG1 Meeting #91, Reno, USA, Nov. 27-Dec. 1, 2017, Source: Intel Corporation, Title: Remaining aspects on power sharing between LTE and NR.
R1-1720181 3GPP TSG RAN WG1 Meeting #91, Reno, USA, Nov. 27-Dec. 1, 2017, Source: CATT, Title: Remaining details on CSI reporting.
R1-1720215 3GPP TSG RAN WG1 Meeting #91, Reno, USA, Nov. 27-Dec. 1, 2017, Source: CATT, Title: Remaining Aspects of NR Power Control.
R1-1720289 3GPP TSG RAN WG1 Meeting #91, Reno, USA, Nov. 27-Dec. 1, 2017, Source: Samsung, Title: CSI reporting and UCI multiplexing.
R1-1720361 3GPP TSG RAN WG1 Meeting #91, Reno, USA, Nov. 27-Dec. 1, 2017, Source: Samsung, Title: Remaining Issues on UL Power Control.
R1-1720363 3GPP TSG RAN WG1 Meeting #91, Reno, USA, Nov. 27-Dec. 1, 2017, Source: Samsung, Title: On PHR Requirements and Calculation.
R1-1720371 3GPP TSG RAN WG1 Meeting #91, Reno, USA, Nov. 27-Dec. 1, 2017, Source: Panasonic, Title: Discussion on NR power control framework.
R1-1720560 3GPP TSG RAN WG1 Meeting #91, Reno, USA, Nov. 27-Dec. 1, 2017, Source: InterDigital, Inc., Title: Power Control for NR DC.
R1-1720595 3GPP TSG RAN WG1 Meeting #91, Reno, USA, Nov. 27-Dec. 1, 2017, Source: CMCC, Title: Power Control for NR DC.
R1-1720612 3GPP TSG RAN WG1 Meeting #91, Reno, USA, Nov. 27-Dec. 1, 2017, Source: Sharp, APT, Title: Power Control for NR DC.
R1-1720628 3GPP TSG RAN WG1 Meeting #91, Reno, USA, Nov. 27-Dec. 1, 2017, Source: InterDigital, Inc., Title: Remaining issues on CSI reporting.
R1-1720646 3GPP TSG RAN WG1 Meeting #91, Reno, USA, Nov. 27-Dec. 1, 2017, Source: HTC, Title: Remaining issues on UL power control for NR.
R1-1720661 3GPP TSG RAN WG1 Meeting #91, Reno, USA, Nov. 27-Dec. 1, 2017, Source: Qualcomm Incorporated, Title: Remaining Details on CSI Reporting.
R1-1720706 3GPP TSG RAN WG1 Meeting #91, Reno, USA, Nov. 27-Dec. 1, 2017, Source: Qualcomm Incorporated, Title: Remaining Issues on Power Control for NR.
R1-1720711 3GPP TSG RAN WG1 Meeting #91, Reno, USA, Nov. 27-Dec. 1, 2017, Source: InterDigital, Inc., Title: Consideration for UL Power Control Framework.
R1-1720734 3GPP TSG RAN WG1 Meeting #91, Reno, USA, Nov. 27-Dec. 1, 2017, Source: Ericsson, Title: On remaining details of CSI reporting.
R1-1720746 3GPP TSG RAN WG1 Meeting #91, Reno, USA, Nov. 27-Dec. 1, 2017, Source: Ericsson, Title: On semi-persistent CSI reporting on PUSCH.
R1-1720802 3GPP TSG RAN WG1 Meeting #91, Reno, USA, Nov. 27-Dec. 1, 2017, Source: NTT Docomo, Inc., Title: Remaining Issues on CSI reporting.
R1-1720832 3GPP TSG RAN WG1 Meeting #91, Reno, USA, Nov. 27-Dec. 1, 2017, Source: NTT Docomo, Inc., Title: Remaining details on LTE-NR power sharing.
R1-1720889 3GPP TSG RAN WG1 Meeting #91, Reno, USA, Nov. 27-Dec. 1, 2017, Source: Nokia, Nokia Shanghai Bell, Title: Remaining details on CSI reporting.
Oct. 21, 2022—EP Search Report—EP App. No. 22193492.0.
May 13, 2019—European Search Report—19151142.7.
Huawei et al.: "Independent and joint control of CSI-RS transmission and CSI reporting for NR MIMO", Jan. 16, 2017.
Huawei Hisilicon: "Independent and joint control of CSI-RS transmission and CSI reporting for NR MIMO", Nov. 13, 2016.
Mar. 25, 2019—European Search Report—EP 19150331.7.
Jan. 1, 2018—3GPP Standard; 3GPP TS 38.331—3rd Generation Partnership Project; Technical Specification Gorup Radio Access Network; NR; Radio Resource Control (RRC) Protocol specific (Release 15).
Sep. 17, 2017—3GPP TSG-RAN WG1 NR Ad Hoc #3—Ericsson "On semi-persistent CSI reporting on PUSCH".
3GPP TS 36.211 V14.4.0 (Sep. 2017), Technical Specification, 3rd Generation Partnership Project; Technical Specification Group Radio Access Network; Evolved Universal Terrestrial Radio Access (E-UTRA); Physical Channels and Modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.212 V14.4.0 (Sep. 2017), Technical Specification, 3rd Generation Partnership Project; Technical Specification Group Radio Access Network; Evolved Universal Terrestrial Radio Access (E-UTRA); Multiplexing and Channel Coding (Release 14).
3GPP TS 36.213 V14.4.0 (Sep. 2017), Technical Specification, 3rd Generation Partnership Project; Technical Specification Group Radio Access Network; Evolved Universal Terrestrial Radio Access (E-UTRA); Physical Layer Procedures (Release 14).
3GPP TS 36.300 V14.4.0 (Sep. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 36.321 V14.4.0 (Sep. 2017), Technical Specification, 3rd Generation Partnership Project; Technical Specification Group Radio Access Network; Evolved Universal Terrestrial Radio Access (E-UTRA); Medium Access Control (MAC) protocol Specification (Release 14).
3GPP TS 38.212 V15.0.0 (Dec. 2017), Technical Specification, 3rd Generation Partnership Project; Technical Specification Group Radio Access Network; NT; Multiplexing and Channel Coding (Release 15).
3GPP TS 38.213 V2.0.0 (Dec. 2017), Technical Specification, 3rd Generation Partnership Project; Technical Specification Group Radio Access Network; NR; Physical Layer Procedures for Control (Release 15).
3GPP TS 38.300 V2.0.0 (Dec. 2017), Technical Specification, 3rd Generation Partnership Project; Technical Specification Group Radio Access Network; NR; NR and NG-RAN Overall Description; Stage 2 (Release 15).
3GPP TS 38.321 V2.0.0 (Dec. 2017), Technical Specification, 3rd Generation Partnership Project; Technical Specification Group Radio Access Network; NR; Medium Access Control (MAC) Protocol Specification (Release 15).

(56) References Cited

OTHER PUBLICATIONS

3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TSG RAN WG1 Meeting #90bis, Prague, Czech Republic, Oct. 9-13, 2017, Title: RAN1 Chairman's Notes.
3GPP TS 38.213 V1.2.1 (Dec. 2017), Technical Specification, 3rd Generation Partnership Project; Technical Specification Group Radio Access Network; NR; Physical Layer Procedures for Control (Release 15).
3GPP TS 38.214 V1.2.1 (Dec. 2017), Technical Specification, 3rd Generation Partnership Project; Technical Specification Group Radio Access Network; NR; Physical Layer Procedures for Data (Release 15).
R2-180xxxx 3GPP TSG RAN WG2 Meeting #101, Sanya, China, Apr. 16-20, 2018, Source: Nokia, Nokia Shanghai Bell, Title: Running MAC CR for euCA.
R1-1803571 3GPP TSG RAN WG1 Meeting #92bis, Sanya, China, Apr. 16-20, 2018, Source: MCC Support, Title: Final Report of 3GPP TSG RAN WG1 #92 v1.0.0.
R1-1721510 3GPP TSG RAN WG1 Meeting #91, Reno, USA, Nov. 27-Dec. 1, 2017, Source: NTT Docomo, Inc., Title: Offline summary for AI 7.3.3.4 UL data transmission procedure.
R1-1709907 3GPP TSG-RAN WG1 NR Ad Hoc, Qingdao, China, Jun. 27-30, 2017, Source: Xinwei, Title: Discussion on Beam Failure Recovery.
R1-1709929 3GPP TSG-RAN WG1 NR Ad Hoc, Qingdao, China, Jun. 27-30, 2017, Source: Huawei, HiSilicon, Title: General views on beam failure recovery.
R1-1710058 3GPP TSG-RAN WG1 NR Ad Hoc, Qingdao, China, Jun. 27-30, 2017, Source: CATT, Title: Considerations on DL beam failure and recovery.
R1-1710283 3GPP TSG-RAN WG1 NR Ad Hoc, Qingdao, China, Jun. 27-30, 2017, Source: LG Electronics, Title: Discussion on beam failure recovery.
R1-1710400 3GPP TSG-RAN WG1 NR Ad Hoc, Qingdao, China, Jun. 27-30, 2017, Source: vivo, Title: Beam failure recovery procedure.
R1-1710596 3GPP TSG-RAN WG1 NR Ad Hoc, Qingdao, China, Jun. 27-30, 2017, Source: Lenovo, Motorola Mobility, Title: Discussion of beam recovery procedure.
R1-1710810 3GPP TSG-RAN WG1 NR Ad Hoc, Qingdao, China, Jun. 27-30, 2017, Source: MediaTek Inc., Title: Mechanism for flexible beam failure recovery.
R1-1710926 3GPP TSG-RAN WG1 NR Ad Hoc, Qingdao, China, Jun. 27-30, 2017, Source: InterDigital, Inc., Title: On Remaining Details of Beam Failure Recovery.
R1-1711017 3GPP TSG-RAN WG1 NR Ad Hoc, Qingdao, China, Jun. 27-30, 2017, Source: Ericsson, Title: Mechanism to recover from beam failure.
R1-1711291 3GPP TSG-RAN WG1 NR Ad Hoc, Qingdao, China, Jun. 27-30, 2017, Source: Nokia, Alcatel-Lucent Shanghai Bell, Title: Beam Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1715439 3GPP TSG RAN WG1 Meeting NR Ad Hoc, Nagoya, Japan, Sep. 18-21, 2017, Source: ZTE, Sanechips, Title: Remaining details on CSI reporting.
R1-1715858 3GPP TSG RAN WG1 Meeting NR Ad Hoc, Nagoya, Japan, Sep. 18-21, 2017, Source: LG Electronics, Title: Discussions on CSI reporting.
R1-1715939 3GPP TSG RAN WG1 Meeting NR Ad Hoc, Nagoya, Japan, Sep. 18-21, 2017, Source: Samsung, Title: CSI reporting and UCI multiplexing.
R1-1716349 3GPP TSG RAN WG1 Meeting NR Ad Hoc, Nagoya, Japan, Sep. 18-21, 2017, Source: Ericsson, Title: On CSI reporting.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1716901 3GPP TSG RAN WG1 Meeting NR Ad Hoc, Nagoya, Japan, Sep. 18-21, 2017, Source: Samsung, Ericsson, Huawei, HiSilicon, ZTE, Sanechips, Mediatek, NTT Docomo, Nokia, Nokia Shanghai Bell, KDDI, Vodafone, Cewit, IITH, IITM, Tejas Networks, Verizon, Deutsche Telekom, Softbank, CHTTL, NEC, WILUS, Sharp, China Unicom, ITL, KRRI, CMCC, ASTRI, KT Corporation, BT, Sprint, LG Electronics, AT&T, Title: WF for Open Issues on CSI Reporting.
R1-1717300 3GPP TSG RAN WG1 Meeting #90bis, Prague, Czech Republic, Oct. 9-13, 2017, Source: Huawei, HiSilicon, Title: Details of CSI reporting on PUCCH/PUSCH.
R1-1717367 3GPP TSG RAN WG1 Meeting #90bis, Prague, Czech Republic, Oct. 9-13, 2017, Source: Intel Corporation, Title: Remaining issues on CSI reporting.
R1-1717423 3GPP TSG RAN WG1 Meeting #90bis, Prague, Czech Republic, Oct. 9-13, 2017, Source: ZTE, Sanechips, Title: Remaining details on CSI reporting.
R1-1717471 3GPP TSG RAN WG1 Meeting #90bis, Prague, Czech Republic, Oct. 9-13, 2017, Source: vivo, Title: Discussion on CSI reporting.
R1-1717604 3GPP TSG RAN WG1 Meeting #90bis, Prague, Czech Republic, Oct. 9-13, 2017, Source: Samsung, Title: CSI reporting and UCI multiplexing.
R1-1717811 3GPP TSG RAN WG1 Meeting #90bis, Prague, Czech Republic, Oct. 9-13, 2017, Source: CATT, Title: Remaining issues on CSI reporting.
R1-1717940 3GPP TSG RAN WG1 Meeting #90bis, Prague, Czech Republic, Oct. 9-13, 2017, Source: LG Electronics, Title: Discussions on CSI reporting.
R1-1718191 3GPP TSG RAN WG1 Meeting #90bis, Prague, Czech Republic, Oct. 9-13, 2017, Source: NTT Docomo, Inc., Title: Remaining Issues on Feedback Design for CSI Type I and Type II.
R1-1808612 3GPP TSG RAN WG1 Meeting #94, Gothenburg, Sweden, Aug. 20-24, 2018, Source: Apple Inc., Title: On DL Signals and Channels for NR-U.
R1-1808683 3GPP TSG RAN WG1 Meeting #94, Gothenburg, Sweden, Aug. 20-24, 2018, Source: Intel Corporation, Title: Enhancements to NR DL signals and channels for unlicensed operation.
R1-1809477 3GPP TSG RAN WG1 Meeting #94, Gothenburg, Sweden, Aug. 20-24, 2018, Source: Qualcomm Incorporated, Title: DL signals and channels for NR-U.
R1-1810154 3GPP TSG RAN WG1 Meeting #94bis, Chengdu, China, Oct. 8-12, 2018, Source: Huawei, HiSilicon, Title: Power consumption reduction based on time/frequency/antenna adaptation.
R1-1810338 3GPP TSG RAN WG1 Meeting #94bis, Chengdu, China, Oct. 8-12, 2018, Source: ZTE, Title: Consideration on UE adaptation to the traffic and UE power consumption characteristics.
R1-1810413 3GPP TSG RAN WG1 Meeting #94bis, Chengdu, China, Oct. 8-12, 2018, Source: vivo, Title: Techniques on UE adaptation to the traffic and UE power consumption characteristics.
R1-1810448 3GPP TSG RAN WG1 Meeting #94bis, Chengdu, China, Oct. 8-12, 2018, Source: MediaTek Inc., Title: UE adaptation to the traffic and UE power consumption characteristics.
R1-1810468 3GPP TSG RAN WG1 Meeting #94bis, Chengdu, China, Oct. 8-12, 2018, Source: Panasonic, Title: Discussion on UE traffic adaptation and power consumption characteristics.
R1-1810562 3GPP TSG RAN WG1 Meeting #94bis, Chengdu, China, Oct. 8-12, 2018, Source: CATT, Title: UE Power Saving Scheme with Multi-dimensional Adaptation.
R1-1810795 3GPP TSG RAN WG1 Meeting #94bis, Chengdu, China, Oct. 8-12, 2018, Source: Intel Corporation, Title: UE Adaptation to the traffic and UE power consumption characteristics.

(56) References Cited

OTHER PUBLICATIONS

R1-1810892 3GPP TSG RAN WG1 Meeting #94bis, Chengdu, China, Oct. 8-12, 2018, Source: Samsung, Title: Discussion on UE adaptation schemes.
R1-1811050 3GPP TSG RAN WG1 Meeting #94bis, Chengdu, China, Oct. 8-12, 2018, Source: CMCC, Title: Considerations for UE power saving.
R1-1811127 3GPP TSG RAN WG1 Meeting #94bis, Chengdu, China, Oct. 8-12, 2018, Source: Apple Inc., Title: Network-indication based Approaches for UE Power Saving.
R1-1812232 3GPP TSG RAN WG1 Meeting #95, Spokane, USA, Nov. 12-16, 2018, Source: Huawei, HiSilicon, Title: Design of power saving signal.
R1-1812331 3GPP TSG RAN WG1 Meeting #95, Spokane, USA, Nov. 12-16, 2018, Source: vivo, Title: Discussion on triggering adaptation of UE power consumption characteristics.
R1-1812362 3GPP TSG RAN WG1 Meeting #95, Spokane, USA, Nov. 12-16, 2018, Source: MediaTek Inc., Title: Triggering adaptation for UE power saving.
R1-1812422 3GPP TSG RAN WG1 Meeting #95, Spokane, USA, Nov. 12-16, 2018, Source: ZTE, Title: Considerations on triggering for UE power saving.
R1-1812514 3GPP TSG RAN WG1 Meeting #95, Spokane, USA, Nov. 12-16, 2018, Source: Intel Corporation, Title: Triggering UE adaptation to power consumption characteristics.
R1-1812591 3GPP TSG RAN WG1 Meeting #95, Spokane, USA, Nov. 12-16, 2018, Source: LG Electronics, Title: Discussion on power saving for CA operation.
R1-1812642 3GPP TSG RAN WG1 Meeting #95, Spokane, USA, Nov. 12-16, 2018, Source: CATT, Title: UE Power saving schemes with power saving signal/channel/procedures.
R1-1812750 3GPP TSG RAN WG1 Meeting #95, Spokane, USA, Nov. 12-16, 2018, Source: SONY, Title: Conditions and procedures for adaptation of power consumption characteristics.
R1-1812825 3GPP TSG RAN WG1 Meeting #95, Spokane, USA, Nov. 12-16, 2018, Source: OPPO, Title: Triggering Adaptation of UE Power Consumption Characteristics.
R1-1812890 3GPP TSG RAN WG1 Meeting #95, Spokane, USA, Nov. 12-16, 2018, Source: CMCC, Title: Considerations on power saving signal design.
R1-1812926 3GPP TSG RAN WG1 Meeting #95, Spokane, USA, Nov. 12-16, 2018, Source: Apple Inc., Title: Power Saving Techniques based on Explicit Indication.
R1-1813012 3GPP TSG RAN WG1 Meeting #95, Spokane, USA, Nov. 12-16, 2018, Source: Samsung, Title: Triggering adaptation schemes.
R1-1813076 3GPP TSG RAN WG1 Meeting #95, Spokane, USA, Nov. 12-16, 2018, Source: Spreadtrum Communications, Title: Discussion on triggering adaptation for UE power saving.
R1-1813183 3GPP TSG RAN WG1 Meeting #95, Spokane, USA, Nov. 12-16, 2018, Source: Ericsson, Title: Triggers of NR UE power saving.
R1-1813244 3GPP TSG RAN WG1 Meeting #95, Spokane, USA, Nov. 12-16, 2018, Source: InterDigital, Inc., Title: Discussion on Triggering of Power Mode Adaptation.
R1-1813448 3GPP TSG RAN WG1 Meeting #95, Spokane, USA, Nov. 12-16, 2018, Source: Qualcomm Incorporated, Title: Triggering Adaptation of UE Power Consumption Characteristics.
R1-1813495 3GPP TSG RAN WG1 Meeting #95, Spokane, USA, Nov. 12-16, 2018, Source: Panasonic, Title: Discussion on UE traffic adaptation procedures.
R1-1813516 3GPP TSG RAN WG1 Meeting #95, Spokane, USA, Nov. 12-16, 2018, Source: ASUSTeK, Title: Triggering adaptation of UE power consumption.
R1-1813621 3GPP TSG RAN WG1 Meeting #95, Spokane, USA, Nov. 12-16, 2018, Source: Nokia, Nokia Shanghai Bell, Title: On UE Power Saving Triggering Mechanisms.
R1-1813625 3GPP TSG RAN WG1 Meeting #95, Spokane, USA, Nov. 12-16, 2018, Source: Convida Wireless, Title: Triggering Adaptation of UE Power Consumption Characteristics.
R2-1700019 3GPP TSG RAN WG2 NR Ad Hoc, Spokane, USA, Jan. 17-19, 2017, Source: Samsung, Title: Random Access in NR—Flexible UE Bandwidth Aspects.
R2-1700023 3GPP TSG RAN WG2 NR Ad Hoc, Spokane, USA, Jan. 17-19, 2017, Source: ASUSTeK, Title: Consideration on use cases of 2-step RACH procedure.
R2-1700024 3GPP TSG RAN WG2 NR Ad Hoc, Spokane, USA, Jan. 17-19, 2017, Source: ASUSTeK, Title: Consideration on fallback of 2-step RACH procedure.
R2-1700089 3GPP TSG RAN WG2 NR Ad Hoc, Spokane, USA, Jan. 17-19, 2017, Source: Huawei, HiSilicon, Title: Considerations on RACH procedure in NR.
R2-1700103 3GPP TSG RAN WG2 NR Ad Hoc, Spokane, USA, Jan. 17-19, 2017, Source: National Instruments, Title: Considerations on the Random-Access Procedure in Massive Mimo NR.
R2-1700137 3GPP TSG RAN WG2 NR Ad Hoc, Spokane, USA, Jan. 17-19, 2017, Source: SONY, Title: 2-step RACH to 4-step RACH fallback.
R2-1700155 3GPP TSG RAN WG2 NR Ad Hoc, Spokane, USA, Jan. 17-19, 2017, Source: ZTE, ZTE Microelectronics, Title: Consideration on the two-step RACH in NR.
R2-1700202 3GPP TSG RAN WG2 NR Ad Hoc, Spokane, USA, Jan. 17-19, 2017, Source: CATT, Title: Design principles for random access procedure in NR.
R2-1700203 3GPP TSG RAN WG2 NR Ad Hoc, Spokane, USA, Jan. 17-19, 2017, Source: CATT, Title: Random access procedure in NR.
R2-1700204 3GPP TSG RAN WG2 NR Ad Hoc, Spokane, USA, Jan. 17-19, 2017, Source: CATT, Title: Impact of NR physical layer design on RA.
R2-1700205 3GPP TSG RAN WG2 NR Ad Hoc, Spokane, USA, Jan. 17-19, 2017, Source: CATT, Title: Consideration on 2-step RA.
R2-1700237 3GPP TSG RAN WG2 NR Ad Hoc, Spokane, USA, Jan. 17-19, 2017, Source: InterDigital Communications, Title: 2-Step Random Access Procedure in NR.
R2-1700335 3GPP TSG RAN WG2 NR Ad Hoc, Spokane, USA, Jan. 17-19, 2017, Source: Intel Corporation, Title: Further considerations of random access in NR.
R2-1700355 3GPP TSG RAN WG2 NR Ad Hoc, Spokane, USA, Jan. 17-19, 2017, Source: ASUSTeK, Title: Discussion on latency of random access in NR.
R2-1700356 3GPP TSG RAN WG2 NR Ad Hoc, Spokane, USA, Jan. 17-19, 2017, Source: ASUSTeK, MediaTek Inc., Title: Consideration on use cases of 2-step RACH procedure.
R2-1700357 3GPP TSG RAN WG2 NR Ad Hoc, Spokane, USA, Jan. 17-19, 2017, Source: Samsung, Title: Consideration on 2-step RACH.
R2-1700619 3GPP TSG RAN WG2 NR Ad Hoc, Spokane, USA, Jan. 17-19, 2017, Source: NTT Docomo, Inc., Title: Remaining RAN2 aspects on random access procedure for NR.
R1-1720903 3GPP TSG RAN WG1 Meeting #91, Reno, USA, Nov. 27-Dec. 1, 2017, Source: ASUSTeK, Title: Power control on SRS for beam management.
R1-1720915 3GPP TSG RAN WG1 Meeting #91, Reno, USA, Nov. 27-Dec. 1, 2017, Source: China Telecom, Title: Discussion on Power Offset for SUL.
R1-1720928 3GPP TSG RAN WG1 Meeting #91, Reno, USA, Nov. 27-Dec. 1, 2017, Source: Motorola Mobility, Lenovo, Title: On non-CA NR UL power control.
R1-1721027 3GPP TSG RAN WG1 Meeting #91, Reno, USA, Nov. 27-Dec. 1, 2017, Source: Ericsson, Title: On Carrier aggregation related aspects.
R1-1721028 3GPP TSG RAN WG1 Meeting #91, Reno, USA, Nov. 27-Dec. 1, 2017, Source: Ericsson, Title: Remaining issues for NR power control framework.
R1-1721030 3GPP TSG RAN WG1 Meeting #91, Reno, USA, Nov. 27-Dec. 1, 2017, Source: Ericsson, Title: Power headroom reporting.
R1-1721031 3GPP TSG RAN WG1 Meeting #91, Reno, USA, Nov. 27-Dec. 1, 2017, Source: Ericsson, Title: Remaining issues of closed loop power control in NR.

(56) References Cited

OTHER PUBLICATIONS

R1-1721032 3GPP TSG RAN WG1 Meeting #91, Reno, USA, Nov. 27-Dec. 1, 2017, Source: Ericsson, Title: Remaining issues of PUSCH power control.
R1-1721033 3GPP TSG RAN WG1 Meeting #91, Reno, USA, Nov. 27-Dec. 1, 2017, Source: Ericsson, Title: Remaining issues of PUCCH power control.
R1-1721034 3GPP TSG RAN WG1 Meeting #91, Reno, USA, Nov. 27-Dec. 1, 2017, Source: Ericsson, Title: Remaining issues of SRS power control.
R1-1721038 3GPP TSG RAN WG1 Meeting #91, Reno, USA, Nov. 27-Dec. 1, 2017, Source: Nokia, Nokia Shanghai Bell, Title: Remaining details on NR power control framework.
3GPP TS 38.212 V1.2.1 (Dec. 2017), Technical Specification, 3rd Generation Partnership Project; Technical Specification Group Radio Access Network; NR; Multiplexing and Channel Coding (Release 15).
R1-1721371 3GPP TSG RAN WG1 Meeting #91, Reno, USA, Nov. 27-Dec. 1, 2017, Source: ZTE, Sanechips, Title: Summary of remaining issues on CSI measurement.
R1-1721451 3GPP TSG RAN WG1 Meeting #91, Reno, USA, Nov. 27-Dec. 1, 2017, Source: Ericsson, Title: Summary of views on CSI reporting.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803301 3GPP TSG RAN WG1 Meeting #92, Athens, Greece, Feb. 26-Mar. 2, 2018, Source: Ericsson, Title: Summary of CSI reporting v3.
R2-1706680 3GPP TSG-RAN WG2 NR Ad Hoc, Qingdao, China, Jun. 27-30, 2017, Source: AT&T, Title: Beam Failure Recovery Mechanism and RLF.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1806774 3GPP TSG RAN WG2 Meeting #102, Busan, Korea, May 21-25, 2018, Source: Nokia, Nokia Shanghai Bell, Title: Finalization of dormant Scell state.
R2-1806924 3GPP TSG RAN WG2 Meeting #102, Busan, Korea, May 21-25, 2018, Source: Qualcomm Incorporated, Title: SCell Dormant State Transitions based on New Timers & MAC-CEs.
R2-1807481 3GPP TSG RAN WG2 Meeting #102, Busan, Korea, May 21-25, 2018, Source: Huawei, HiSilicon, Title: Remaining issues of temporary CQI reporting.
R2-1808570 3GPP TSG RAN WG2 Meeting #102, Busan, Korea, May 21-25, 2018, Source: Qualcomm Incorporated, Title: Dormant BWP for fast SCell activation.
R2-1808809 3GPP TSG RAN WG2 Meeting #102, Busan, Korea, May 21-25, 2018, Source: Ericsson, Title: CR on Dormat SCell state transition MAC CE.
R2-1810063 3GPP TSG RAN WG2 NR Ad Hoc, Busan, Korea, Jul. 2-6, 2018, Source: Ericsson, Title: Dormant SCell state in NR.
3GPP TSG-RAN WG2 NR Ad Hoc, Qingdao, China, Jun. 27-30, 2017, Source: RAN2 Chairman (Intel), Title: Chairman Notes.
3GPP TS 38.211 V2.0.0 (Dec. 2017), Technical Specification, 3rd Generation Partnership Project; Technical Specification Group Radio Access Network; NR; Physical Channels and Modulation (Release 15).

3GPP TS 38.214 V2.0.0 (Dec. 2017), Technical Specification, 3rd Generation Partnership Project; Technical Specification Group Radio Access Network; NR; Physical Layer Procedures for Data (Release 15).
3GPP TS 38.331 V1.0.0 (Dec. 2017), Technical Specification, 3rd Generation Partnership Project; Technical Specification Group Radio Access Network; NR; Radio Resource Control (RRC) Protocol Specification (Release 15).
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
3GPP TS 38.331 V0.4.0 (Dec. 2017), Technical Specification, 3rd Generation Partnership Project; Technical Specification Group Radio Access Network; NR; Radio Resource Control (RRC) Protocol Specification (Release 15).
R1-18xxxx 3GPP TSG RAN WG1 Meeting #95, Spokane, USA, Nov. 12-16, 2018, Source: OPPO, Title: Summary of RAN1#95 Tdocs on UCI enhancements for URLLC.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
Lagent, et al., "New Radio Beam-Based Access to Unlicensed Spectrum: Design Challenges and Solutions," InterDigital Communications, Inc., Melville, New York, USA, Sep. 27, 2018.
R1-1701260 3GPP TSG RAN WG1 NR Ad Hoc, Spokane, USA, Jan. 16-20, 2017, Source: ZTE, ZTE Microelectronics, Title: WF on 2-step RACH.
R1-1613547 3GPP TSG RAN WG1 Metting #87, Reno, USA, Nov. 14-18, 2016, Source: Nokia, InterDigital, Title: Way Forward on Two-Step RACH Fallback.
R1-1613548 3GPP TSG RAN WG1 Metting #87, Reno, USA, Nov. 14-18, 2016, Source: Nokia, Title: Way Forward on Two-Step RACH Procedure.
R1-1613685 3GPP TSG RAN WG1 Metting #87, Reno, USA, Nov. 14-18, 2016, Source: Nokia, ASB, MediaTek, Ericson, Title: Way Forward on Two-Step RACH Procedure.
R1-1611274 3GPP TSG RAN WG1 Metting #87, Reno, USA, Nov. 14-18, 2016, Source: ZTE Corporation, ZTE Microelectronics, Title: On 2-Step RACH Procedure in NR.
R1-1611694 3GPP TSG RAN WG1 Metting #87, Reno, USA, Nov. 14-18, 2016, Source: Huawei, HiSilicon, Title: Considerations on NR RACH Preamble and Channel Design.
R1-1612033 3GPP TSG RAN WG1 Metting #87, Reno, USA, Nov. 14-18, 2016, Source: Qualcomm Incorporated, Title: 2 step and 4 step RACH.
R1-1612068 3GPP TSG RAN WG1 Metting #87, Reno, USA, Nov. 14-18, 2016, Source: Qualcomm Incorporated, Title: UE Power Evaluation for DRX with Wake-Up Signaling.
R1-1612142 3GPP TSG RAN WG1 Metting #87, Reno, USA, Nov. 14-18, 2016, Source: MediaTek Inc., Title: Considerations on 2-step RACH physical channel design.
R1-1612218 3GPP TSG RAN WG1 Metting #87, Reno, USA, Nov. 14-18, 2016, Source: ETRI, Title: On 2-step RACH procedure for high speed train scenario for NR.
R1-1612299 3GPP TSG RAN WG1 Metting #87, Reno, USA, Nov. 14-18, 2016, Source: Nokia, Alcatel-Lucent Shanghai Bell, Title: Random access principles for new radio.
R1-1700035 3GPP TSG RAN WG1 NR Ad Hoc, Spokane, USA, Jan. 16-20, 2017, Source: Huawei, HiSilicon, Title: Further Consideration on two-step RACH.
R1-1700105 3GPP TSG RAN WG1 NR Ad Hoc, Spokane, USA, Jan. 16-20, 2017, Source: ZTE, ZTE Microelectronics, Title: 2-step Random Access Procedure.

(56) References Cited

OTHER PUBLICATIONS

R1-1700172 3GPP TSG RAN WG1 NR Ad Hoc, Spokane, USA, Jan. 16-20, 2017, Source: MediaTek Inc., Title: On 2-step random access procedure and physical channel in NR.
R1-1700186 3GPP TSG RAN WG1 NR Ad Hoc, Spokane, USA, Jan. 16-20, 2017, Source: CATT, Title: Further considerations on a 2-step RA Procedure.
R1-1700300 3GPP TSG RAN WG1 NR Ad Hoc, Spokane, USA, Jan. 16-20, 2017, Source: Ericsson, Title: NR two-step random access procedure.
R1-1700311 3GPP TSG RAN WG1 NR Ad Hoc, Spokane, USA, Jan. 16-20, 2017, Source: AT&T, Title: 2-Step RA Procedure for NR.
R1-1700426 3GPP Tsg Ran WG1 Nr Ad Hoc, Spokane, USA, Jan. 16-20, 2017, Source: ITRI, Title: Discussion on 2-step RA procedure issues.
R1-1700464 3GPP TSG RAN WG1 NR Ad Hoc, Spokane, USA, Jan. 16-20, 2017, Source: LG Electronics, Title: Discussion on 2 step RACH.
R1-1700577 3GPP TSG RAN WG1 NR Ad Hoc, Spokane, USA, Jan. 16-20, 2017, Source: ETRI, Title: On 2-step RA procedure for NR.
R1-1700587 3GPP TSG RAN WG1 NR Ad Hoc, Spokane, USA, Jan. 16-20, 2017, Source: HTC, Title: Design considerations for 2-step RACH.
R1-1700652 3GPP TSG RAN WG1 NR Ad Hoc, Spokane, USA, Jan. 16-20, 2017, Source: Nokia, Alcatel-Lucent Shanghai Bell, Title: On 2-step Random Access Procedure.
R1-1700668 3GPP TSG RAN WG1 NR Ad Hoc, Spokane, USA, Jan. 16-20, 2017, Source: Sony, Title: Discussions on 2 Steps RACH Procedure.
R1-1700703 3GPP TSG RAN WG1 NR Ad Hoc, Spokane, USA, Jan. 16-20, 2017, Source: InterDigital Communications, Title: 2-step random access procedure.
R1-1700792 3GPP TSG RAN WG1 NR Ad Hoc, Spokane, USA, Jan. 16-20, 2017, Source: Qualcomm Incorporated, Title: 2-step RACH procedure consideration.
R1-1700880 3GPP TSG RAN WG1 NR Ad Hoc, Spokane, USA, Jan. 16-20, 2017, Source: Motorola Mobility, Title: Physical channel design for 2-step RACH.
R1-1700892 3GPP TSG RAN WG1 NR Ad Hoc, Spokane, USA, Jan. 16-20, 2017, Source: Samsung, Title: NR 2-step random access procedure.
R1-1701275 3GPP TSG RAN WG1 NR Ad Hoc, Spokane, USA, Jan. 16-20, 2017, Source: ZTE, ZTE Microelectronics, MediaTek, Title: WF on 2-Step RACH.
R1-1703139 3GPP TSG RAN WG1 Meeting #88, Athens, Greece, Feb. 13-17, 2017, Source: Sony, Title: Wake Up Radio for NR.
R1-1704282 3GPP TSG RAN WG1 Meeting #88bis, Spokane, USA, Apr. 3-7, 2017, Source: Huawei, HiSilicon, Title: Considerations on 'wake-up signal' for eFeMTC.
R1-1704290 3GPP TSG RAN WG1 Meeting #88bis, Spokane, USA, Apr. 3-7, 2017, Source: Huawei, HiSilicon, Title: On 'wake-up signal' for paging and connected-mode DRX.
R1-1704531 3GPP TSG RAN WG1 Meeting #88bis, Spokane, USA, Apr. 3-7, 2017, Source: CATT, Title: UE Wakeup Mechanism and On-Demand Access for efeMTC UE Power Saving.
R1-1704532 3GPP TSG RAN WG1 Meeting #88bis, Spokane, USA, Apr. 3-7, 2017, Source: CATT, Title: UE Wakeup Mechanism and On-Demand Access for fNB-IOT UE Power Saving.
R1-1704693 3GPP TSG RAN WG1 Meeting #88bis, Spokane, USA, Apr. 3-7, 2017, Source: Intel Corporation, Title: DL Power Consumption Reduction for efeMTC.
R1-1704698 3GPP TSG RAN WG1 Meeting #88bis, Spokane, USA, Apr. 3-7, 2017, Source: Intel Corporation, Title: DL Power Consumption Reduction for feNB-IOT.
R1-1704845 3GPP TSG RAN WG1 Meeting #88bis, Spokane, USA, Apr. 3-7, 2017, Source: LG Electronics, Title: UE power consumption reduction by new physical channel in MTC.
R1-1704847 3GPP TSG RAN WG1 Meeting #88bis, Spokane, USA, Apr. 3-7, 2017, Source: LG Electronics, Title: UE power consumption reduction by new physical channel in NB-IOT.
R1-1705012 3GPP TSG RAN WG1 Meeting #88bis, Spokane, USA, Apr. 3-7, 2017, Source: Qualcomm Incorporated, Title: Efficient monitoring of DL control channels.
R1-1705017 3GPP TSG RAN WG1 Meeting #88bis, Spokane, USA, Apr. 3-7, 2017, Source: Qualcomm Incorporated, Title: Efficient monitoring of DL control channels.
R1-1705038 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705043 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705182 3GPP TSG RAN WG1 Meeting #88bis, Spokane, USA, Apr. 3-7, 2017, Source: Ericsson, Title: Power consumption reduction for paging and connected-mode DRX.
R1-1705192 3GPP TSG RAN WG1 Meeting #88bis, Spokane, USA, Apr. 3-7, 2017, Source: Ericsson, Title: Power consumption reduction for paging and connected-mode DRX.
R1-1705204 3GPP TSG RAN WG1 Meeting #88bis, Spokane, USA, Apr. 3-7, 2017, Source: SONY, Title: MTC UE Power Consumption Reduction in Idle Mode Paging.
R1-1705305 3GPP TSG RAN WG1 Meeting #88bis, Spokane, USA, Apr. 3-7, 2017, Source: Samsung, Title: Power consumption reduction for paging and connected-mode DRX for eMTC.
R1-1705309 3GPP TSG RAN WG1 Meeting #88bis, Spokane, USA, Apr. 3-7, 2017, Source: Samsung, Title: Power consumption reduction for paging and connected-mode DRX for NB-IOT.
R1-1705494 3GPP TSG RAN WG1 Meeting #88bis, Spokane, USA, Apr. 3-7, 2017, Source: ZTE, ZTE Microelectronics, Title: Power consumption reduction for physical channels for MTC.
R1-1705495 3GPP TSG RAN WG1 Meeting #88bis, Spokane, USA, Apr. 3-7, 2017, Source: ZTE, ZTE Microelectronics, Title: Power consumption reduction for physical channels for NB-IOT.
R1-1706882 3GPP TSG RAN WG1 Meeting #89, Hangzhou, P.R. China, May 15-19, 2017, Source: Ericsson, Title: Downlink channel power efficiency for MTC.
R1-1707018 3GPP TSG RAN WG1 Meeting #89, Hangzhou, P.R. China, May 15-19, 2017, Source: Huawei, HiSilicon, Title: On 'wake-up signal' for eFeMTC.
R1-1707101 3GPP TSG RAN WG1 Meeting #89, Hangzhou, P.R. China, May 15-19, 2017, Source: ZTE, Title: Power consumption reduction for physical channels for MTC.
R1-1707315 3GPP TSG RAN WG1 Meeting #89, Hangzhou, P.R. China, May 15-19, 2017, Source: Intel Corporation, Title: Analysis of impact of Wake-up signaling on power consumption and resource efficiency for efeMTC.
R1-1707455 3GPP TSG RAN WG1 Meeting #89, Hangzhou, P.R. China, May 15-19, 2017, Source: CATT, Title: UE Wakeup Mechanism and On-Demand Access for efeMTC UE Power Saving.
R1-1707568 3GPP TSG RAN WG1 Meeting #89, Hangzhou, P.R. China, May 15-19, 2017, Source: LG Electronics, Title: UE power consumption reduction by new physical signal/channel in MTC.
R1-1707862 3GPP TSG RAN WG1 Meeting #89, Hangzhou, P.R. China, May 15-19, 2017, Source: Nokia, Alcatel-Lucent Shanghai Bell, Title: Signalling for efficient decoding of physical channels.
R1-1708311 3GPP TSG RAN WG1 Meeting #89, Hangzhou, P.R. China, May 15-19, 2017, Source: Sierra Wireless, Title: SIdle Mode Power Efficiency Reduction.
R1-1708796 3GPP TSG RAN WG1 Meeting #89, Hangzhou, P.R. China, May 15-19, 2017, Source: Qualcomm Incorporated, Title: Efficient monitoring of DL control channels.
R1-1712106 3GPP TSG RAN WG1 Meeting #90, Prague, Czech Republic, Aug. 21-25, 2017, Source: Huawei, HiSilicon, Title: On power-saving signal for eFeMTC.
R1-1804405 3GPP TSG RAN WG1 Meeting #92, Sanya, China, Apr. 16-20, 2018, Source: Samsung, Title: Potential physical layer procedures for NR-U.
R1-1808272 3GPP TSG RAN WG1 Meeting #94, Gothenburg, Sweden, Aug. 20-24, 2018, Source: MediaTek Inc., Title: On downlink transmission detection in NR-U.

(56) References Cited

OTHER PUBLICATIONS

R1-1808319 3GPP TSG RAN WG1 Meeting #94, Gothenburg, Sweden, Aug. 20-24, 2018, Source: ZTE, Title: Considerations on DL reference signals and channels design for NR-U.

* cited by examiner

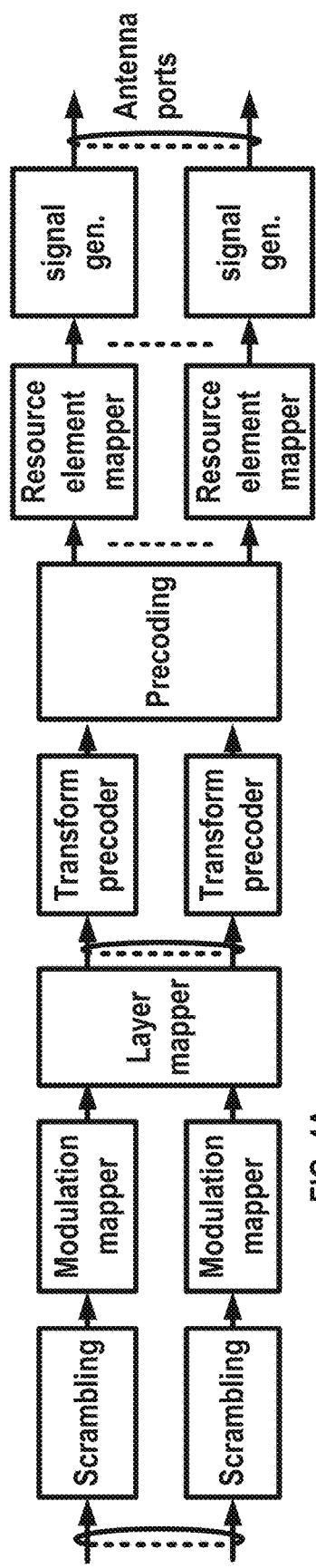
FIG. 4A
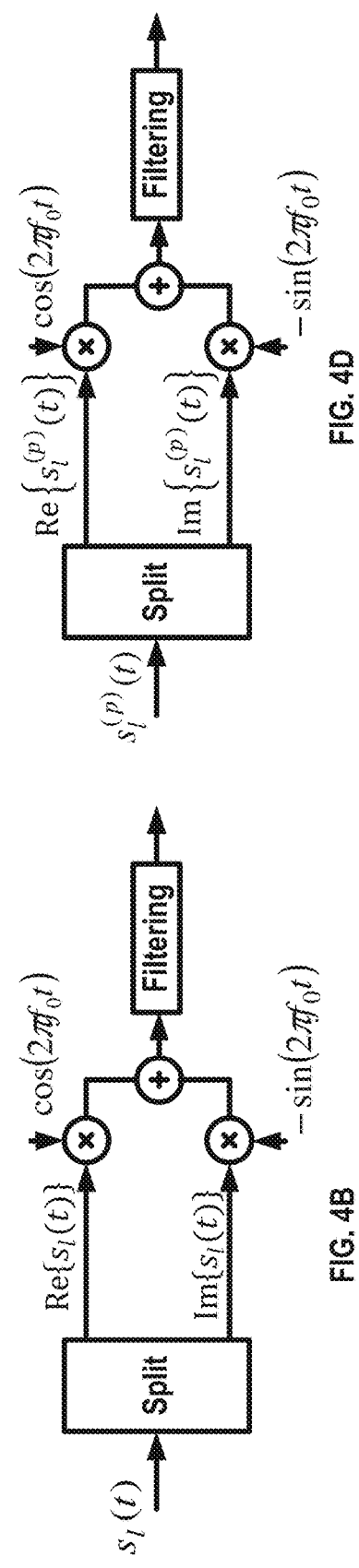
FIG. 4B
FIG. 4D
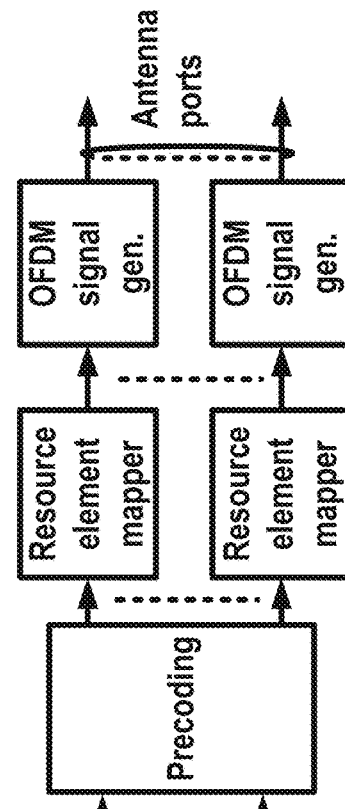
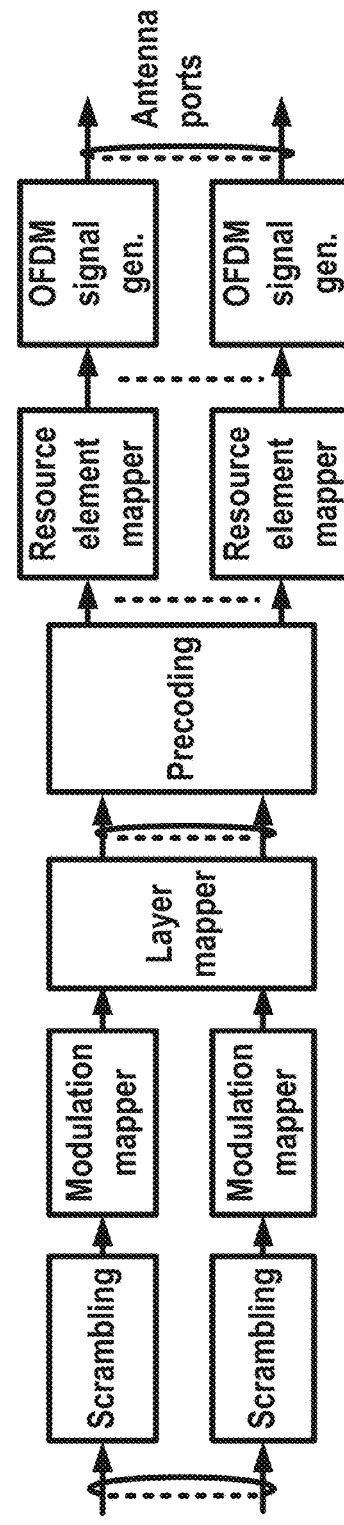
FIG. 4C

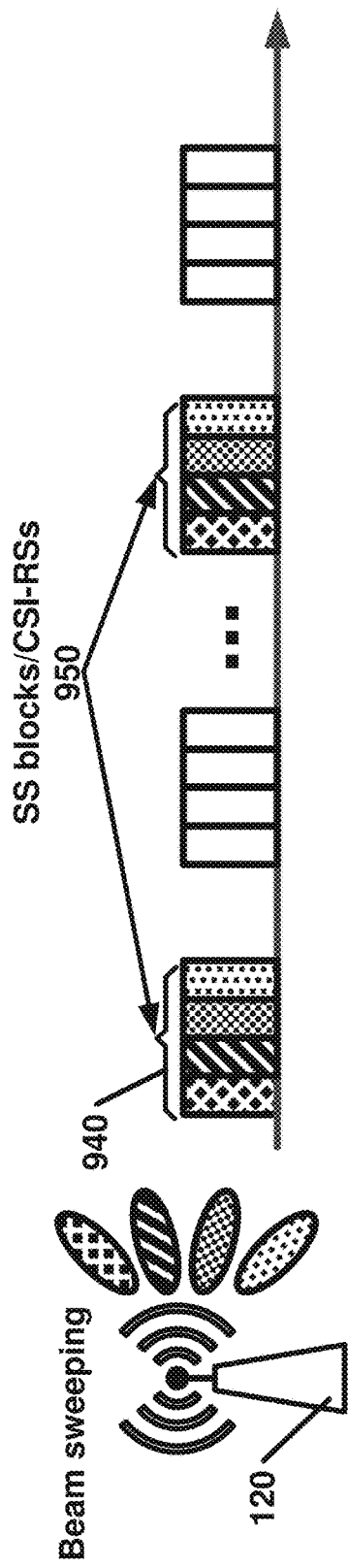
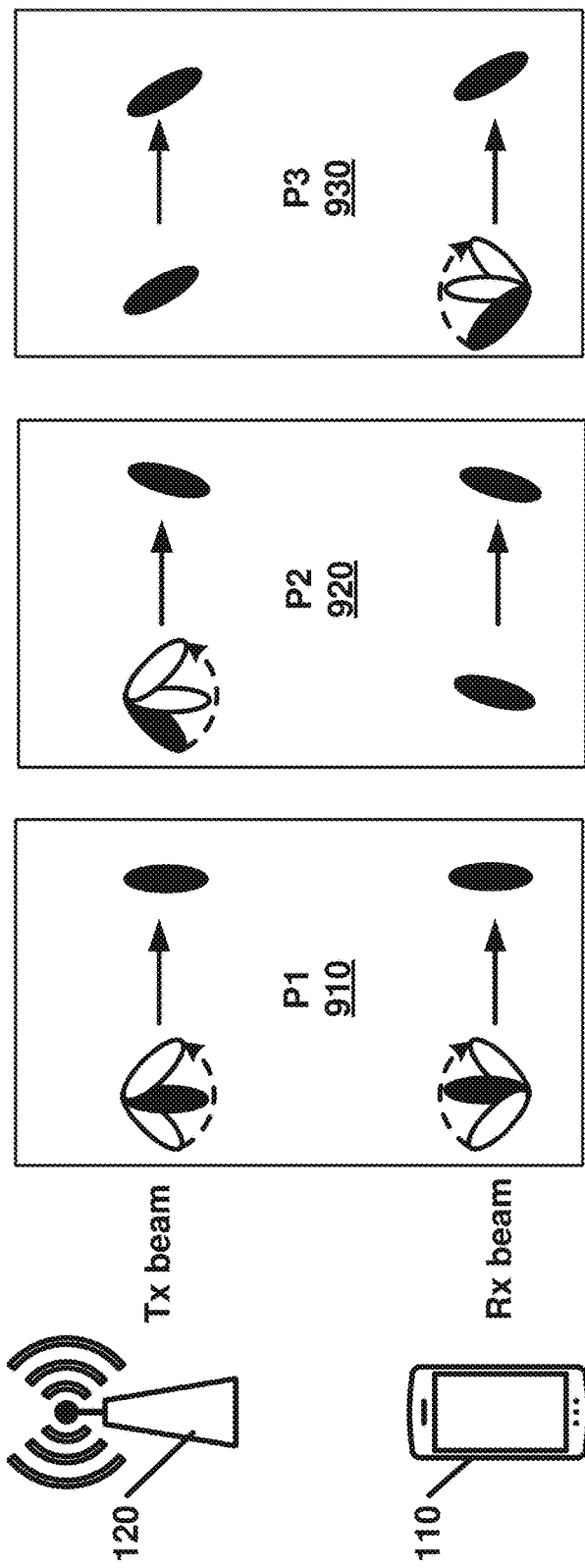
FIG. 9A
FIG. 9B

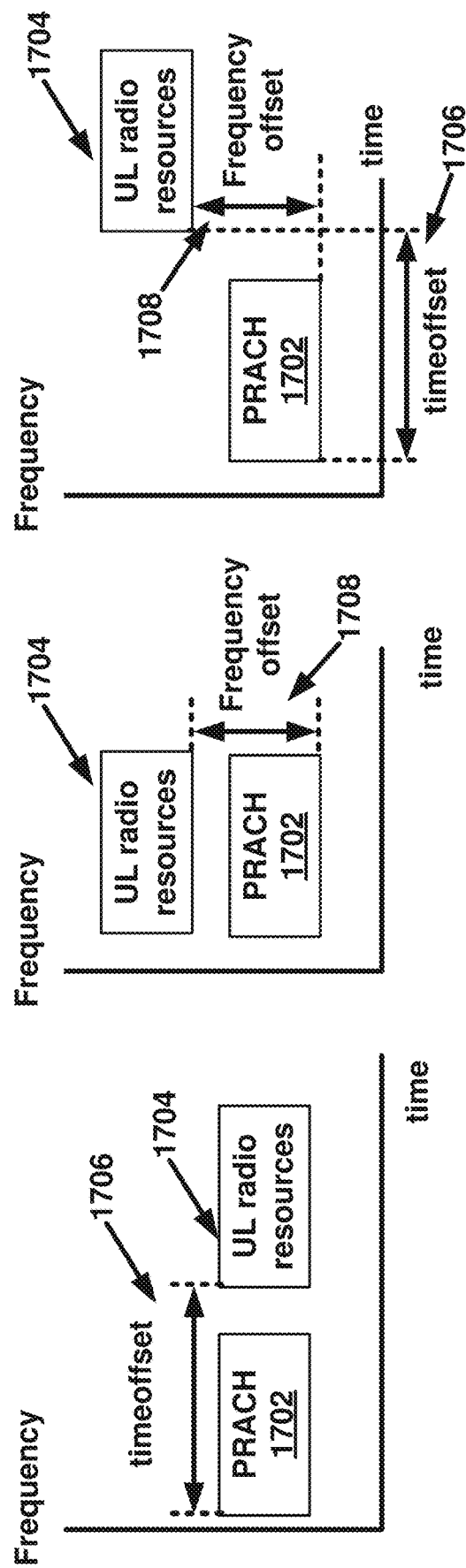

*RACH-ConfigCommon information element*

```
-- ASN1START
-- TAG-RACH-CONFIG-COMMON-START

RACH-ConfigCommon ::=        SEQUENCE {
    rach-ConfigGeneric           RACH-ConfigGeneric,
    totalNumberOfRA-Preambles    INTEGER (1..63)                                              OPTIONAL,  -- Need S
    ssb-perRACH-OccasionAndCB-PreamblesPerSSB  CHOICE {
        oneEighth       ENUMERATED {n4,n8,n12,n16,n20,n24,n28,n32,n36,n40,n44,n48,n52,n56,n60,n64},
        oneFourth       ENUMERATED {n4,n8,n12,n16,n20,n24,n28,n32,n36,n40,n44,n48,n52,n56,n60,n64},
        oneHalf         ENUMERATED {n4,n8,n12,n16,n20,n24,n28,n32,n36,n40,n44,n48,n52,n56,n60,n64},
        one             ENUMERATED {n4,n8,n12,n16,n20,n24,n28,n32,n36,n40,n44,n48,n52,n56,n60,n64},
        two             ENUMERATED {n4,n6,n12,n16,n20,n24,n28,n32},
        four            INTEGER (1..16),
        eight           INTEGER (1..8),
        sixteen         INTEGER (1..4)
    }                                                                                        OPTIONAL,  -- Need M
    groupBconfigured             SEQUENCE {
        ra-Msg3SizeGroupA        ENUMERATED { b56, b144, b208, b256, b282, b480, b640,
                                              b800, b1000, spare7, spare6, spare5, spare4, spare3, spare2, spare1},
        messagePowerOffsetGroupB ENUMERATED { minusinfinity, dB0, dB5, dB8, dB10, dB12, dB15, dB18},
        numberOfRA-PreamblesGroupA  INTEGER (1..64)
    }                                                                                        OPTIONAL,  -- Need R
    ra-ContentionResolutionTimer ENUMERATED { sf8, sf16, sf24, sf32, sf40, sf48, sf56, sf64},
    rsrp-ThresholdSSB            RSRP-Range                                                  OPTIONAL,  -- Need R
    rsrp-ThresholdSSB-SUL        RSRP-Range                                                  OPTIONAL,  -- Cond SUL
    prach-RootSequenceIndex      CHOICE {
        l839                     INTEGER (0..837),
        l139                     INTEGER (0..137)
    },
    msg1-SubcarrierSpacing       SubcarrierSpacing                                           OPTIONAL,  -- Need S
    restrictedSetConfig          ENUMERATED {unrestrictedSet, restrictedSetTypeA, restrictedSetTypeB},
    msg3-transformPrecoding      ENUMERATED {enabled}                                        OPTIONAL,  -- Need R
    ...
}

-- TAG-RACH-CONFIG-COMMON-STOP
-- ASN1STOP
```

FIG. 18

RACH-ConfigCommon field descriptions messagePowerOffsetGroupB
Threshold for preamble selection. Value in dB. Value minusinfinity corresponds to -infinity. Value dB0 corresponds to 0 dB, dB5 corresponds to 5 dB and so on. (see FFS_Spec, section FFS_Section)

msg1-SubcarrierSpacing
Subcarrier spacing of PRACH. Only the values 15 or 30 kHz (<6GHz), 60 or 120 kHz (>6GHz) are applicable. Corresponds to L1 parameter 'prach-Msg1SubcarrierSpacing' (see 38.211, section FFS_Section). If absent, the UE applies the SCS as derived from the prach-ConfigurationIndex in RACH-ConfigGeneric (see 38.211, section XXX).

msg3-transformPrecoding
Indicates to a UE whether transform precoding is enabled for Msg3 transmission. Absence indicates that it is disabled. Corresponds to L1 parameter 'msg3-tp' (see 38.213, section 8.1)

numberOfRA-PreamblesGroupA
The number of CB preambles per SSB in group A. This determines implicitly the number of CB preambles per SSB available in group B. (see 38.321, section 5.1.1). The setting should be consistent with the setting of ssb-perRACH-OccasionAndCB-PreamblesPerSSB.

prach-RootSequenceIndex
PRACH root sequence index. Corresponds to L1 parameter 'PRACHRootSequenceIndex' (see 38.211, section 6.3.3.1). The value range depends on whether L=839 or L=139.

ra-ContentionResolutionTimer
The initial value for the contention resolution timer (see 38.321, section 5.1.5). Value ms8 corresponds to 8 ms, value ms16 corresponds to 16 ms, and so on.

ra-Msg3SizeGroupA
Transport Blocks size threshold in bit below which the UE shall use a contention based RA preamble of group A. (see 38.321, section 5.1.2)

rach-ConfigGeneric
Generic RACH parameters restrictedSetConfig
Configuration of an unrestricted set or one of two types of restricted sets, see 38.211 6.3.3.1 rsrp-ThresholdSSB
UE may select the SS block and corresponding PRACH resource for path-loss estimation and (re)transmission based on SS blocks that satisfy the threshold (see 38.213, section REF)

rsrp-ThresholdSSB-SUL
The UE selects SUL carrier to perform random access based on this threshold (see TS 38.321, section 5.1.1).

ssb-perRACH-OccasionAndCB-PreamblesPerSSB
Number of SSBs per RACH occasion (L1 parameter 'SSB-per-rach-occasion') and the number of Contention Based preambles per SSB (L1 parameter 'CB-preambles-per-SSB'). The total number of CB preambles in a RACH occasion is given by CB-preambles-per-SSB * max(1,SSB-per-rach-occasion).

totalNumberOfRA-Preambles
Total number of preambles used for contention based and contention free random access, excluding preambles used for other purposes (e.g. for SI request). If the field is absent, the UE may use all 64 preambles for RA.

FIG. 19

RACH-ConfigGeneric information element

```
-- ASN1START
-- TAG-RACH-CONFIG-GENERIC-START

RACH-ConfigGeneric ::=              SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER(0..15),
    preambleReceivedTargetPower     INTEGER (-202..-60),
    preambleTransMax                ENUMERATED {n3, n4, n5, n6, n7, n8, n10, n20, n50, n100, n200},
    powerRampingStep                ENUMERATED {dB0, dB2, dB4, dB6},
    ra-ResponseWindow               ENUMERATED {sl1, sl2, sl4, sl8, sl10, sl20, sl40, sl80},
    ...
}

-- TAG-RACH-CONFIG-GENERIC-STOP
-- ASN1STOP
```

| RACH-ConfigGeneric field descriptions |
|---|
| *msg1-FDM* <br> The number of PRACH transmission occasions FDMed in one time instance. Corresponds to L1 parameter 'prach-FDM' (see 38.211, section FFS_Section) |
| *msg1-FrequencyStart* <br> Offset of lowest PRACH transmission occasion in frequency domain with respective to PRB 0. The value is configured so that the corresponding RACH resource is entirely within the bandwidth of the UL BWP. Corresponds to L1 parameter 'prach-frequency-start' (see 38.211, section FFS_Section) |
| *powerRampingStep* <br> Power ramping steps for PRACH (see 38.321,5.1.3) |
| *prach-ConfigurationIndex* <br> PRACH configuration index. Corresponds to L1 parameter 'PRACHConfigurationIndex' (see 38.211, section 6.3.3.2) |
| *preambleReceivedTargetPower* <br> The target power level at the network receiver side (see 38.213, section 7.4, 38.321, section 5.1.2, 5.1.3). Only multiples of 2 dBm may be chosen (e.g. -202, -200, -198, ...). |
| *preambleTransMax* <br> Max number of RA preamble transmission performed before declaring a failure (see 38.321, section 5.1.4, 5.1.5) |
| *ra-ResponseWindow* <br> Msg2 (RAR) window length in number of slots. The network configures a value lower than or euqal to 10 ms (see 38.321, section 5.1.4) |
| *zeroCorrelationZoneConfig* <br> N-CS configuration, see Table 6.3.3.1-3 in 38.211 |

FIG. 20

RACH-ConfigDedicated information element

```
-- ASN1START
-- TAG-RACH-CONFIG-DEDICATED-START

-- FFS_Standlone: resources for msg1-based on-demand SI request

RACH-ConfigDedicated ::=     SEQUENCE {
    cfra                         CFRA                                               OPTIONAL,   -- Need M
    ra-Prioritization            RA-Prioritization                                  OPTIONAL,   -- Need N
    ...
}

CFRA ::=             SEQUENCE {
    occasions            SEQUENCE {
        rach-ConfigGeneric      RACH-ConfigGeneric,
        ssb-perRACH-Occasion    ENUMERATED {oneEighth, oneFourth, oneHalf, one, two, four, eight, sixteen}  OPTIONAL-- Cond SSB-CFRA
    }                                                                                           OPTIONAL,   -- Need S
    resources            CHOICE {
        ssb                  SEQUENCE {
            ssb-ResourceList         SEQUENCE (SIZE(1..maxRA-SSB-Resources)) OF CFRA-SSB-Resource,
            ra-ssb-OccasionMaskIndex INTEGER (0..15)
        },
        csirs                SEQUENCE {
            csirs-ResourceList       SEQUENCE (SIZE(1..maxRA-CSIRS-Resources)) OF CFRA-CSIRS-Resource,
            rsrp-ThresholdCSI-RS     RSRP-Range
        }
    },
    ...
}

CFRA-SSB-Resource ::=    SEQUENCE {
    ssb                      SSB-Index,
    ra-PreambleIndex         INTEGER (0..63),
    ...
}

CFRA-CSIRS-Resource ::=  SEQUENCE {
    csi-RS                   CSI-RS-Index,
    ra-OccasionList          SEQUENCE (SIZE(1..maxRA-OccasionsPerCSIRS)) OF INTEGER (0..maxRA-Occasions-1),
    ra-PreambleIndex         INTEGER (0..63),
    ...
}

-- TAG-RACH-CONFIG-DEDICATED-STOP
-- ASN1STOP
```

FIG. 21

CFRA-CSIRS-Resource field descriptions

*csi-RS*
The ID of a CSI-RS resource defined in the measurement object associated with this serving cell.

*ra-OccasionList*
RA occasions that a wireless device may employ when performing CF-RA upon selecting the candidate beam identified by this CSI-RS.

*ra-PreambleIndex*
The RA preamble index to use in the RA occasions associated with this CSI-RS.

CFRA field descriptions

*ra-ssb-OccasionMaskIndex*
Explicitly signalled PRACH Mask Index for RA Resource selection. The mask is valid for all SSB resources signalled in ssb-ResourceList.

*rach-ConfigGeneric*
Configuration of contention free random access occasions for CFRA.

*ssb-perRACH-Occasion*
Number of SSBs per RACH occasion.

CFRA-SSB-Resource field descriptions

*ra-PreambleIndex*
The preamble index that a wireless device may employ when performing CF-RA upon selecting the candidate beams identified by this SSB.

*ssb*
The ID of an SSB transmitted by this serving cell.

RACH-ConfigDedicated field descriptions

*cfra*
Parameters for contention free random access to a given target cell. If the field is absent, a wireless device may perform contention based random access.

*ra-prioritization*
Parameters which apply for prioritized random access procedure to a given target cell.

| Conditional Presence | Explanation |
|---|---|
| SSB-CFRA | The field is mandatory present if the field resources in CFRA is set to ssb; otherwise it is not present. |

FIG. 22

PRACH Mask Index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 23

| Channel Access Priority Class ($p$) | QCI |
|---|---|
| 1 | 1, 3, 5, 65, 66, 69, 70 |
| 2 | 2, 7 |
| 3 | 4, 6, 8, 9 |
| 4 | - |

FIG. 24

```
BWP ::=                              SEQUENCE {
    locationAndBandwidth                 INTEGER (0..37949),
    subcarrierSpacing                    SubcarrierSpacing,
    cyclicPrefix                         ENUMERATED { extended }
        OPTIONAL -- Need R
    ...
}

BWP-Uplink ::=                       SEQUENCE {
    bwp-Id                               BWP-Id,
    bwp-Common                           BWP-UplinkCommon
        OPTIONAL, -- Need M
    bwp-Dedicated                        BWP-UplinkDedicated
        OPTIONAL, -- Need M
    ...
}

BWP-UplinkCommon ::=                 SEQUENCE {
    genericParameters                    BWP,
    rach-ConfigCommon                    SetupRelease { RACH-ConfigCommon }
        OPTIONAL,      -- Need M
    pusch-ConfigCommon                   SetupRelease { PUSCH-ConfigCommon }
        OPTIONAL,      -- Need M
    pucch-ConfigCommon                   SetupRelease { PUCCH-ConfigCommon }
        OPTIONAL,      -- Need M
    ...
}

BWP-UplinkDedicated ::=              SEQUENCE {
    pucch-Config                         SetupRelease { PUCCH-Config }
        OPTIONAL,      -- Need M
    pusch-Config                         SetupRelease { PUSCH-Config }
        OPTIONAL,      -- Cond SetupOnly
    configuredGrantConfig                SetupRelease { ConfiguredGrantConfig }
        OPTIONAL,      -- Need M
    srs-Config                           SetupRelease { SRS-Config }
        OPTIONAL,      -- Need M
    beamFailureRecoveryConfig            SetupRelease { BeamFailureRecoveryConfig }
        OPTIONAL, -- Cond SpCellOnly
    ...
}

BWP-Downlink ::=                     SEQUENCE {
    bwp-Id                               BWP-Id,
    bwp-Common                           BWP-DownlinkCommon
        OPTIONAL, -- Need M
    bwp-Dedicated                        BWP-DownlinkDedicated
        OPTIONAL, -- Need M
    ...
}

BWP-DownlinkCommon ::=               SEQUENCE {
    genericParameters                    BWP,
    pdcch-ConfigCommon                   SetupRelease { PDCCH-ConfigCommon }
        OPTIONAL, -- Need M
    pdsch-ConfigCommon                   SetupRelease { PDSCH-ConfigCommon }
        OPTIONAL, -- Need M
    ...
}

BWP-DownlinkDedicated ::=            SEQUENCE {
    pdcch-Config                         SetupRelease { PDCCH-Config }
        OPTIONAL, -- Need M
    pdsch-Config                         SetupRelease { PDSCH-Config }
        OPTIONAL, -- Need M
    sps-Config                           SetupRelease { SPS-Config }
        OPTIONAL,      -- Need M
    radioLinkMonitoringConfig            SetupRelease { RadioLinkMonitoringConfig }
        OPTIONAL, -- Need M
    ...
}
```

FIG. 25

```
ServingCellConfig ::=           SEQUENCE {
    tdd-UL-DL-ConfigurationDedicated  TDD-UL-DL-ConfigDedicated
        OPTIONAL,       -- Cond TDD initialDownlinkBWP              BWP-DownlinkDedicated
        OPTIONAL,       -- Cond ServCellAdd
    downlinkBWP-ToReleaseList       SEQUENCE (SIZE (1..maxNrofBWPs)) OF BWP-Id
        OPTIONAL,       -- Need N
    downlinkBWP-ToAddModList        SEQUENCE (SIZE (1..maxNrofBWPs)) OF BWP-Downlink
        OPTIONAL,       -- Need N
    firstActiveDownlinkBWP-Id       BWP-Id
        OPTIONAL,       -- Cond SyncAndCellAdd
    bwp-InactivityTimer             ENUMERATED { ms2, ms3, ms4, ms5, ms6, ms8, ms10, ms20, ms30,
                                                 ms40, ms50, ms60, ms80, ms100, ms200, ms300, ms500,
                                                 ms750, ms1280, ms1920, ms2560, spare10, spare9, spare8,
                                                 spare7, spare6, spare5, spare4, spare3, spare2, spare1 }
        OPTIONAL,       -- Need R
    defaultDownlinkBWP-Id           BWP-Id
        OPTIONAL,       -- Need S uplinkConfig                    UplinkConfig
        OPTIONAL,       -- Cond ServCellAdd-UL
    supplementaryUplink             UplinkConfig
        OPTIONAL,       -- Cond ServCellAdd-SUL pdcch-ServingCellConfig         SetupRelease { PDCCH-ServingCellConfig }
        OPTIONAL,       -- Need M
    pdsch-ServingCellConfig         SetupRelease { PDSCH-ServingCellConfig }
        OPTIONAL,       -- Need M
    csi-MeasConfig                  SetupRelease { CSI-MeasConfig }
        OPTIONAL,       -- Need M
    sCellDeactivationTimer          ENUMERATED { ms20, ms40, ms80, ms160, ms200, ms240,
                                                 ms320, ms400, ms480, ms520, ms640, ms720,
                                                 ms840, ms1280, spare2, spare1}
        OPTIONAL,       -- Cond ServingCellWithoutPUCCH
    crossCarrierSchedulingConfig    CrossCarrierSchedulingConfig
        OPTIONAL,       -- Need M
    tag-Id                          TAG-Id,
    ue-BeamLockFunction             ENUMERATED {enabled}
        OPTIONAL,       -- Need R
    pathlossReferenceLinking        ENUMERATED {pCell, sCell}
        OPTIONAL,       -- Cond SCellOnly
    servingCellMO                   MeasObjectId
        OPTIONAL,       -- Cond MeasObject
    ...
}

UplinkConfig ::=                SEQUENCE {
    initialUplinkBWP                BWP-UplinkDedicated
        OPTIONAL,       -- Cond ServCellAdd
    uplinkBWP-ToReleaseList         SEQUENCE (SIZE (1..maxNrofBWPs)) OF BWP-Id
        OPTIONAL,       -- Need N
    uplinkBWP-ToAddModList          SEQUENCE (SIZE (1..maxNrofBWPs)) OF BWP-Uplink
        OPTIONAL,       -- Need N
    firstActiveUplinkBWP-Id         BWP-Id
        OPTIONAL,       -- Cond SyncAndCellAdd pusch-ServingCellConfig         SetupRelease { PUSCH-ServingCellConfig }
        OPTIONAL,       -- Need M
    carrierSwitching                SetupRelease { SRS-CarrierSwitching }
        OPTIONAL,       -- Need M
    ...
}
```

FIG. 26

| | |
|---|---|
| R / Timing Advance Command | Oct 1 |
| Timing Advance Command / UL Grant | Oct 2 |
| UL Grant | Oct 3 |
| UL Grant | Oct 4 |
| Temporary C-RNTI | Oct 5 |
| Temporary C-RNTI | Oct 6 |
| UE contention resolution identity | Oct 7 |
| UE contention resolution identity | Oct 8 |
| UE contention resolution identity | Oct 9 |
| UE contention resolution identity | Oct 10 |
| UE contention resolution identity | Oct 11 |
| UE contention resolution identity | Oct 12 |

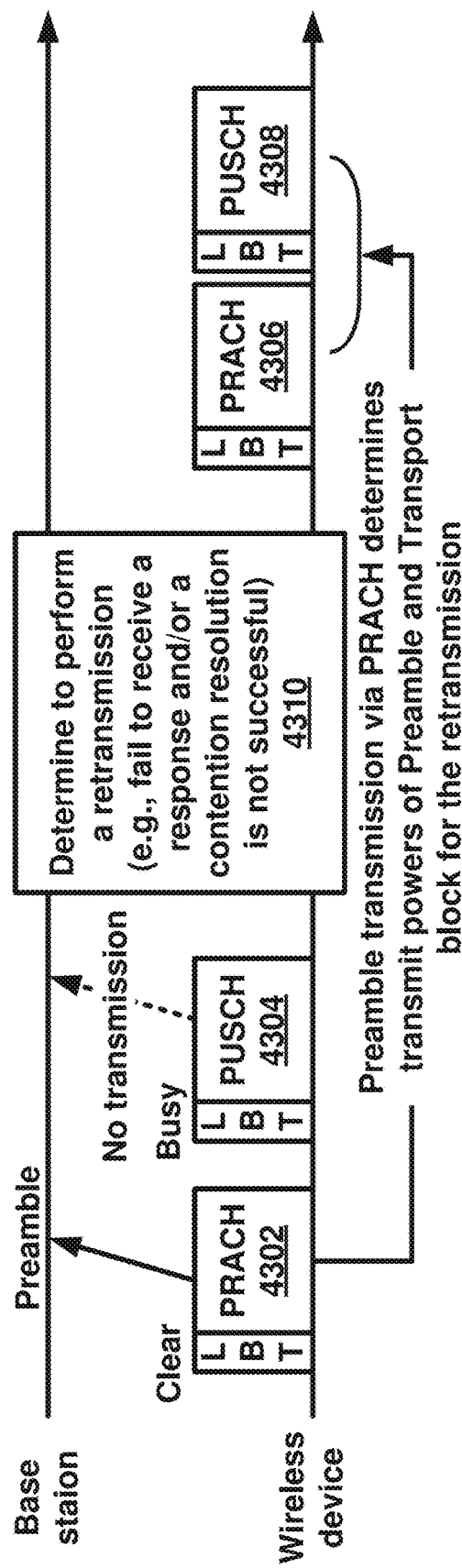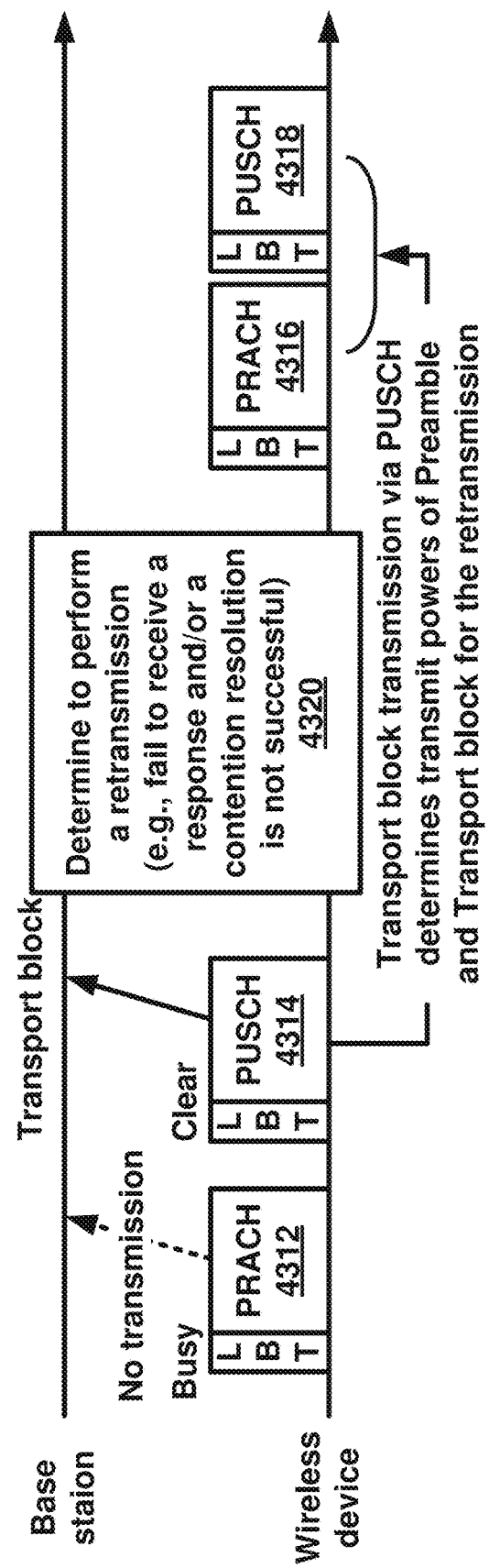

POWER CONTROL FOR MESSAGE TRANSMISSIONS

CROSS-REFERENCE TO RELATED APPLICATIONS

This application is a continuation of U.S. patent application Ser. No. 17/039,414 filed on Sep. 30, 2020, which is a continuation of U.S. patent application Ser. No. 16/586,515 filed on Sep. 27, 2019 now U.S. Pat. No. 10,856,239, which claims the benefit of U.S. Provisional Application No. 62/737,685, filed on Sep. 27, 2018. The above-referenced applications are hereby incorporated by reference in their entireties.

BACKGROUND

Wireless communications may use radio frequencies within a defined spectrum or bandwidth of frequencies. Some wireless communications may use a shared communication medium, such as unlicensed bands shared with other wireless technologies. A wireless device may determine whether a communication medium is clear, for example, by using a listen before talk (LBT) procedure. If the communication medium is busy, the wireless device may not send (e.g., may not transmit) a message and/or may forgo a transmission opportunity. If the communication medium is clear, the wireless device may send (e.g., transmit) a message and/or use the transmission opportunity.

SUMMARY

The following summary presents a simplified summary of certain features. The summary is not an extensive overview and is not intended to identify key or critical elements.

Systems, apparatuses, and methods are described for power control of wireless communications. Wireless communications between a base station and/or one or more wireless devices are described. Wireless communications may enable multiple opportunities to start and/or restart communication between at least two devices, such as a base station and a wireless device. A wireless device may use power ramping, such as for retransmissions during a random access (RA) procedure to start and/or restart communication. A successful transmission of one of a preamble or a transport block (TB) and/or a failure of a transmission the other may cause the wireless device to use power ramping for a retransmission of the preamble and/or the TB. A wireless device may fail the transmission based on a failure of a first LBT procedure, for example, before attempting to send a preamble, and/or a TB, on an unlicensed band. The wireless device may not send the preamble and/or TB, for example, based on the failure of the first LBT procedure. The wireless device may complete a second LBT procedure, for example, before sending the other of the preamble, and/or the TB, on the unlicensed band. The wireless device may use power ramping to determine a power for transmission of the preamble and/or TB, for example, based on a prior transmission of a preamble and/or a TB. Power ramping may be determined (e.g., calculated) using a power value (e.g., a power ramping counter value and/or a power ramping step value). The power value may be shared and/or associated with a preamble and/or a TB. A wireless device may continue power ramping for each successful transmission of one of the preamble and/or TB and/or failure of transmission of another of the one of the preamble and/or TB. A wireless device may use a same power value for power for transmissions of the preamble and the TB, different power values for the transmission of the preamble and transmissions of the TB based on different power ramping counter values, and/or different power values for the transmission of the preamble and transmissions of the TB based on a same power ramping counter value. Power ramping based on a successful transmission of one of a preamble or a TB may increase a decoding success rate and/or reduce a number of retransmissions, such that after a medium becomes available, the transmission may be less likely to fail because of interference, low power and/or other problems related to transmission power.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 9A shows an example channel state information reference signal (CSI-RS) and/or synchronization signal (SS) block transmission in a multi-beam system.

FIG. 9B shows an example downlink beam management procedure.

FIG. 17A, FIG. 17B, and FIG. 17C show examples of radio resource allocations of a RA resource and one or more associated radio resources.

FIG. 18 shows an example random access resource configuration.

FIG. 19 shows example field descriptions of a common random access resource configuration.

FIG. 20 shows an example generic random access resource configuration, and field descriptions.

FIG. 21 shows an example dedicated random access resource configuration.

FIG. 22 shows example field descriptions of a dedicated random access resource configuration.

FIG. 23 shows example random access occasion mask index values.

FIG. 24 shows an example channel access priority class values.

FIG. 25 shows an example bandwidth part configuration information element.

FIG. 26 shows an example serving cell configuration information element.

FIG. 29 shows an example RAR format.

FIG. 30A and FIG. 30B show example RAR formats.

FIG. 43A and FIG. 43B show examples of retransmission procedures using power adjustment and listen before talk.

DETAILED DESCRIPTION

Figure 1:
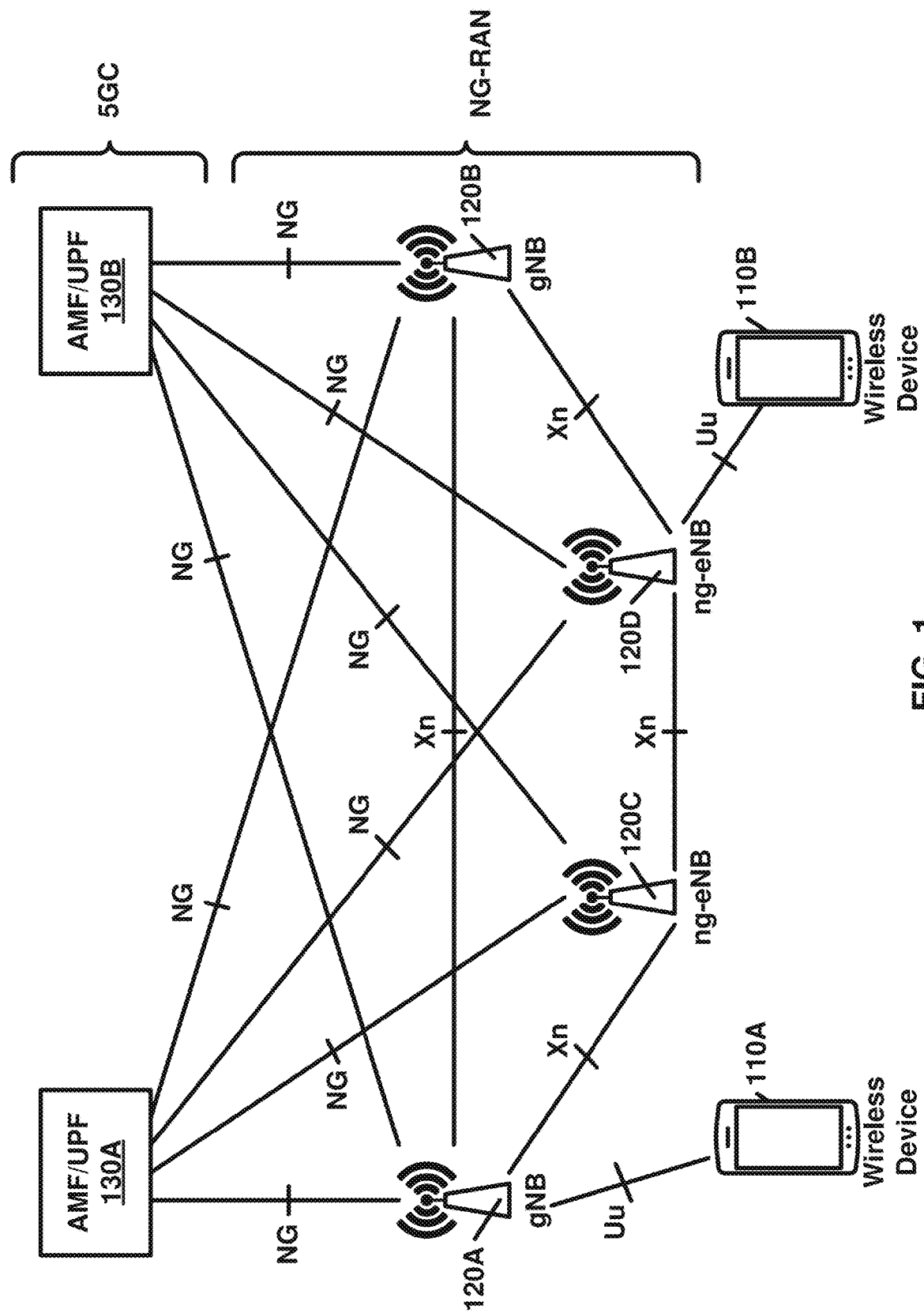
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to power control for wireless communications in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide, for example, NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
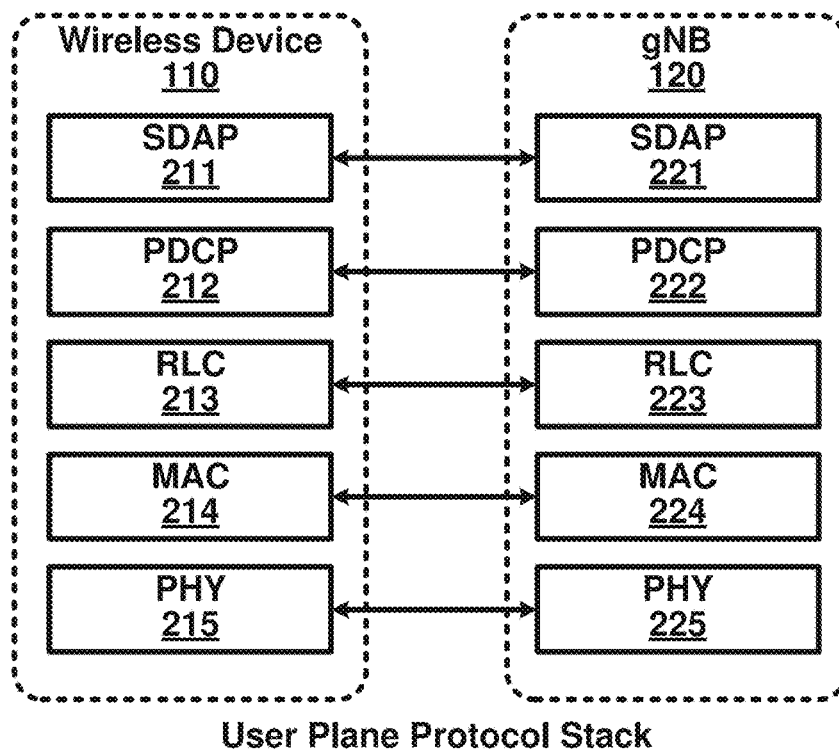
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
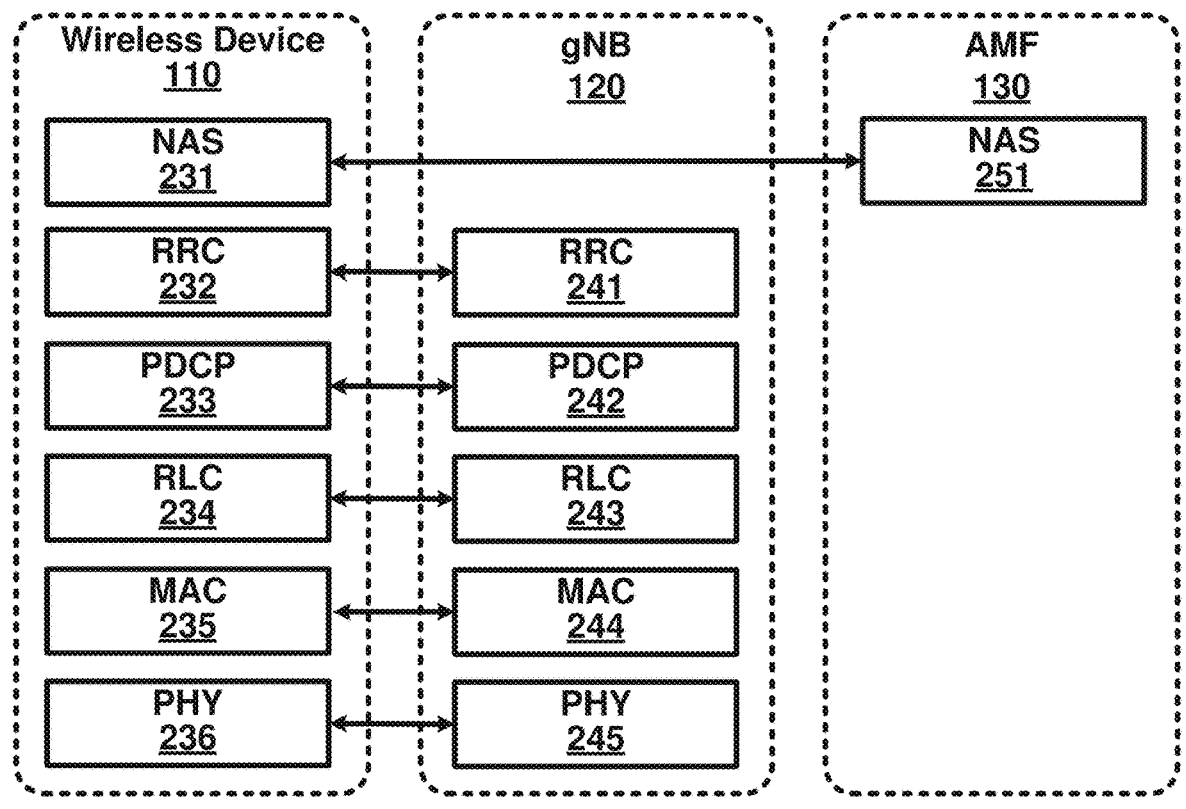
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a TB. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., TB). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
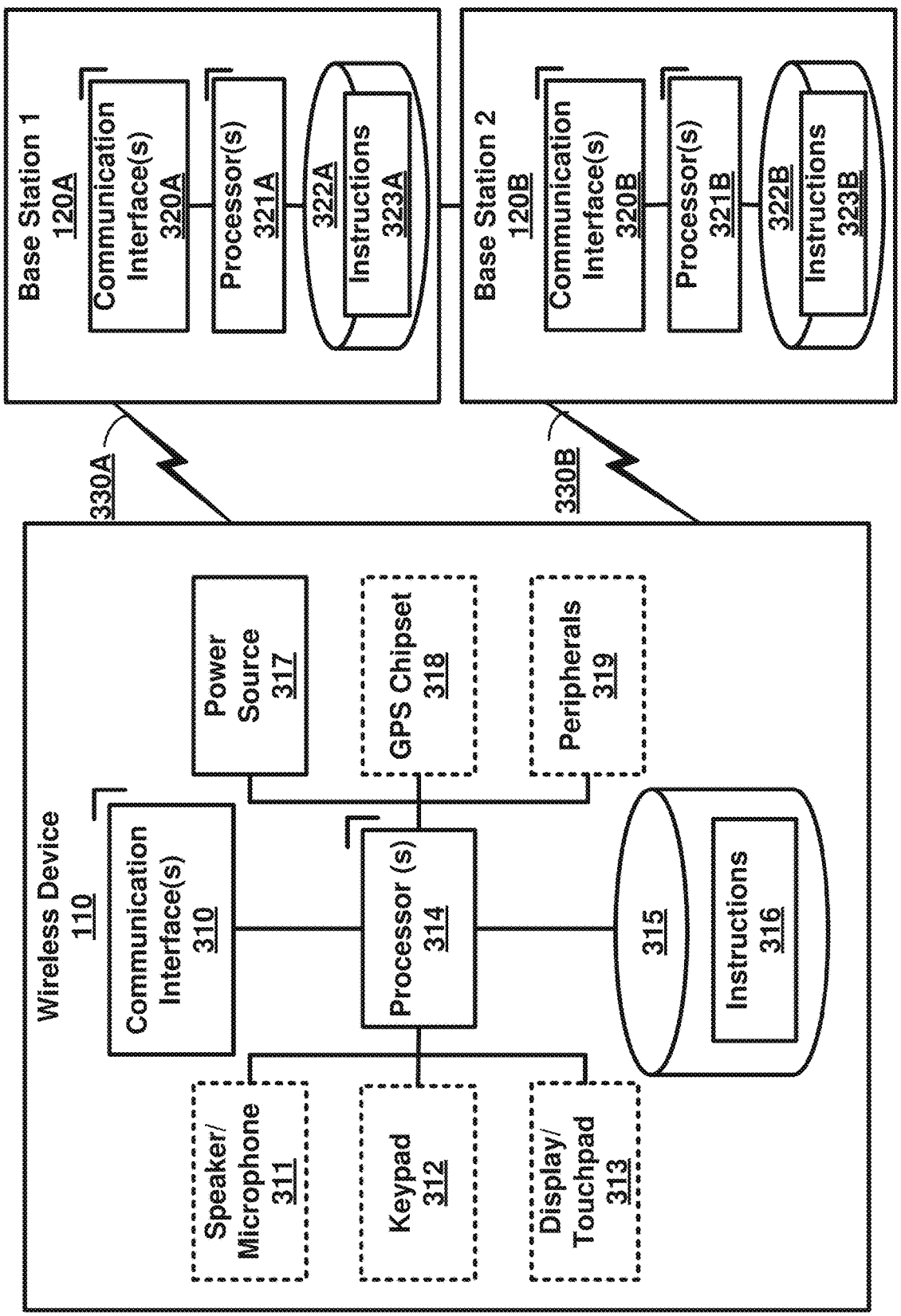
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a RA procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover, to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive TBs, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
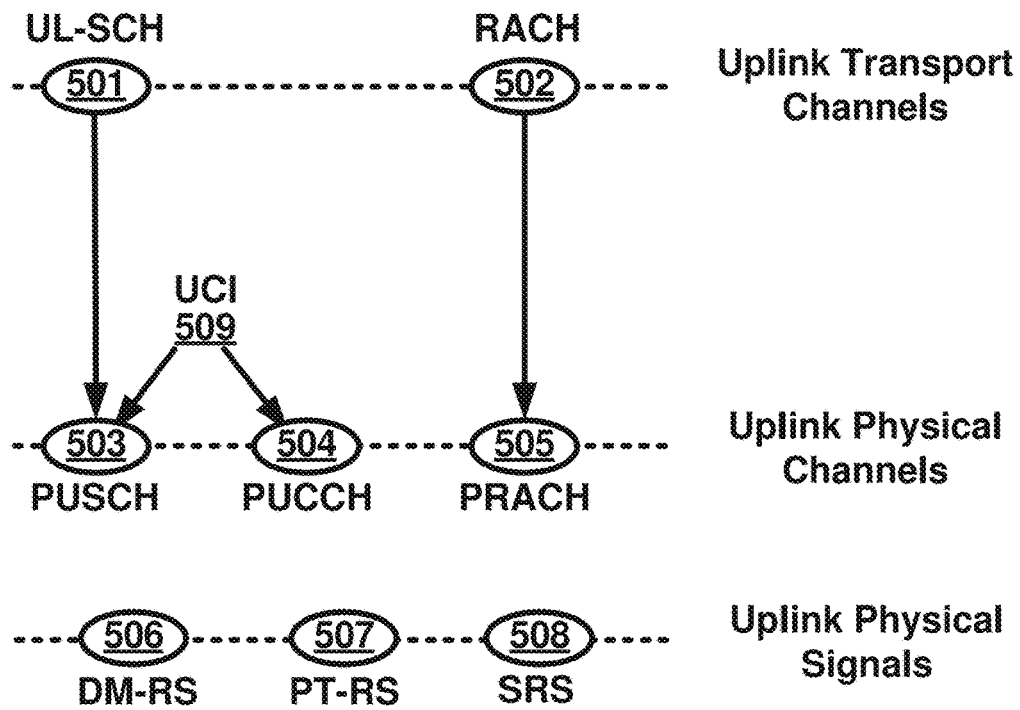
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
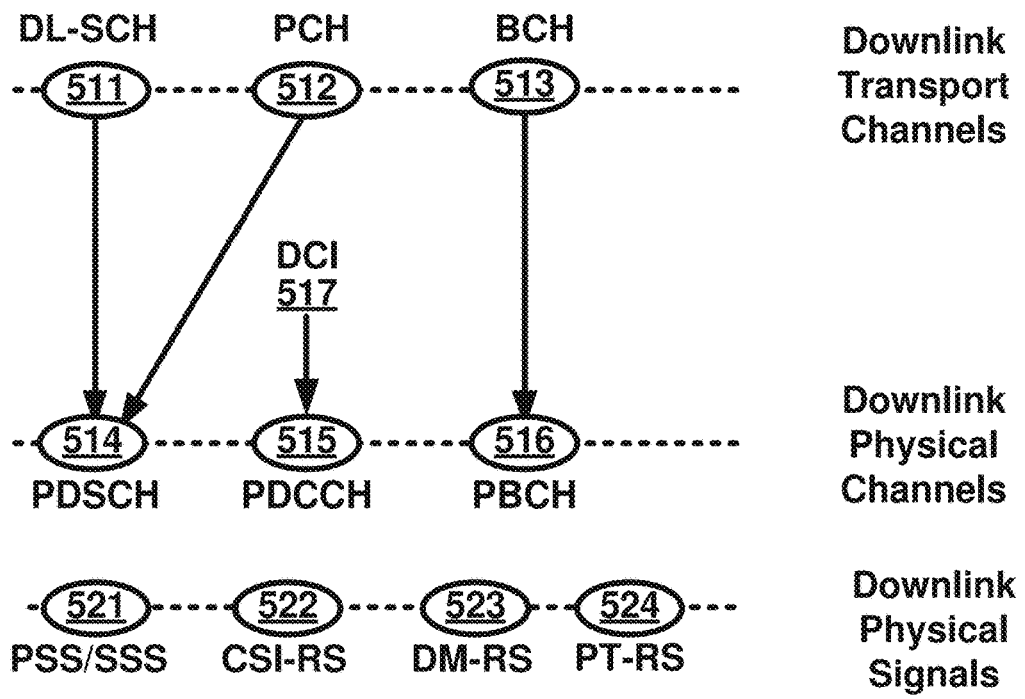
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
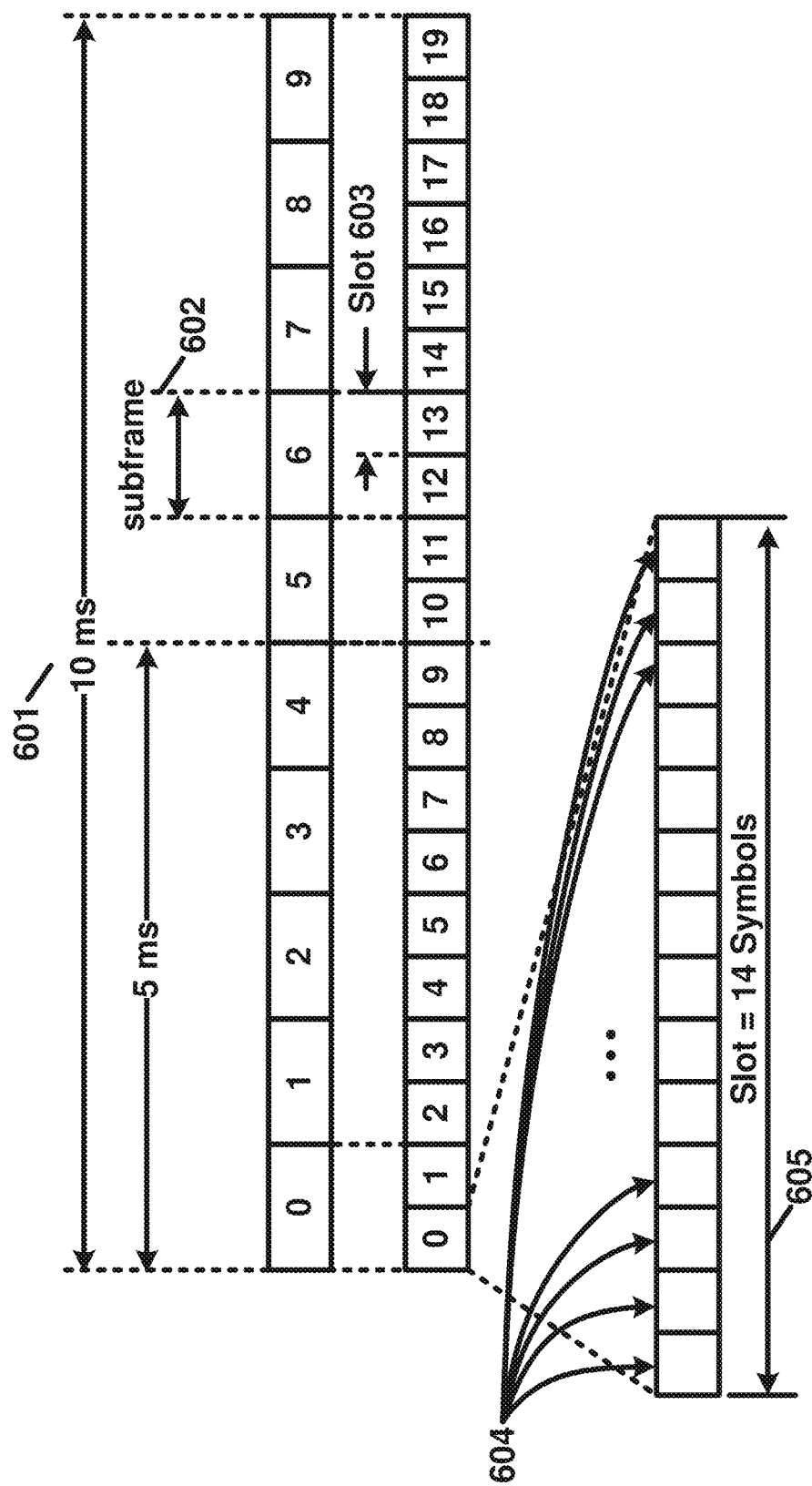
FIG. 6 shows an example transmission time and/or reception time for a carrier.

FIG. 6 shows an example frame structure, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame structure. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
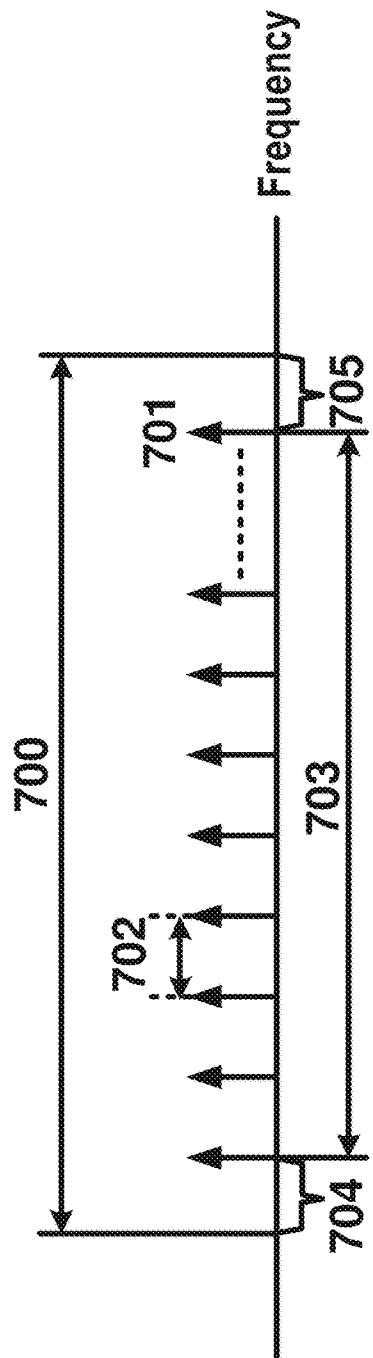
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
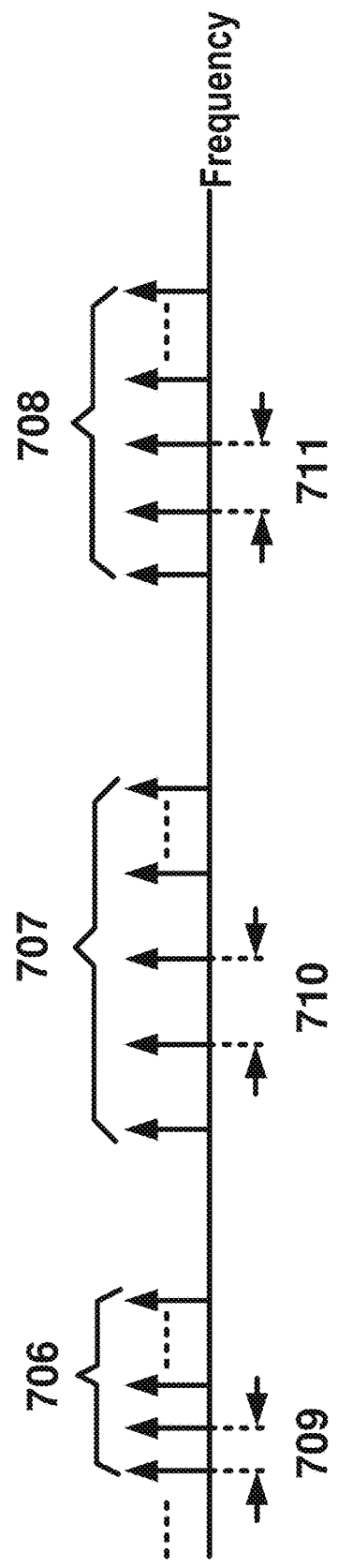

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
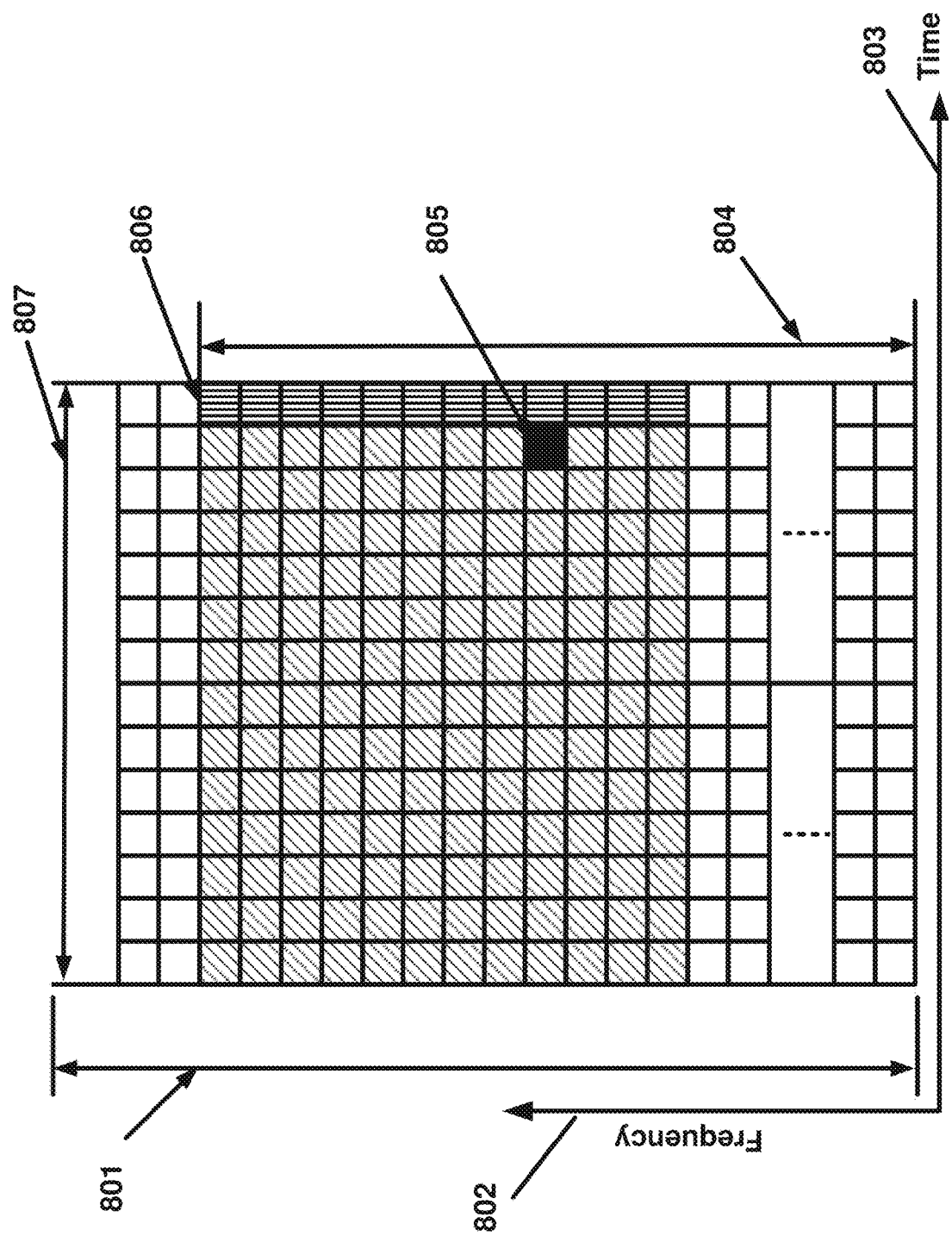
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a BWP of a carrier. A carrier may comprise multiple BWPs. A first BWP of a carrier may have a different frequency location and/or a different bandwidth from a second BWP of the carrier.

A base station may send (e.g., transmit), to a wireless device, a downlink control information comprising a downlink or uplink resource block assignment. A base station may send (e.g., transmit) to and/or receive from, a wireless device, data packets (e.g., TBs). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation.

The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more TBs. The DCI may indicate a downlink assignment indicating parameters for receiving one or more TBs. The DCI may be used by the base station to initiate a contention-free RA at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

FIG. 9B shows an example of a beam management procedure, such as a new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
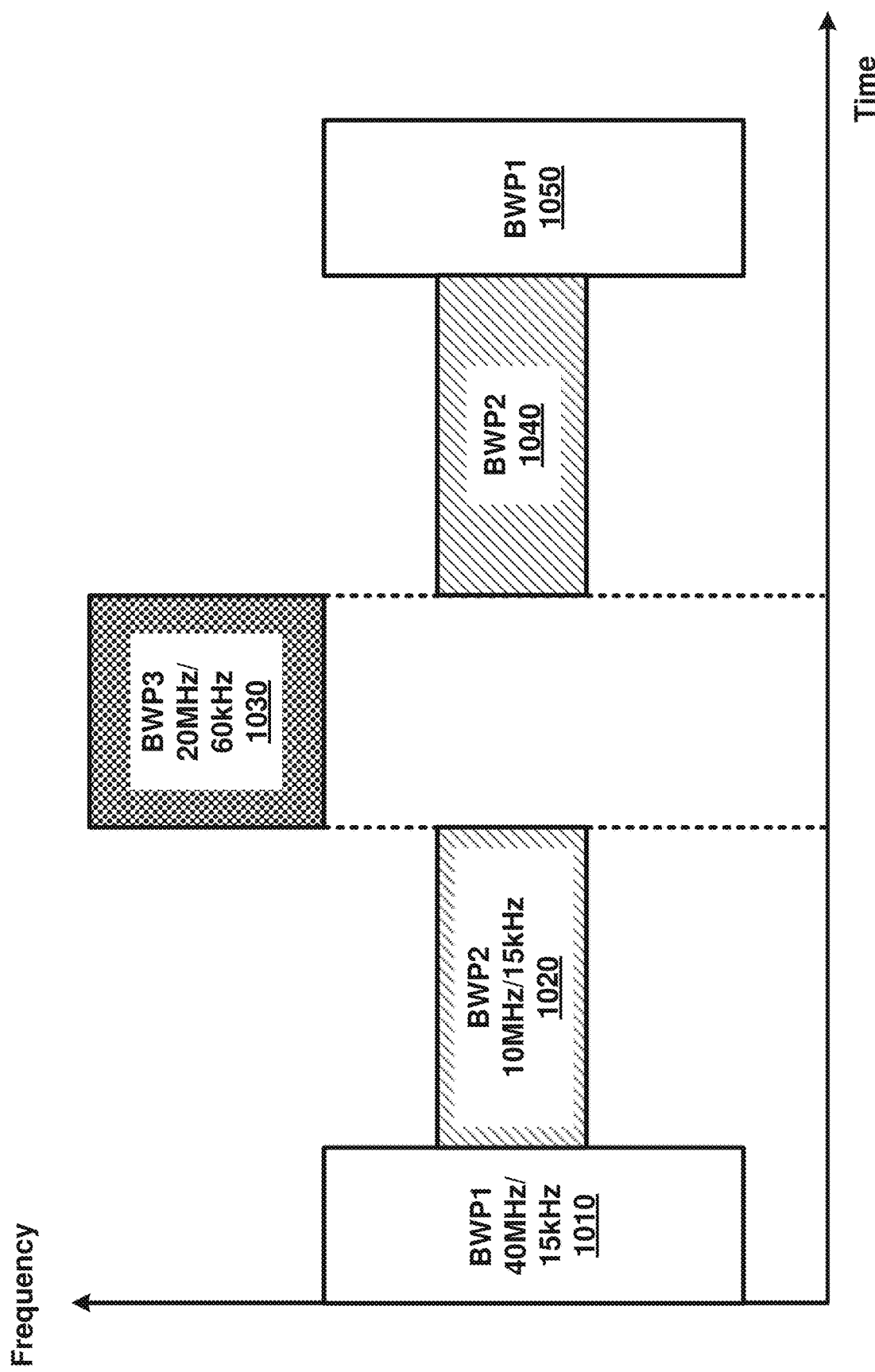
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a RA procedure. If a wireless device is configured with a secondary carrier on a primary cell, the wireless device may be configured with an initial BWP for RA procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
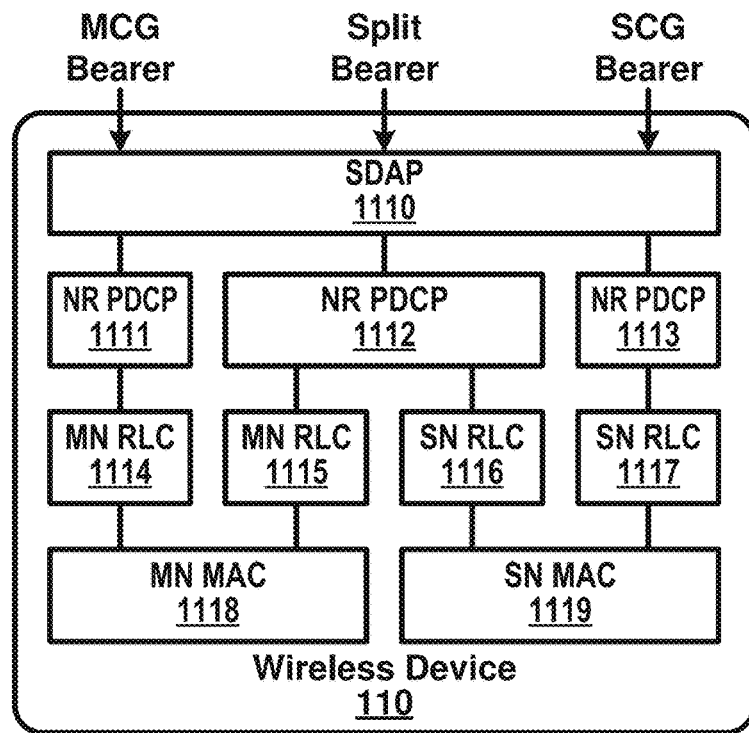
FIG. 11A and FIG. 11B show examples of multi connectivity.
Figure 11B:
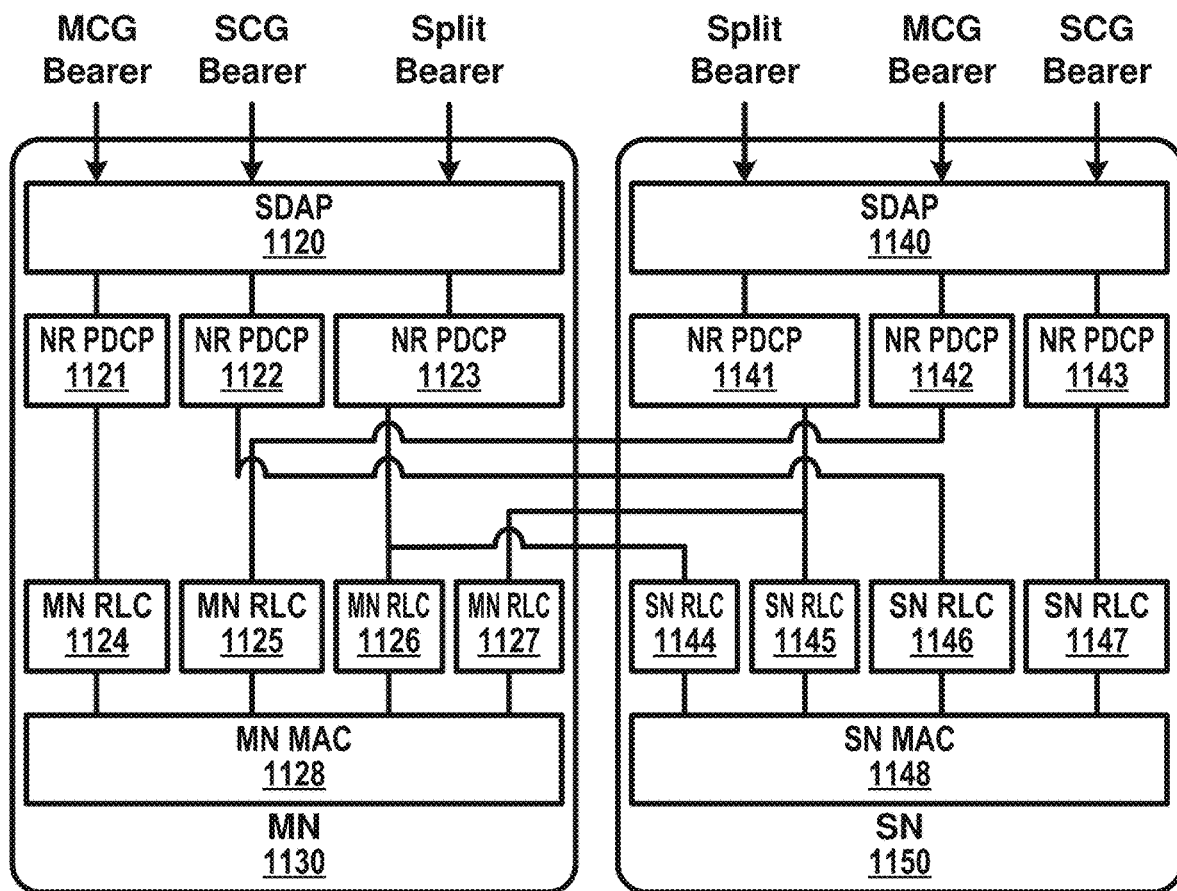

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1118).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a RA problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
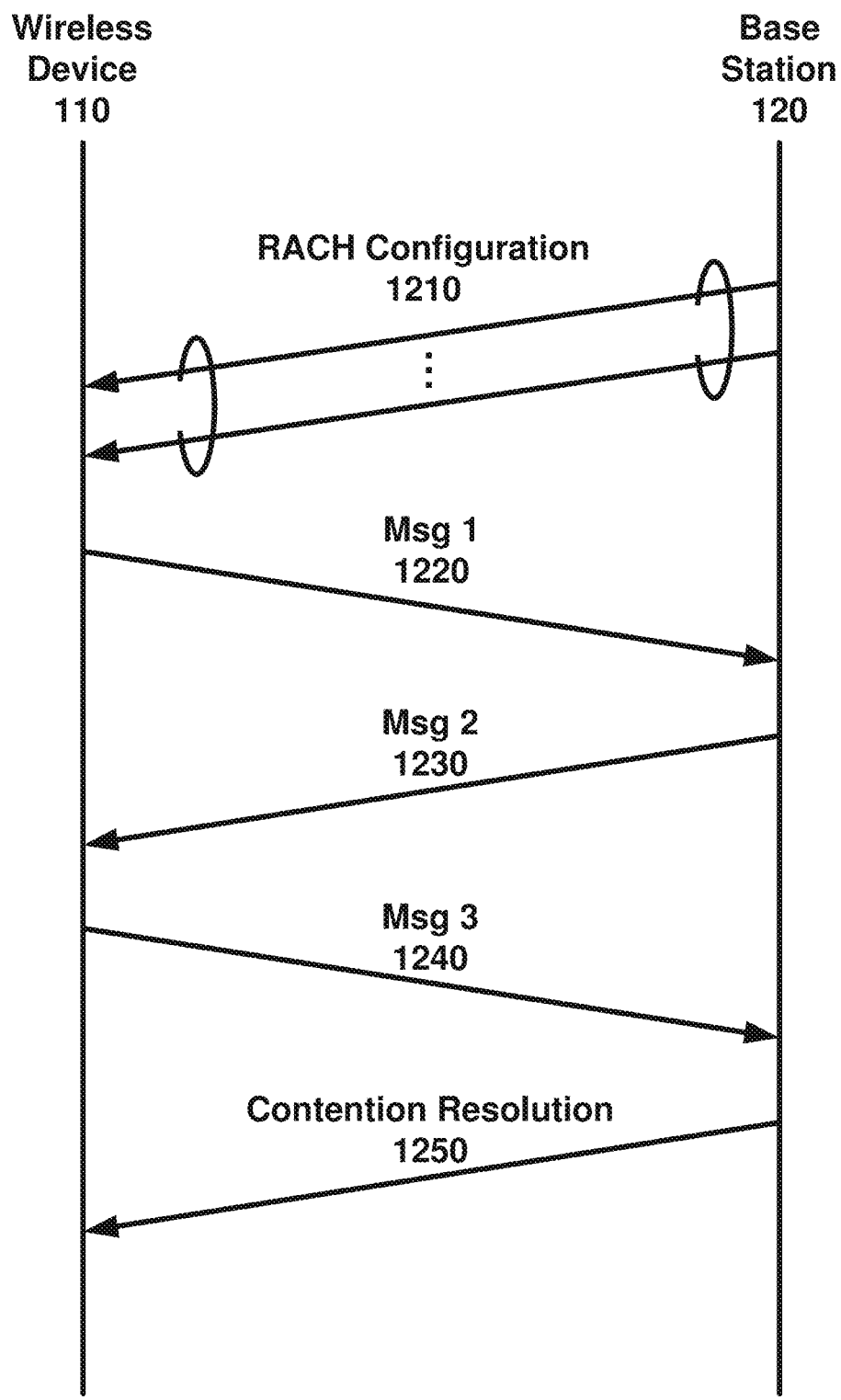
FIG. 12 shows an example of a random access procedure.

FIG. 12 shows an example of a RA procedure. One or more events may trigger a RA procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a RA procedure.

A RA procedure may comprise or be one of at least a contention based RA procedure and/or a contention free RA procedure. A contention based RA procedure may comprise one or more Msg 1 1220 transmissions, one or more Msg2 1230 transmissions, one or more Msg3 1240 transmissions, and contention resolution 1250. A contention free RA procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step RA procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step RA procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step RA procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble (RAP), initial preamble power (e.g., RAP initial received target power), an RSRP threshold for a selection of a SS block and corresponding PRACH resource, a power-ramping factor (e.g., RAP power ramping step), a RAP index, a maximum number of preamble transmissions, preamble group A and group B, a threshold (e.g., message size) to determine the groups of RAPs, a set of one or more RAPs for a system information request and corresponding PRACH resource(s) (e.g., if any), a set of one or more RAPs for a beam failure recovery request and corresponding PRACH resource(s) (e.g., if any), a time window to monitor RAR(s), a time window to monitor response(s) on a beam failure recovery request, and/or a contention resolution timer.

The Msg1 1220 may comprise one or more transmissions of a RAP. For a contention based RA procedure, a wireless device may select an SS block with an RSRP above the RSRP threshold. If RAPs group B exists, a wireless device may select one or more RAPs from a group A or a group B, for example, depending on a potential Msg3 1240 size. If a RAPs group B does not exist, a wireless device may select the one or more RAPs from a group A. A wireless device may select a RAP index randomly (e.g., with equal probability or a normal distribution) from one or more RAPs associated with a selected group. If a base station semi-statically configures a wireless device with an association between RAPs and SS blocks, the wireless device may select a RAP index randomly with equal probability from one or more RAPs associated with a selected SS block and a selected group.

A wireless device may initiate a contention free RA procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a RAP index corresponding to a selected SS block or a CSI-RS from a set of one or more RAPs for a beam failure recovery request, for example, if at least one of the SS blocks with an RSRP above a first RSRP threshold among associated SS blocks is available, and/or if at least one of CSI-RSs with a RSRP above a second RSRP threshold among associated CSI-RSs is available.

A wireless device may receive, from a base station, a RAP index via PDCCH or RRC for a contention free RA procedure. The wireless device may select a RAP index, for example, if a base station does not configure a wireless device with at least one contention free PRACH resource associated with SS blocks or CSI-RS. The wireless device may select the at least one SS block and/or select a RAP corresponding to the at least one SS block, for example, if a base station configures the wireless device with one or more contention free PRACH resources associated with SS blocks and/or if at least one SS block with a RSRP above a first RSRP threshold among associated SS blocks is available. The wireless device may select the at least one CSI-RS and/or select a RAP corresponding to the at least one CSI-RS, for example, if a base station configures a wireless device with one or more contention free PRACH resources associated with CSI-RSs and/or if at least one CSI-RS with a RSRP above a second RSPR threshold among the associated CSI-RSs is available.

A wireless device may perform one or more Msg1 1220 transmissions, for example, by sending (e.g., transmitting) the selected RAP. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected RAP via a selected PRACH occasions. The wireless device may determine a transmit power for a transmission of a selected RAP at least based on an initial preamble power and a power-ramping factor. The wireless device may determine an RA-RNTI associated with a selected PRACH occasion in which a selected RAP is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a RAR, Msg 2 1230. The wireless device may start a time window (e.g., ra-ResponseWindow) to monitor a RAR. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one RAR identified by a RA-RNTI, or for at least one response to a beam failure recovery request identified by a C-RNTI, at a time that a timer for a time window is running.

A wireless device may determine that a reception of RAR is successful, for example, if at least one RAR comprises a random access preamble identifier (RAPID) corresponding to a RAP sent (e.g., transmitted) by the wireless device. The wireless device may determine that the contention free RA procedure is successfully completed, for example, if a reception of a RAR is successful. The wireless device may determine that a contention free RA procedure is successfully complete, for example, if a contention free RA procedure is triggered for a beam failure recovery request and if a PDCCH transmission is addressed to a C-RNTI. The wireless device may determine that the RA procedure is successfully completed, and may indicate a reception of an acknowledgment for a system information request to upper layers, for example, if at least one RAR comprises a RAPID. The wireless device may stop sending (e.g., transmitting) remaining preambles (if any) after or in response to a successful reception of a corresponding RAR, for example, if the wireless device has signaled multiple preamble transmissions.

The wireless device may perform one or more Msg 3 1240 transmissions, for example, after or in response to a successful reception of RAR (e.g., for a contention based RA procedure). The wireless device may adjust an uplink transmission timing, for example, based on a timing advanced command indicated by a RAR. The wireless device may send (e.g., transmit) one or more TBs, for example, based on an uplink grant indicated by a RAR. Subcarrier spacing for PUSCH transmission for Msg3 1240 may be provided by at least one higher layer (e.g., RRC) parameter. The wireless device may send (e.g., transmit) a RAP via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same RAR comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a RA procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1240, the wireless device may determine that the contention resolution (e.g., comprising contention resolution 1250) is successful and/or the wireless device may determine that the RA procedure is successfully completed.

RA procedures may be used to establish communications between a wireless device and a base station associated with a cell. A four-step RA procedure (e.g., such as shown in FIG. 12 and described above) may have an associated latency. The associated latency for the four-step RA procedure may be a minimum of a quantity (e.g., fourteen or any other quantity) of transmission time intervals (TTIs). A ITT may be any transmission time interval or other time duration. A minimum latency of fourteen TTIs may comprise, for example, three TTIs after a message from step 1 1220 of a four-step RA procedure, one TTI for a message from step 2 1230 of a four-step RA procedure, five TTIs after the message from step 2, one TTI for a message from step 3 1240 of a four-step RA procedure, three TTIs after the message from step 3, and one TTI for a message from step 4 1250 of a four-step procedure (e.g., 3+1+5+1+3+1=14). The minimum latency may comprise any quantity of TTIs. Any of the above-references messages may comprise any quantity of TTIs. Reducing the number of steps in an RA procedure may reduce latency. A four-step RA procedure may be reduced to a two-step RA procedure, for example, by using parallel transmissions. A two-step RA procedure may have an associated latency. The associated latency for a two-step RA procedure may be a minimum of four TTIs and which may be less than an associated latency for a four-step RA procedure. A minimum latency of four TTIs may be a minimum of a quantity (e.g., four or any other quantity) of TTIs. A minimum latency of four TTIs may comprise, for example, three TTIs after a message from step 1 of a two-step RA procedure, and one TTI for a message from step 2 of a two-step RA procedure.

Figure 13:
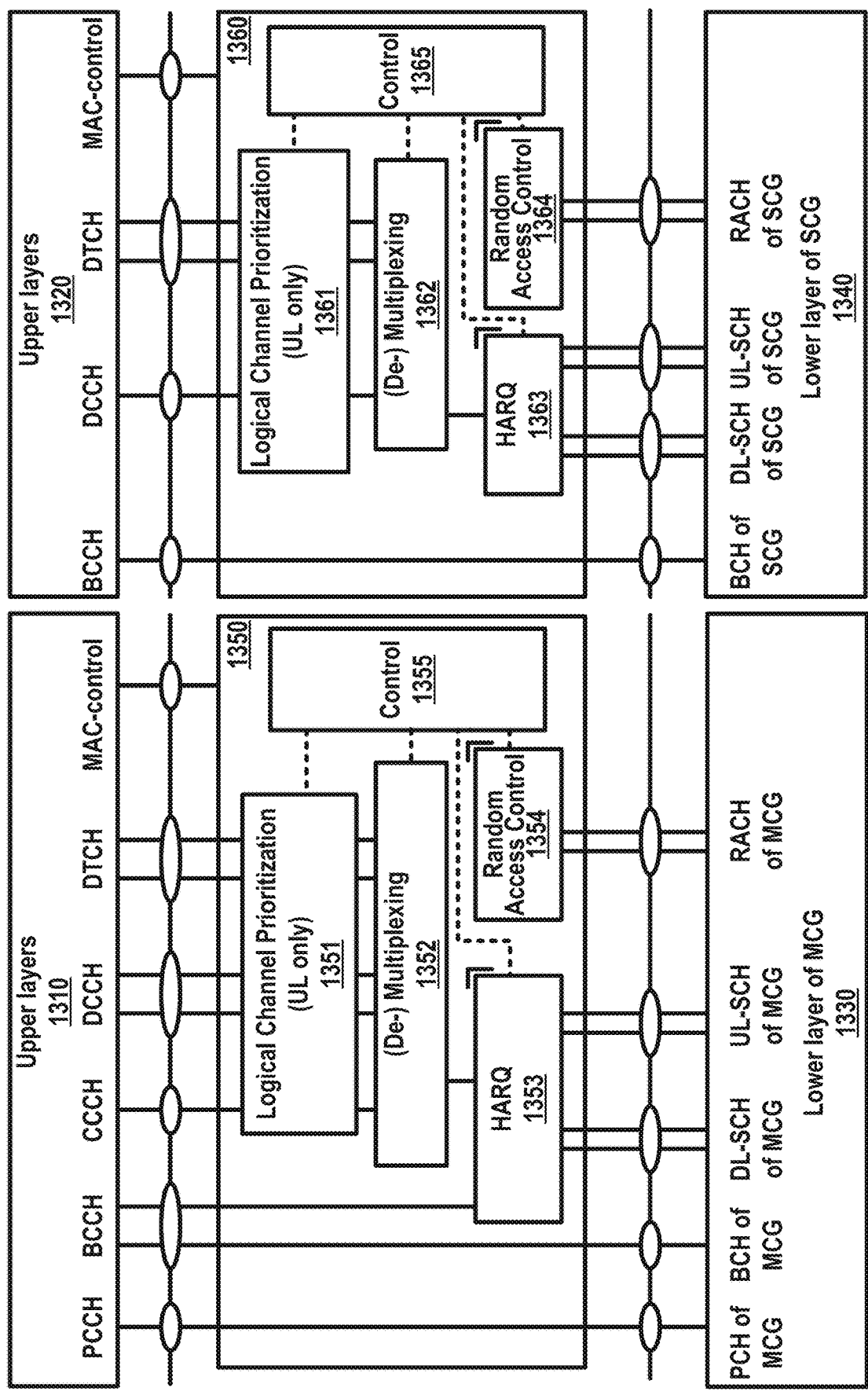
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a RA problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto TBs to be delivered to the physical layer on transport channels (e.g., in uplink), demultiplexing (e.g., (De-) Multiplexing 1352 and/or (De-) Multiplexing 1362) of MAC SDUs to one or different logical channels from TBs delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a RA process (e.g., Random Access Control 1354 and/or Random Access Control 1364).

Figure 14:
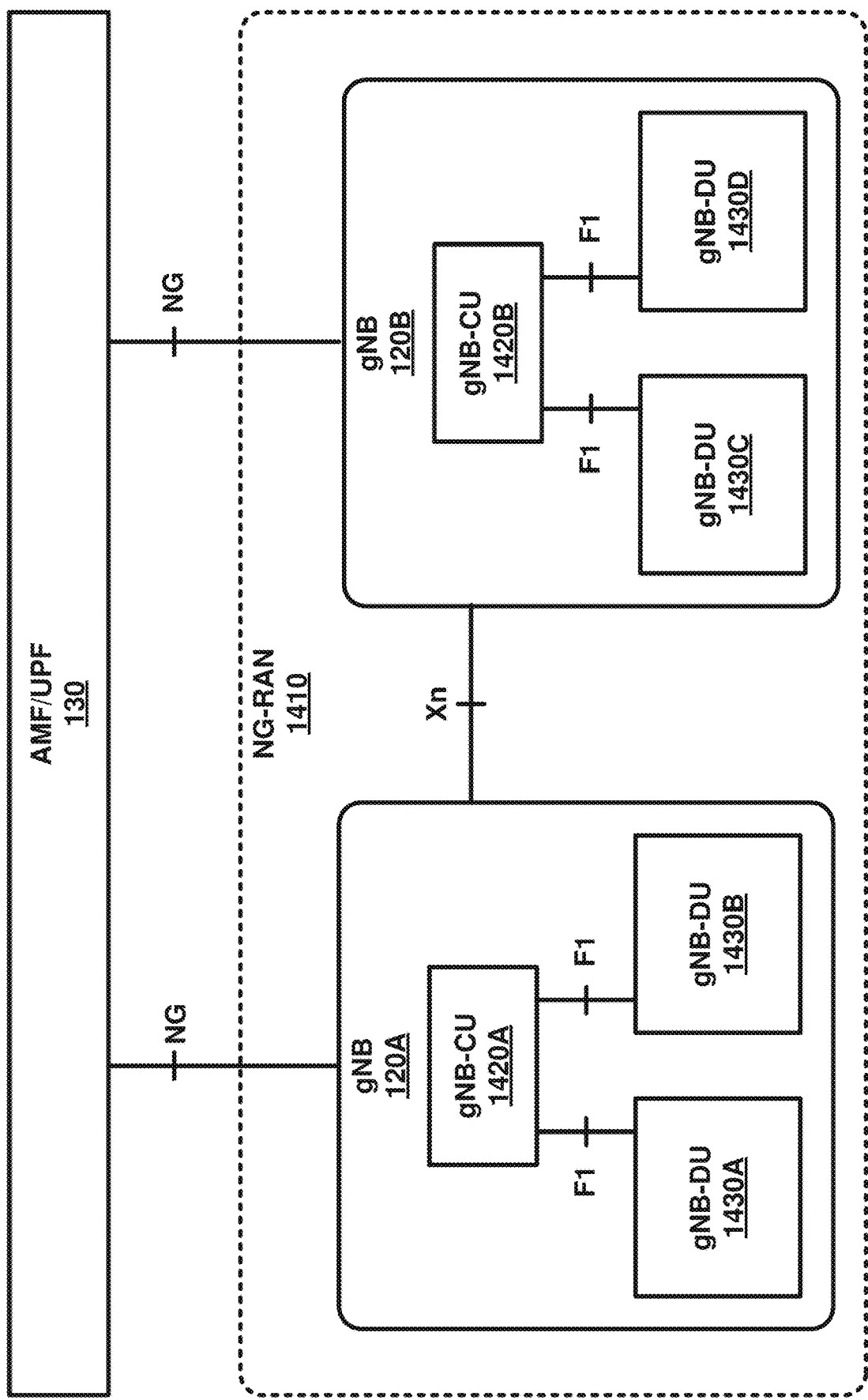
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
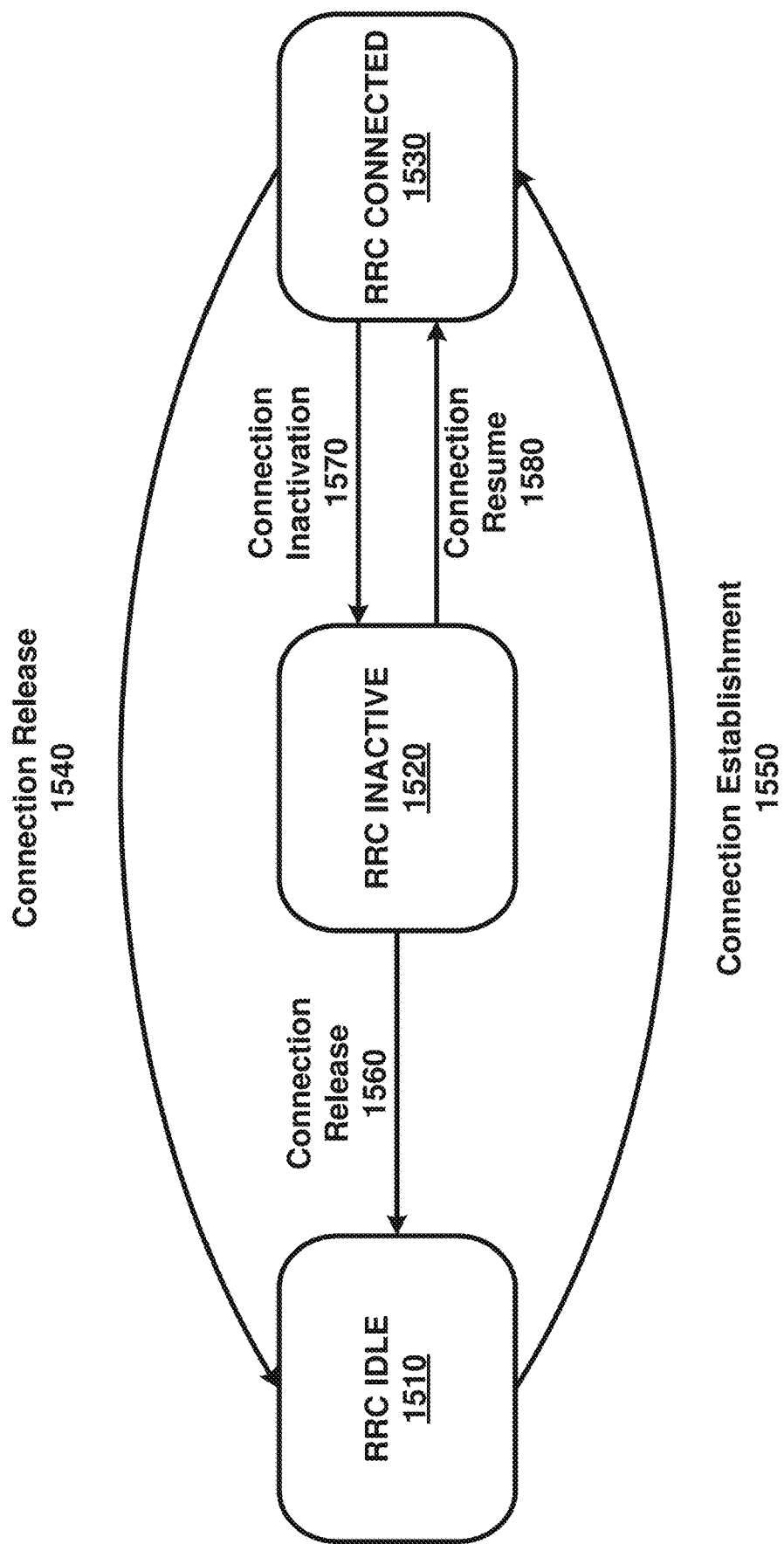
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a RA procedure by the wireless device and/or a context retrieve procedure (e.g., UE context retrieve). A context retrieve procedure may comprise: receiving, by a base station from a wireless device, a RAP; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a RA procedure to resume an RRC connection and/or to send (e.g., transmit) one or more packets to a base station (e.g., to a network). The wireless device may initiate a RA procedure to perform an RNA update procedure, for example, if a cell selected belongs to a different RNA from an RNA for the wireless device in an RRC inactive state. The wireless device may initiate a RA procedure to send (e.g., transmit) one or more packets to a base station of a cell that the wireless device selects, for example, if the wireless device is in an RRC inactive state and has one or more packets (e.g., in a buffer) to send (e.g., transmit) to a network. A RA procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer, multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

Figure 16:
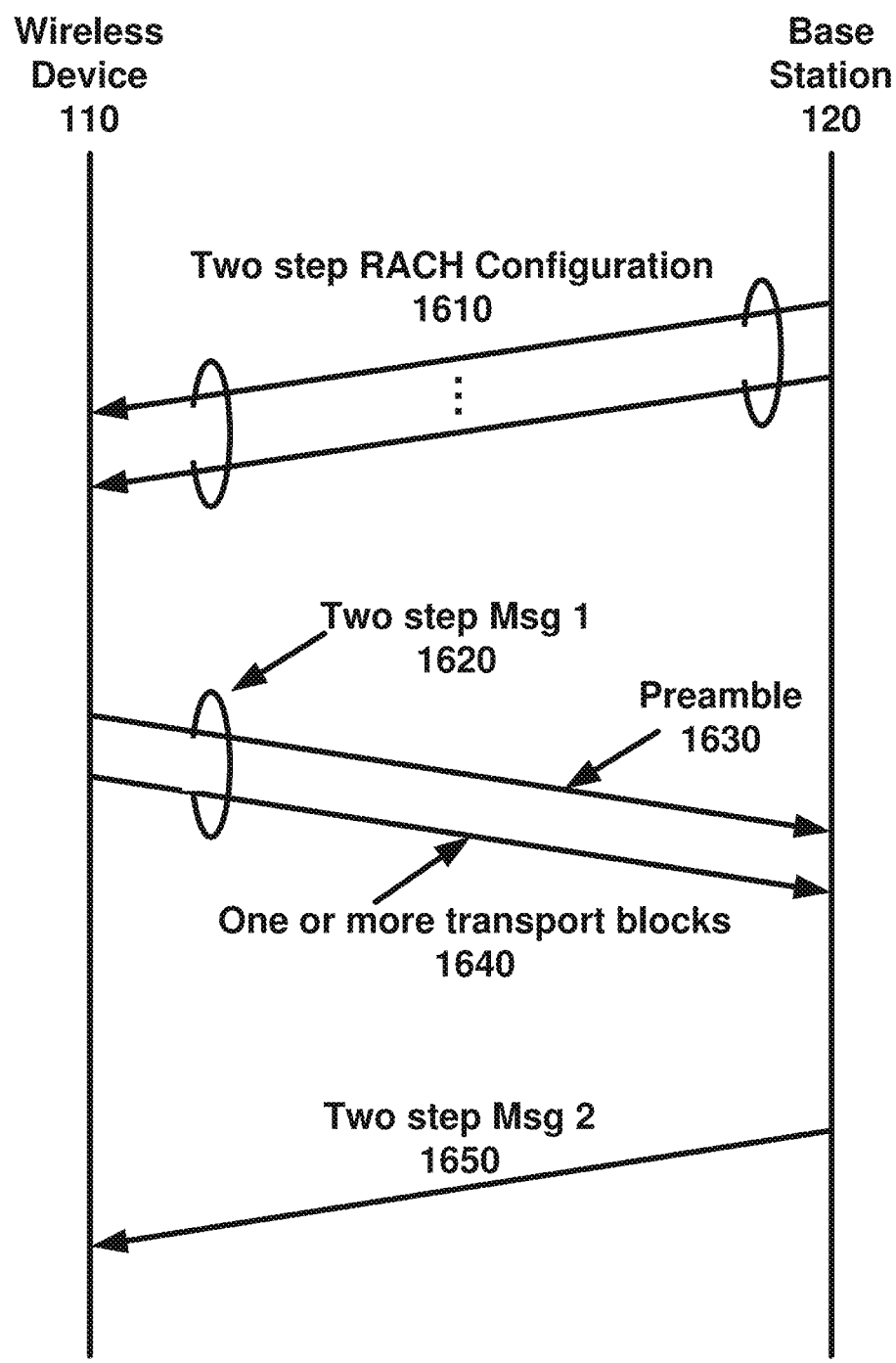
FIG. 16 shows an example of a two-step RA procedure.

FIG. 16 shows an example of a two-step RA procedure. The procedure may comprise an uplink (UL) transmission of a two-step Msg1 1620, for example, based on a two-step RACH configuration 1610 from a base station. The two-step Msg1 1620 may be referred to as message A (e.g., Msg A). The transmission may comprise a RAP transmission 1630 and one or more TBs for transmission 1640. The UL transmission may be followed by a downlink (DL) transmission of a two-step Msg2 1650 that may comprise a response (e.g., random access response (RAR)) corresponding to the uplink transmission. The two-step Msg2 1650 may be referred to as a message B (e.g., Msg B). The response may comprise contention resolution information.

A wireless device may receive (e.g., from a base station) one or more RRC messages to configure one or more parameters of a two step RACH configuration 1610. The one or more RRC messages may be broadcasted or multicasted to one or more wireless devices. The one or more RRC messages may be wireless device-specific messages (e.g., a dedicated RRC message sent (e.g., transmitted) to a wireless device indicating RRC INACTIVE 1520 or RRC CONNECTED 1530). The one or more RRC messages may comprise parameters for sending (e.g., transmitting) a two-step Msg1 1620. The parameters may indicate one or more of following: PRACH resource allocation, preamble format, SSB information (e.g., total number of SSBs, downlink resource allocation of SSB transmission, transmission power of SSB transmission, and/or other information), and/or uplink radio resources for one or more TB transmissions.

A base station may receive (e.g., from a wireless device via a cell), a RAP transmission for UL time alignment and/or one or more TBs (e.g., delay-sensitive data, wireless device ID, security information, device information such as IMSI, and/or other information), for example, in the UL transmission of a two-step RA procedure. A base station may send (e.g., transmit) a two-step Msg2 1650 (e.g., an RAR), for example, in the DL transmission of the two-step RA procedure. The two-step Msg2 1650 (e.g., an RAR) may comprise at least one of following: a timing advance command indicating the TA value, a power control command, an UL grant (e.g., radio resource assignment, and/or MCS), a wireless device ID for contention resolution, an RNTI (e.g., C-RNTI or TC-RNTI), and/or other information. The two-step Msg2 1650 (e.g., an RAR) may comprise a preamble identifier corresponding to the preamble 1630, a positive or negative acknowledgement of a reception of the one or more TBs 1640, and/or an indication of a successful decoding of the one or more TBs 1640. A two-step RA procedure may reduce RA latency compared with a four-step RA procedure for example, by integrating a RAP transmission (such as a process to obtain a timing advance value) with one or more TB transmissions.

A base station may receive (e.g., from a wireless device via a cell) an RAP in parallel with one or more TBs, for example, in the UL transmission of a two-step RA procedure. The wireless device may acquire one or more configuration parameters for the UL transmission before the wireless device starts a two-step RA procedure (e.g., at step 1610 in FIG. 16). The one or more configuration parameters may indicate one or more of following: PRACH resource allocation, preamble format, SSB information (e.g., a number of transmitting SSBs, downlink resource allocation of SSB transmissions, transmission power of SSB transmission, and/or other information), uplink radio resources (e.g., in terms of time, frequency, code/sequence/signature) for one or more TB transmissions, and/or power control parameters of one or more TB transmissions (e.g., cell and/or wireless device specific power adjustments used for determining (e.g., calculating) received target power, inter-cell interference control parameter that may be used as a scaling factor of pathloss measurement, reference signal power to determine (e.g., calculate for) pathloss measurement, and/or one or more margins).

A wireless device may generate an RAP. A two-step RACH configuration may comprise RAP generating parameters (e.g., a root sequence) that may be employed by the wireless device to generate an RAP. The wireless device may use the RAP generating parameters to generate one or more candidate preambles and may randomly select one of the candidate preambles as the RAP. The RAP generating parameters may be SSB-specific and/or cell-specific. RAP generating parameters for a first SSB may be different from or the same as RAP generating parameters for a second SSB. A base station may send (e.g., transmit) a control message (e.g., RRC message for a handover, and/or a PDCCH order for a secondary cell addition) that comprises a preamble index indicating an RAP dedicated to a wireless device to initiate a two-step RA procedure. The one or more candidate preambles may be organized into groups that may indicate an amount of data for transmission. The amount of data may indicate one or more TBs that remain in the buffer. Each of the groups may be associated with a range of data size. A first group of the groups may comprise RAPs indicated for small data transmissions. A second group may comprise RAPs indicated for larger data transmissions. A wireless device may determine a group of RAPs by comparing one or more thresholds and an amount of data, for example, based on an RRC message comprising one or more thresholds (e.g., transmitted by a based station). The wireless device may be able to indicate a size of data the wireless device may have for transmission, for example, by sending (e.g., transmitting) an RAP from a specific group of RAPs.

In a two-step RA procedure, a wireless device may send (e.g., transmit) a RAP via a RACH resource indicated by a two-step RACH configuration. The wireless device may send (e.g., transmit) one or more TBs via an UL radio resource indicated by a two-step RACH configuration. The transmission of the RAP may be overlapped in time (e.g., partially or entirely) with the transmission of the one or more TBs. The two-step RACH configuration may indicate a portion of overlapping of radio resources between the RAP and one or more TB transmissions. The two-step RACH configuration may indicate one or more UL radio resources associated with one or more RAPs (and/or RAP groups) and/or the RACH resource. A wireless device may determine at least one UL radio resource in which the wireless device may send (e.g., transmit) one or more TBs as a part of a two-step RACH procedure, for example, based on a selection of an RAP, an RAP group, and/or an RACH resource The one or more UL radio resources may be indicated based on a frame structure (such as shown in FIG. 6), and/or OFDM radio structure (such as shown in FIG. 8), The indication may be with respect to an SFN (e.g., SFN=0), slot number, and/or OFDM symbol number for a time domain radio resource, and/or with respect to a subcarrier number, a number of resource elements, a number of resource blocks, RBG number, and/or frequency index for a frequency domain radio resource. The one or more UL radio resources may be indicated based on a time offset and/or a frequency offset with respect to one or more RACH resources of a selected RAP. The UL transmissions may occur (e.g., in the same subframe or slot/mini-slot) in consecutive subframes (or slot/mini-slot), or in the same burst.

A PRACH resource and one or more associated UL radio resources for a two-step Msg1 may be allocated with a time offset and/or frequency offset, for example, such as provided (e.g., configured, determined, indicated, etc.) by RRC messages (e.g., as a part of RACH config.) and/or predefined (e.g., as a mapping table).

FIG. 17A, FIG. 17B, and FIG. 17C show examples of radio resource allocations of a random access resource (e.g., PRACH) 1702 and one or more associated radio resources 1704. UL radio resources may be based on a time offset 1706, a frequency offset 1708, and a combination of a time offset 1706 and a frequency offset 1708, respectively. FIG. 17A, FIG. 17B, and FIG. 17C comprise a PRACH resource 1702 and a UL radio resource 1704 that are associated with a single SSB transmission. The PRACH resource 1702 and/or the UL radio resource 1704 may be associated with a first SSB transmission of one or more SSB transmissions.

A base station may acquire a UL transmission timing, for example, by detecting an RAP sent (e.g., transmitted) PRACH resource 1702 based on the time offset 1706 and/or the frequency offset 1708. A base station may detect and/or decode one or more TBs sent (e.g., transmitted) via one or more associated UL radio resources 1704, for example, based on the UL transmission timing acquired from the RAP detection. A base station may send (e.g., transmit) one or more SSBs. Each of the one or more SSBs may have one or more associated PRACH resources 1702 and/or UL radio resources 1704 provided by (e.g., configured by, indicated by, etc.) a two-step RACH configuration. A wireless device may measure one or more SSBs. The wireless device may select at least one SSB, for example, based on measured received signal strength (and/or based on other selection rule). The wireless device may respectively send (e.g., transmit) an RAP and/or one or more TBs: via PRACH resources 1702 associated with the at least one SSB, and/or via UL radio resources 1704 associated with the PRACH resources 1702 and/or UL radio resources 1704 associated with the at least one SSB.

A base station may use the RAP transmission to adjust UL transmission time for a cell and/or to aid in channel estimation for one or more TBs. A portion of the UL transmission for one or more TBs in a two-step RACH procedure may comprise one or more of: a wireless device ID, a C-RNTI, a service request such as buffer state reporting (e.g., a buffer status report) (BSR), a user data packet, and/or other information. A wireless device in an RRC CONNECTED state may use a C-RNTI as an identifier of the wireless device (e.g., a wireless device ID). A wireless device in an RRC INACTIVE state may use a C-RNTI (if available), a resume ID, and/or a short MACID as an identifier of the wireless device. A wireless device in an RRC IDLE state may use a C-RNTI (if available), a resume ID, a short MACID, an IMSI (International Mobile Subscriber Identifier), a T-IMSI (Temporary-IMSI), and/or a random number as an identifier of the wireless device.

In a two-step RACH procedure, the UL transmission may comprise one or more TBs that may be sent (e.g., transmitted) in one or more ways. First resource(s) allocated for one or more TBs may be multiplexed with second resource(s) allocated for an RAP transmission in time and/or frequency domains. One or more resources may be configured (e.g., by a base station) to be reserved for the UL transmission that may be indicated to a wireless device before the UL transmission. A base station may send (e.g., transmit) in a two-step Msg2 1650 (e.g., an RAR) that may comprise a contention resolution message and/or an acknowledgement (ACK or NACK) message of the one or more TBs, for example, based on one or more TBs sent (e.g., transmitted) by a wireless device in a two-step Msg1 1620 of a two-step RA procedure. A wireless device may send (e.g., transmit) one or more second TBs after the reception of an RAR. The wireless device may send (e.g., transmit) an indicator, such as buffer state reporting, in a two-step Msg1 1620 of a two-step RA procedure. The indicator may indicate to a base station an amount of data the wireless device to send (e.g., transmit) and/or an amount of data remains in a buffer. The base station may determine a UL grant based on the indicator. The wireless device may receive (e.g., from a base station) the UL grant to via an RAR.

A wireless device may receive two separate responses in a two-step/RA procedure: a first response for RAP transmission, and a second response for one or more TB transmission. A wireless device may monitor or continue to monitor a common search space to detect the first response with a random access RNTI generated based on time and frequency indices of a PRACH resource in which the wireless device may send (e.g., transmit) an RAP. A wireless device may monitor or continue to monitor a common search space and/or a wireless device specific search space to detect the second response. The wireless device may employ a C-RNTI (e.g., if configured) and/or a random access RNTI generated based on one or more time indices and/or one or more frequency indices of a PRACH resource in which the wireless device may send (e.g., transmit) an RAP, for example, to detect the second response. The wireless device-specific search space may be predefined and/or configured by an RRC message.

One or more events may trigger a two-step RA procedure. The one or more events may be one or more of: an initial access from RRC_IDLE, a RRC connection re-establishment procedure, a handover, a DL or a UL data arrival during RRC_CONNECTED if UL synchronization status is non-synchronized, a transition from RRC_Inactive, a beam failure recovery procedure, and/or a request for other system information. A PDCCH order, a wireless device (e.g., a MAC entity of a wireless device), and/or a beam failure indication may initiate a RA procedure.

A two-step RA procedure may be initiated based on one or more case-based procedures, services, or radio conditions. One or more wireless devices may be configured (e.g., by a base station in the cell under its coverage) to use a two-step RA procedure, for example, based on a cell identified and/or indicated as small (e.g., there may be no need for a TA). A wireless device may acquire the configuration, via one or more RRC messages (e.g., system information blocks, multicast and/or unicast RRC signaling), and/or via L1 control signaling (e.g., PDCCH order) used to initiate a two-step RA procedure.

A wireless device (e.g., a stationary or near stationary wireless device such as a sensor-type wireless device) may have a stored and/or persisted TA value. A two-step RA procedure may be initiated based on the stored and/or persisted TA value. A base station having macro coverage may use broadcasting and/or dedicated signaling to configure a two-step RA procedure with one or more wireless devices having stored and/or persisted TA values under the coverage.

A wireless device in an RRC connected state may perform a two-step RA procedure. The two-step RA procedure may be initiated if a wireless device performs a handover (e.g., network-initiated handover), and/or if the wireless device requires or requests a UL grant for a transmission of delay-sensitive data and there are no physical-layer uplink control channel resources available to send (e.g., transmit) a scheduling request. A wireless device in an RRC INACTIVE state may perform a two-step RA procedure for example, for a small data transmission while remaining in the RRC INACTIVE state or for resuming a connection. A wireless device may initiate a two-step RA procedure, for example, for initial access such as establishing a radio link, re-establishment of a radio link, handover, establishment of UL synchronization, and/or a scheduling request if there is no UL grant.

The following description presents one or more examples of a RACH procedure. The procedures and/or parameters described in the following may not be limited to a specific RA procedure. The procedures and/or parameters described in the following may be applied for a four-step RA procedure and/or a two-step RA procedure. A RA procedure may refer to a four-step RA procedure and/or a two-step RA procedure in the following description.

A wireless device may receive (e.g., from a base station) one or more messages indicating RA parameters of a four-step RA procedure (such as shown in FIG. 12) and/or a two-step RA procedure (such as shown in FIG. 16). The one or more messages may be a broadcast RRC message, a wireless device specific RRC message, and/or a combination thereof. The one or more messages may comprise a RA configuration (e.g., at least one of: RACH-ConfigCommon, RACH-ConfigGeneric, and/or RACH-ConfigDedicated). A wireless device may receive, from a base station, a common and/or a generic random access resource configuration (e.g., at least RACH-ConfigCommon and/or RACH-ConfigGeneric), for example, based on a contention based (e.g., four-step and/or a two-step) RA procedure. A wireless device may receive, from a base station, a dedicated random access resource configuration (e.g., at least RACH-ConfigDedicated), for example, based on a contention free (four-step and/or a two-step) RA procedure.

A base station may send (e.g., transmit), to a wireless device, one or more messages indicating RA parameters. The one or more messages may be broadcast via RRC message, via wireless device specific RRC message, and/or via a combination thereof. The one or more messages may comprise at least one of a common, generic, and/or dedicated random access resource configuration (e.g., RACH-ConfigCommon, RACH-ConfigGeneric, and/or RACH-ConfigDedicated). A wireless device may receive, from a base station, a common and/or a generic random access resource configuration (e.g., RACH-ConfigCommon and/or RACH-ConfigGeneric), for example, for a contention based RA procedure. A wireless device may receive, from a base station, at least a dedicated random access resource configuration (e.g., RACH-ConfigDedicated), for example, for a contention free RA procedure.

FIG. 18 shows an example common random access resource configuration (e.g., a RACH-ConfigCommon IE). FIG. 19 shows example field descriptions of a common random access resource configuration (e.g., a RACH-ConfigCommon IE). FIG. 20 shows an example generic random access resource configuration (e.g., a RACH-ConfigGeneric IE), and example field descriptions. FIG. 21 shows an example dedicated random access resource configuration (e.g., a RACH-ConfigDedicated IE). FIG. 22 shows example field descriptions of the dedicated random access resource configuration (e.g., RACH-ConfigDedicated).

A RA procedure may be initiated in different ways, for example, based at least on one of a common random access resource configuration (e.g., RACH-ConfigCommon), a generic random access resource configuration (e.g., RACH-ConfigGeneric), and/or a dedicated random access resource configuration (e.g., RACH-ConfigDedicated). The RA procedure may be initiated by a PDCCH order sent (e.g., transmitted) by a base station, by the wireless device (e.g., a MAC entity of a wireless device) of a wireless device, and/or by RRC. A RA procedure may be ongoing at any point in time in a wireless device (e.g., a MAC entity of a wireless device). A RA procedure on an SCell may be initiated by a PDCCH order with an index (e.g., ra-PreambleIndex) different from 0b000000. The wireless device may continue with the ongoing procedure and/or start with the new procedure (e.g. for an SI request), for example, if the wireless device (e.g., a MAC entity of a wireless device) receives a request for a RA procedure at a time that another RA procedure is already ongoing in the wireless device (e.g., a MAC entity of a wireless device).

A base station may send (e.g., transmit) one or more RRC messages to configure a wireless device that include one or more parameters. A random access index parameter (e.g., prach-ConfigIndex) may indicate an available set of random access resource occasions (e.g., PRACH occasions) for transmission of the RAP. A random access power parameter (e.g., preambleReceivedTargetPower) may indicate an initial RAP power.

A RSRP SSB threshold parameter (e.g., rsrp-ThresholdSSB) may indicate an RSRP threshold for a selection of the SSB and corresponding RAP and/or random access resource occasion (e.g., PRACH occasion). The RSRP SSB threshold parameter may refer to a RSRP SSB threshold parameter in a beam failure recovery configuration (e.g., BeamFailureRecoveryConfig IE), for example, if the RA procedure is initiated for beam failure recovery.

A RSRP CSI-RS threshold parameter (e.g., rsrp-ThresholdCSI-RS) may indicate an RSRP threshold for the selection of CSI-RS and corresponding RAP and/or random access resource occasion (e.g., PRACH occasion). A RSRP CSI-RS threshold parameter may be set to a value calculated by multiplying the RSRP CSI-RS threshold parameter in a beam failure recovery configuration (e.g., BeamFailureRecoveryConfig IE) by a power control offset parameter (e.g., powerControlOffset), for example, if the RA procedure is initiated for beam failure recovery. A RSRP SSB SUL parameter (e.g., rsrp-ThresholdSSB-SUL) may indicate an RSRP threshold for the selection between the NUL carrier and the SUL carrier.

A power control offset parameter (e.g., powerControlOffset) may indicate a power offset between a RSRP SSB threshold parameter (e.g., rsrp-ThresholdSSB) and a RSRP CSI-RS threshold parameter (e.g., rsrp-ThresholdCSI-RS)

to be used, for example, if the RA procedure is initiated for beam failure recovery. A power ramping step parameter (e.g., powerRampingStep) may indicate a power-ramping factor. A power ramping step high priority parameter (e.g., powerRampingStepHighPriority) may indicate a power-ramping factor in case of a differentiated RA procedure. A preamble index parameter (e.g., ra-PreambleIndex) may indicate a RAP index.

FIG. 23 shows example random access occasion mask index values for a random access occasion mask parameter (e.g., ra-ssb-OccasionMaskIndex). The random access occasion mask index values may define random access resource occasion(s) (e.g., PRACH occasion) associated with an SSB in which the wireless device (e.g., a MAC entity of a wireless device) may send (e.g., transmit) a RAP.

An occasion list parameter (e.g., ra-OccasionList) may define a random access resource occasion(s) (e.g., PRACH occasion) associated with a CSI-RS in which the wireless device (e.g., a MAC entity of a wireless device) may send (e.g., transmit) a RAP. A preamble maximum transmission parameter (e.g., preambleTransMax) may define the maximum quantity of RAP transmissions. A SSB mapping parameter (e.g., ssb-perRACH-OccasionAndCB-PreamblesPerSSB) may define a quantity of SSBs mapped to each random access resource occasion (e.g., PRACH occasion). A quantity of RAPs mapped to each SSBA RAP occasion parameter may indicate: a set of RAPs and/or random access resource occasions (e.g., PRACH occasions) for SI request, if any; and/or a set of RAPs and/or random access resource occasions (e.g., PRACH occasions) for beam failure recovery request, if any. A response window parameter (e.g., ra-ResponseWindow) may indicate a time window to monitor RAR(s). A contention resolution timer parameter (e.g., ra-ContentionResolutionTimer) may indicate a configuration for the Contention Resolution Timer.

A RA procedure may be initiated for beam failure detection and recovery. A wireless device may be configured by RRC with a beam failure recovery procedure that may be used for indicating to the serving base station of a SSB or CSI-RS, for example, if beam failure is detected on the serving SSB(s)/CSI-RS(s). Beam failure may be detected by counting beam failure instance indication from the lower layers of the wireless device (e.g., a MAC entity of a wireless device). A base station may configure, via RRC, the parameters in a beam failure recovery configuration (e.g., BeamFailureRecoveryConfig) for a beam failure detection and recovery procedure. A beam failure maximum count parameter (e.g., beamFailureInstanceMaxCount) may indicate a maximum count value for the beam failure detection. A beam failure timer parameter (e.g., beamFailureDetectionTimer) may indicate a configuration for a timer for the beam failure detection. A beam failure recovery timer parameter (e.g., beamFailureRecoveryTimer) may indicate a configuration for a timer for a beam failure recovery procedure. A RSRP SSB threshold (e.g., rsrp-ThresholdSSB) may indicate an RSRP threshold for the beam failure recovery.

A power ramping step parameter (e.g., powerRampingStep) may indicate a power ramping factor for a beam failure recovery. A preamble target power parameter (e.g., preambleReceivedTargetPower) may indicate a target power for the beam failure recovery. A maximum quantity of preambles parameter (e.g., preambleTransMax) may indicate a maximum quantity of preambles for the beam failure recovery. A response window parameter (e.g., ra-ResponseWindow) may indicate a time window to monitor response(s) for the beam failure recovery using contention-free RAP. A random access configuration index parameter (e.g., prach-ConfigIndex) may indicate a preamble format and PRACH subframe assignment index for the beam failure recovery. An occasion mask index parameter (e.g., ra-ssb-Occasion-MaskIndex) may indicate a SSB mask index for the beam failure recovery. An occasion list parameter (e.g., ra-OccasionList) may indicate random access resource occasions for the beam failure recovery.

A wireless device may use one or more parameters for a RA procedure. A wireless device may use at least one of PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and/or TEMPORARY_C-RNTI.

A wireless device may perform random access resource selection for selecting one or more preambles and one or more random access resource occasions (e.g., PRACH occasions) (or resources comprising time, frequency, and/or code). A wireless device may determine one or more operations have occurred or settings configured. A RA procedure may be initiated for beam failure recovery. The beamFailureRecoveryTimer may be running or not configured. The contention-free random access resources for beam failure recovery request associated with any of the SSBs and/or CSI-RSs may be explicitly provided by RRC signaling. At least one of the SSBs may be available, for example, based on SS-RSRP above a threshold (e.g., rsrp-ThresholdSSB) among the SSBs in a candidate beam list (e.g., candidateBeamRSList), and/or the CSI-RSs with CSI-RSRP above a threshold (e.g., rsrp-ThresholdCSI-RS) among the CSI-RSs in a candidate beam list (e.g., candidateBeamRSList). The wireless device may select an SSB with SS-RSRP above a threshold (e.g., rsrp-ThresholdSSB) among the SSBs in a candidate beam list (e.g., candidateBeamRSList) or a CSI-RS with CSI-RSRP above a threshold (e.g., rsrp-ThresholdCSI-RS) among the CSI-RSs in a candidate beam list (e.g., candidateBeamRSList), for example, based these observations by the wireless device. A wireless device may set a PREAMBLE_INDEX to a preamble index parameter (e.g., ra-PreambleIndex) corresponding to the SSB in a candidate beam list (e.g., candidateBeamRSList) which is quasi-collocated with the selected CSI-RS, for example, if CSI-RS is selected, and there is no ra-PreambleIndex associated with the selected CSI-RS. The wireless device may set the PREAMBLE_INDEX to the preamble index parameter corresponding to the selected SSB or CSI-RS from the set of RAPs for beam failure recovery request.

A RA procedure may be initiated and/or a preamble index parameter (e.g., ra-PreambleIndex) may be explicitly provided via PDCCH and/or RRC signaling. The preamble index parameter may not be 0b000000, and/or a contention-free random access resource associated with SSBs and/or CSI-RSs may not be explicitly provided by RRC signaling. A wireless device may set the PREAMBLE_INDEX to the signaled preamble index parameter.

A RA procedure may be initiated, and/or the contention-free random access resources associated with SSBs may be explicitly provided, via RRC, and at least one SSB with SS-RSRP above a threshold (e.g., rsrp-ThresholdSSB) among the associated SSBs may be available. The wireless device may select an SSB with SS-RSRP above the threshold (e.g., rsrp-ThresholdSSB) among the associated SSBs. The wireless device may set the PREAMBLE_INDEX to a preamble index parameter (e.g., ra-PreambleIndex) corresponding to the selected SSB.

A wireless device may initiate a RA procedure. Contention-free random access resources associated with CSI-RSs may be explicitly provided via RRC signaling, and at least one CSI-RS with CSI-RSRP above a threshold (e.g., rsrp-ThresholdCSI-RS) among the associated CSI-RSs may be available. A wireless device may select a CSI-RS with CSI-RSRP above a threshold (e.g., rsrp-ThresholdCSI-RS) among the associated CSI-RSs. The wireless device may set the PREAMBLE_INDEX to a preamble index parameter (e.g., ra-PreambleIndex) corresponding to the selected CSI-RS.

A wireless device may initiate a RA procedure, for example, based on at least one of the SSBs with SS-RSRP above a threshold (e.g., rsrp-ThresholdSSB) being available. A wireless device may select an SSB with SS-RSRP above a threshold (e.g., rsrp-ThresholdSSB). Alternatively, the wireless device may select any SSB. The wireless device may perform a random access resource selection, for example, if Msg3 is being resent (e.g., retransmitted). A wireless device may select a same group of RAPs as was used for the RAP transmission attempt corresponding to a first transmission of Msg3. A wireless device may select a preamble index parameter (e.g., ra-PreambleIndex) randomly (e.g., with equal probability from the RAPs associated with the selected SSB and the selected RAPs group), for example, if the association between RAPs and SSBs is configured. If the association between RAPs and SSBs is not configured, a wireless device may select a preamble index parameter (e.g., ra-PreambleIndex) randomly (e.g., with equal probability from the RAPs within the selected RAPs group). A wireless device may set the PREAMBLE_INDEX to the selected a preamble index parameter (e.g., ra-PreambleIndex).

A wireless device may determine the next available random access resource occasion (e.g., PRACH occasion) from the random access resource occasions (e.g., PRACH occasions) corresponding to the selected SSB permitted by the restrictions given by the occasion mask index parameter (e.g., ra-ssb-OccasionMaskIndex), for example, if configured, if an SSB is selected, and/or an association between random access resource occasions (e.g., PRACH occasions) and SSBs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected SSB). The wireless device (e.g., a MAC entity of a wireless device) may take into account the possible occurrence of measurement gaps, for example, if determining the next available random access resource occasion (e.g., PRACH occasion) corresponding to the selected SSB.

A wireless device may determine the next available random access resource occasion (e.g., PRACH occasion) from the random access resource occasions (e.g., PRACH occasions) in an occasion list parameter (e.g., ra-OccasionList) corresponding to the selected CSI-RS, for example, if a CSI-RS is selected and an association between random access resource occasions (e.g., PRACH occasions) and CSI-RSs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected CSI-RS). The wireless device (e.g., a MAC entity of a wireless device) may take into account the possible occurrence of measurement gaps during determining the next available random access resource occasion (e.g., PRACH occasion) corresponding to the selected CSI-RS.

A wireless device may determine the next available random access resource occasion (e.g., PRACH occasion) from the random access resource occasions (e.g., PRACH occasions), for example, permitted by the restrictions given by an occasion mask index parameter (e.g., ra-ssb-OccasionMaskIndex), if configured. The occasion mask index parameter may correspond to the SSB in the candidate-BeamRSList, which may be quasi-collocated with the selected CSI-RS, if a CSI-RS is selected and/or if there is no contention-free random access resource associated with the selected CSI-RS. The wireless device (e.g., a MAC entity of a wireless device) may take into account the possible occurrence of measurement gaps, for example, during determining the next available random access resource occasion (e.g., PRACH occasion) corresponding to the SSB which may be quasi-collocated with the selected CSI-RS.

A wireless device may determine a next available random access resource occasion (e.g., PRACH occasion). The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers). The wireless device (e.g., a MAC entity of a wireless device) may take into account a possible occurrence of measurement gaps during determining the next available random access resource occasion (e.g., PRACH occasion).

A wireless device may perform a RAP transmission, for example, based on a selected PREAMBLE INDEX and random access resource occasion (e.g., PRACH occasion). A wireless device may increment a power ramping counter (e.g., PREAMBLE_POWER_RAMPING_COUNTER) by 1, for example, if a notification of suspending power ramping counter has not been received from lower layers (e.g., lower layer entities of the wireless device); and/or if SSB selected is not changed (e.g., a same SSB as a previous RAP transmission). The wireless device may select a value of DELTA_PREAMBLE that may be predefined and/or semi-statistically configured by a base station. The wireless device may set PREAMBLE_RECEIVED_TARGET_POWER to preambleReceivedTargetPower+DELTA_PREAMBLE+ (PREAMBLE_POWER_RAMPING_COUNTER−1)× PREAMBLE_POWER_RAMPING_STEP. The wireless device (e.g., via an entity of the wireless device) may instruct a physical layer entity of the wireless device to send (e.g., transmit) the RAP via the selected random access resource (e.g., PRACH), corresponding RA-RNTI (if available), PREAMBLE_INDEX, and/or PREAMBLE_RECEIVED_TARGET_POWER. The wireless device may determine an RA-RNTI associated with the random access resource occasion (e.g., PRACH occasion) in which the RAP is sent (e.g., transmitted). The RA-RNTI associated with the PRACH in which the RAP is sent, may be determined as:

$$RA\text{-}RNTI = 1 + s\_id + 14 \times t\_id + 14 \times 80 \times f\_id + 14 \times 80 \times 8 \times ul\_carrier\_id$$

s_id may be the index of the first OFDM symbol of the specified PRACH (0≤s_id<14). t_id may be the index of the first slot of the specified PRACH in a system frame (0≤t_id<80). f_id may be the index of the specified PRACH in the frequency domain (0≤f_id<8). ul_carrier_id may be the UL carrier used for Msg1 transmission (0 for NUL carrier, and 1 for SUL carrier).

An amount of data traffic carried over a network may be expected to change over time. A quantity of users and/or devices may increase. Each user and/or device may access an increasing quantity and/or variety of services (e.g., video delivery, large files, images, etc.). Network access may not only require high capacity, but also may cause provisioning very high data rates to meet user expectations for interactivity and/or responsiveness. More spectrum may be needed for operators to meet the increasing demand. It may be beneficial that more spectrum be made available for deploying macro cells as well as small cells for communications systems, for example, considering user expectations of high data rates along with seamless mobility.

There may be increasing interest from operators in deploying some complementary access utilizing unlicensed spectrum to meet traffic growth, for example, striving to meet the market demands. Operator-deployed Wi-Fi networks and the 3GPP standardization of interworking solutions with Wi-Fi (e.g., LTE/WLAN interworking) may indicate operator interest. This interest may indicate that unlicensed spectrum, if present, may be an effective complement to licensed spectrum for network operators to help address traffic increase. In at least some systems (e.g., LTE), licensed assisted access (LAA) and/or new radio on unlicensed band(s) (NR-U) may offer an alternative for operators to make use of unlicensed spectrum for managing a network. This use of unlicensed spectrum may offer new possibilities for optimizing a network's efficiency.

LBT may be implemented for transmission in a cell (which may be referred to as an LAA cell and/or a NR-U cell). An LAA cell, NR-U cell, and/or any other cell may be interchangeable and may refer a cell operating in unlicensed band. The cell may be operated as non-standalone or standalone, with or without an anchor cell in licensed band, configured in an unlicensed band. An LBT procedure may comprise a clear channel assessment. In an LBT procedure, a wireless device and/or a base station may apply a clear channel assessment (CCA) check before using the channel. The CCA may utilize at least energy detection to determine the presence or absence of other signals on a channel in order to determine whether a channel is occupied or clear. A regulation of a country may alter configurations of the LBT procedure. European and Japanese regulations may mandate the usage of LBT in the unlicensed bands, for example, in a 5 GHz unlicensed band. Carrier sensing via LBT may be used for equitable sharing of the unlicensed spectrum.

Discontinuous transmission on an unlicensed carrier with limited maximum transmission duration may be enabled. Channel reservation may be enabled by the transmission of signals (e.g., by an NR-U node), after gaining channel access via a successful LBT operation. Channel reservation may enable other nodes that receive a sent (e.g., transmitted) signal with energy above a certain threshold a capability to sense the channel to be occupied. Functions that may need to be supported by one or more signals for operation in unlicensed band with discontinuous downlink transmission may include one or more of: detection of the downlink transmission in unlicensed band (including cell identification) by wireless devices; and/or time and frequency synchronization of wireless devices.

DL transmission and frame structure design for an operation in unlicensed band may use subframe boundary alignment according to carrier aggregation timing relationships across serving cells aggregated by CA. Base station transmissions may not start at the subframe boundary. LAA, NR-U, and/or any other technologies may support sending messages via PDSCH, for example, if not all OFDM symbols are available for transmission in a subframe according to LBT. Delivery of necessary control information for the PDSCH may also be supported.

LBT procedures may be used for coexistence of 3GPP systems (e.g., LTE, NR, and/or any other communications system or technology) with other operators and technologies operating in unlicensed spectrum. LBT procedures on a node attempting to send (e.g., transmit) on a carrier in unlicensed spectrum may require the node to perform a clear channel assessment to determine if the channel is free for use. An LBT procedure may involve, at least, energy detection to determine if the channel is being used. Regulatory requirements in some regions, (e.g., in Europe) may specify an energy detection threshold. If a node receives energy greater than a threshold, the node may determine that the channel is not clear. While nodes may follow such regulatory requirements, a node may optionally use a lower threshold for energy detection than that specified by regulatory requirements. NR-U and/or other technologies may use a mechanism to adaptively change the energy detection threshold. A mechanism may be used to adaptively lower the energy detection threshold from an upper bound. An adaptation mechanism may not preclude static or semi-static setting of the threshold. A Category 4 LBT mechanism or other type of LBT mechanisms may be implemented.

Various LBT mechanisms may be used. An LBT procedure may not be performed by the transmitting entity, for example, for some signals. A Category 1 (CAT1, e.g., no LBT) may be used. A channel in an unlicensed band may be held by a base station for DL transmission. A wireless device may take over the channel for UL transmission. The wireless device may perform the UL transmission without performing LBT. A Category 2 (CAT2, e.g. LBT without random back-off) may be used. The duration of time that the channel may be sensed to be idle before the transmitting entity sends may be deterministic. A Category 3 (CAT3, e.g. LBT with random back-off with a contention window of fixed size) may be used. A transmitting entity may draw a random number N within a contention window. A size of the contention window may be specified by a minimum and maximum value of N. The size of the contention window may be fixed. The random number N may be used in the LBT procedure to determine the duration of time that the channel is sensed to be idle before the transmitting entity sends via the channel.

A Category 4 (CAT4, e.g. LBT with random back-off with a contention window of variable size) may be used. A transmitting entity may draw a random number N within a contention window. The size of contention window may be specified by the minimum and maximum value of N. The transmitting entity may vary the size of the contention window based on drawing the random number N. The random number N may be used in the LBT procedure to determine the duration of time that the channel is sensed to be idle before the transmitting entity sends (e.g., transmits) on the channel.

A wireless device may use uplink LBT. The UL LBT may be different from the DL LBT (e.g. by using different LBT mechanisms or parameters). The UL may be based on scheduled access that affects a wireless device's channel contention opportunities. Other UL LBT configurations include, but are not limited to, multiplexing of multiple wireless devices in a subframe (slot, and/or mini-slot).

A DL transmission burst may be a continuous transmission from a DL transmitting node with no transmission immediately before or after from the same node via the same component carrier (CC). An UL transmission burst from a wireless device perspective may be a continuous transmission from a wireless device with no transmission immediately before or after from the same wireless device via the same CC. An UL transmission burst may be defined from a wireless device perspective. An UL transmission burst may be defined from a base station perspective. A base station may operate DL+UL via a same unlicensed carrier. DL transmission burst(s) and UL transmission burst(s) may be scheduled in a TDM manner via the same unlicensed carrier. An instant in time may be part of a DL transmission burst or an UL transmission burst.

Channel observation time (COT) sharing may be used. COT sharing may be a mechanism (e.g., enabled by ETSI-BRAN) wherein one device acquires a COT using CAT4 LBT and another device shares it using a 25 μs LBT with a gap, for example, provided the amount of transmission does not exceed the MCOT limit for the given priority class. COT sharing may allow a concession for UL via an unlicensed band in which a base station sends (e.g., transmits) a grant to a wireless device before it can be sent (e.g., transmitted) via the UL. The delay between the grant and the corresponding UL transmission may be a period of time (e.g., at least 4 ms). A pause (e.g., 4 ms) may not be accounted in the COT duration. A base station may indicate the remaining time to one or more wireless devices via a PDCCH, for example, if the base station acquired a COT and sent a message indicating the COT via the DL without exhausting the full COT. The wireless device may perform UL transmissions with dynamic grant and/or configured grant (e.g., Type 1, Type2, autonomous UL) with 25 μs LBT in the configured period Single and multiple DL to UL and UL to DL switching within a shared COT may be supported. LBT requirements to support single or multiple switching points, may be different for different gaps. No-LBT may be used, for example, for a gap of less than 16 μs. A one-shot LBT may be used, for example, for a gap of between 16 μs and 25 μs. A one-shot LBT may be used, for example, for single switching point, and for the gap from DL transmission to UL transmission exceeding 25 μs. A one-shot LBT may be used, for example, for multiple switching points, and for the gap from DL transmission to UL transmission exceeding 25 μs.

A signal that facilitates detection with low complexity may be useful for wireless device power saving, improved coexistence, spatial reuse (which may be within the same operator network), serving cell transmission burst acquisition, etc. Operation of at least some technologies (e.g., NR-U) may use a signal comprising at least SS/PBCH block burst set transmission. Other channels and signals may be sent together as part of the signal. The design of this signal may determine that there are no gaps within the time span the signal is sent, for example, at least within a beam. Gaps may be needed for beam switching. The occupied channel bandwidth may be satisfied. A block-interlaced based message via a PUSCH may be used. The same interlace structure for messages via a PUCCH and/or a PUSCH may be used. Interlaced based messages via a PRACH may be used.

An initial active DL/UL BWP may be approximately 20 MHz for a first unlicensed band (e.g., 5 GHz band). An initial active DL/UL BWP may be approximately 20 MHz for a second unlicensed band (e.g., 6 GHz band), if similar channelization as the first unlicensed band (e.g., 5 GHz band) is used for the second unlicensed band (e.g., 6 GHz band). Wideband may be configured (e.g., by a base station) with one or more BWPs. Four BWPs may be configured (e.g., by a base station), for example, with about 20 MHz bandwidth configured for each BWP, or 80 MHz allocated for the four BWPs. An active BWP (DL and/or UL) may be switched one to another at least based on BWP switching mechanism. The wideband may be configured (e.g., by a base station) with one or more subbands. Four subbands may be configured (e.g., by a base station), for example, with about 20 MHz configured for each subband, or 80 MHz allocated for the four subbands. A wireless device may perform an LBT procedure subband by subband, and may send (e.g., transmit) data via scheduled resources on one or more subbands where the LBT procedure indicates idle.

HARQ acknowledge and negative acknowledge (A/N) for the corresponding data may be sent in the same shared COT. The HARQ A/N may be sent in a separate COT from the one the corresponding data was sent. Flexible triggering and/or multiplexing of HARQ feedback may be used for one or more DL HARQ processes, for example, if UL HARQ feedback is sent on unlicensed band. The dependencies of HARQ process information to the timing may be removed. UCI messages via PUSCH may carry HARQ process ID, NDI, RVID. Downlink Feedback Information (DFI) may be used for transmission of HARQ feedback for a configured grant.

CBRA and CFRA may be supported on an SpCell. CFRA may be supported on SCells. An RAR may be sent via an SpCell, for example, in a non-standalone configuration. An RAR may be sent via an SpCell and/or via an SCell, for example, in a standalone configuration. A predefined HARQ process ID for an RAR may be used.

Carrier aggregation between a licensed band PCell (e.g., NR (PCell)) and an SCell (e.g., NR-U (SCell)) may be supported. An SCell may have both DL and UL, or DL-only. Dual connectivity between various licensed band PCells (e.g., LTE (PCell)) and PSCells (e.g., NR-U (PSCell)) may be supported. Stand-alone cells (e.g., NR-U) in which all carriers are in one or more unlicensed bands may be supported. A cell (e.g., an NR cell) with a DL in an unlicensed band and an UL in a licensed band, or vice versa, may be supported. Dual connectivity between licensed band cells (e.g., a NR (PCell) and NR-U (PSCell)) may be supported.

An operating bandwidth may be an integer multiple of 20 MHz, for example, if an absence of Wi-Fi cannot be guaranteed (e.g., by regulation) in a band (e.g., sub-7 GHz) via which a communications network or system (e.g., NR-U) is operating. LBT may be performed in units of 20 MHz, for example, for bands where absence of Wi-Fi cannot be guaranteed (e.g., by regulation). Receiver assisted LBT (e.g., RTS/CTS type mechanism) and/or on-demand receiver assisted LBT (e.g., for example receiver assisted LBT enabled only if needed) may be used. Techniques to enhance spatial reuse may be used. Preamble detection may be used.

A network may gain access to the channel to send (e.g., transmit) a message via PDCCH such that a wireless device may need to perform LBT again prior to sending via the channel, for example, with scheduled PUSCH transmissions via an unlicensed carrier. The procedure may tend to increase latency and may become worse if the channel is loaded. A mechanism of autonomous uplink transmission may be used. A wireless device may be pre-allocated with a resource for transmission (e.g., similar to UL SPS) and may perform LBT prior to using the resource. Autonomous uplink may be based on the configured grant functionality (e.g., Type 1 and/or Type 2).

A HARQ process identity may be sent by the wireless device (e.g., as UCI). A wireless device may use the first available transmission opportunity irrespective of the HARQ process. UCI messages via PUSCH may be used to carry HARQ process ID, NDI and RVID.

A UL dynamic grant scheduled UL transmission may increase a delay and/or transmission failure possibility due to at least two LBTs of the wireless device and the base station, for example, for unlicensed bands. A pre-configured grant (e.g., such as configured grant in NR) may be used (e.g., such as for NR-U). The pre-configured grant may decrease a quantity of LBTs performed and control signaling overhead. An uplink grant may be provided by an RRC message (e.g., in a Type 1 configured grant). An uplink grant may be stored as configured uplink grant. An uplink grant (e.g., a Type 1 configured grant) may be initiated based on or in response to receiving the RRC. An uplink grant may be provided by a PDCCH. An uplink grant may be stored and/or cleared as a configured uplink grant, for example, based on L1 signaling indicating configured grant activation and/or deactivation (e.g. using a Type 2 configured grant).

A dependency between HARQ process information to the timing may not exist. UCI messages via a PUSCH may carry HARQ process ID, NDI, RVID, etc. A wireless device may autonomously select one HARQ process ID that is informed to a base station by UCI message(s). A wireless device may perform non-adaptive retransmission with the configured uplink grant. The wireless device may attempt to send (e.g., transmit) in the next available resource with configured grant, for example, if dynamic grant for configured grant retransmission is blocked due to LBT.

Downlink Feedback Information (DFI) may be sent (e.g., using DCI) and may include HARQ feedback for configured grant transmission. The wireless device may perform transmission/retransmission using configured grant according to DFI comprising HARQ feedback. Wideband carrier with more than one channels may be supported, for example, via an unlicensed cell.

There may be one active BWP in a carrier. A BWP with one or more channels may be activated. LBT may be performed in units of 20 MHz, for example, if absence of Wi-Fi cannot be guaranteed (e.g., by regulation). There may be multiple parallel LBT procedures for a BWP. The actual transmission bandwidth may be subject to subband with LBT success, which may result in dynamic bandwidth transmission within the active wideband BWP.

One or more active BWPs may be supported. The BWP bandwidth may be the same as the bandwidth of subband for LBT (e.g., LBT may be carried out on each BWP), for example, which may improve the BWP utilization efficiency. The network may activate and/or deactivate the BWPs based on data volume to be sent.

One or more non-overlapped BWPs may be activated for a wireless device within a wide component carrier (e.g., which may be similar to carrier aggregation in LTE LAA). The BWP bandwidth may be the same as the bandwidth of subband for LBT (e.g., LBT may be carried out on each BWP), for example, which may improve the BWP utilization efficiency. A wireless device may have a capability to support one or more narrow RF and/or a wide RF which may comprise the one or more activated BWPs, for example, if more than one subband LBT success occurs.

A single wideband BWP may be activated for a wireless device within a component carrier. The bandwidth of wideband BWP may be in the unit of subband for LBT. The wideband BWP bandwidth may comprise multiple 20 MHz, for example, if the subband for LBT is 20 MHz in 5 GHz band. An actual transmission bandwidth may be subject to subband with LBT success, which may result in dynamic bandwidth transmission within this active wideband BWP.

Active BWP switching may be achieved using scheduling DCI. The network may indicate to a wireless device a new active BWP to use for an upcoming, and/or any subsequent, data transmission/reception. A wireless device may monitor multiple, configured BWPs to determine which has been acquired for DL transmissions by the base station. A wireless device may be configured with a monitoring occasion periodicity and/or offset for each configured BWP. The wireless device may determine if a BWP has been acquired by the base station during the monitoring occasions. The wireless device may continue with a BWP as its active BWP, for example, at least until indicated otherwise or a Maximum Channel Occupancy Time (MCOT) has been reached, and/or after successfully determining that the channel is acquired. A wireless device may attempt blind detection of PDCCH information in configured CORESETs, for example, if a wireless device has determined that a BWP is active. The wireless device may perform measurements on aperiodic and/or SPS resources.

A wireless device may be configured with multiple UL resources, which may be in different BWPs, for example, for UL transmissions. The wireless device may have multiple LBT configurations, each associated with a BWP and/or a beam pair link. The wireless device may be granted with UL resources associated with (e.g., linked to) one or more LBT configurations. The wireless device may be provided with (e.g., made available, received, stored, etc.) multiple autonomous uplink (AUL) and/or grant-free resources, each using different LBT configurations. Providing a wireless device with multiple AUL resources over multiple BWPs may ensure that if LBT fails using a first LBT configuration for a first AUL resource in one BWP, a wireless device may attempt transmission in a second AUL resource in another BWP. This use of multiple AUL resources may reduce the channel access latency and/or improve spectral efficiency of the over-all unlicensed carrier.

Carrier aggregation with at least one SCell operating in an unlicensed spectrum may be performed in LAA. A configured set of serving cells for a wireless device may include at least one SCell operating in an unlicensed spectrum according to a first frame structure (e.g., frame structure Type 3). An SCell operating in LAA may be referred to as an LAA SCell.

A maximum frequency separation between any two carrier center frequencies on which LAA SCell transmissions are performed may be less than or equal to 62 MHz (or any other frequency), for example, if the absence of devices (e.g., IEEE802.11n/11ac devices) sharing the carrier cannot be guaranteed on a long term basis (e.g., by regulation), and/or if the maximum quantity of unlicensed channels via which a network may simultaneously send is equal to or less than 4 (or any other quantity). A wireless device may be required to support frequency separation.

A base station and/or a wireless device may apply LBT before performing a transmission on an LAA SCell. A transmitter (e.g., of a wireless device and/or of a base station) may listen to and/or sense the channel to determine whether the channel is free or busy, for example, if LBT is applied. The transmitter may perform the transmission, if the channel is determined to be free and/or clear. The transmitter may not perform the transmission, if the channel is not determined to be free and/or clear. A base station may continue to meet a LAA maximum energy detection threshold requirement, for example, if the base station uses channel access signals (e.g., of other technologies) for the purpose of channel access.

A combined time of transmissions compliant with the channel access procedure by a base station may not exceed a threshold time period (e.g., 50 ms) in any contiguous time period (e.g., 1 second period) on an LAA SCell. An LBT type (e.g., type 1 or type 2 uplink channel access) that the wireless device applies may be signaled via uplink grant for uplink PUSCH message transmission on LAA SCells. For AUL message transmissions the LBT may not be signaled via the uplink grant.

FIG. 24 shows an example channel access priority class values. A base station may signal the channel access priority class for a logical channel, for example, for type 1 uplink channel access on AUL. A wireless device may select a highest channel access priority class (e.g., with a lower number) of the logical channel(s) with a MAC SDU multiplexed into a MAC PDU. The MAC CEs (e.g., except padding BSR) may use the lowest channel access priority class. The wireless device may select logical channels corresponding to any channel access priority class for UL transmission in the subframes signaled by a base station via common downlink control signaling, for example, for type 2 uplink channel access on AUL.

A base station may not schedule a wireless device with more subframes than a minimum necessary to send (e.g., transmit) traffic corresponding to a selected channel access priority class or lower (e.g., having a lower number) than the channel access priority class signaled in a UL grant. The base station may schedule the wireless device, for example, based on: the latest BSR and/or received uplink traffic from the wireless device (e.g., for uplink LAA operation), if type 1 uplink channel access procedure is signaled to the wireless device; channel access priority class used by the base station based on the downlink traffic; and/or the latest BSR and/or received UL traffic from the wireless device, if type 2 uplink channel access procedure is signaled to the wireless device.

A first quantity (e.g., four) of channel access priority classes may be used during performing uplink and downlink transmissions in LAA carriers. A channel access priority class may be used by traffic belonging to different standardized QCIs. A non-standardized QCI (e.g., operator specific QCI) may use a suitable channel access priority class of the standardized QCIs that best matches the traffic class of the non-standardized QCI. For uplink, the base station may select a channel access priority class by taking into account the lowest priority QCI in a logical channel group.

Four (or any other quantity) channel access priority classes may be used. A base station may ensure several requirements and/or limitations, for example, if a DL transmission burst with PDSCH is sent, for which channel access has been obtained using channel access priority class P (1 . . . 4). The base station may limit the transmission duration of the DL transmission burst so as to not exceed a minimum duration needed to send (e.g., transmit) all available buffered traffic corresponding to channel access priority class(es)≤P. The base station may limit the transmission duration of the DL transmission burst so as to not exceed a maximum channel occupancy time for channel access priority class P. The base station may ensure additional traffic corresponding to channel access priority class(s)>P be included in the DL transmission burst once no more data corresponding to channel access priority class≤P is available for transmission. The base station may maximize occupancy of the remaining transmission resources in the DL transmission burst with such additional traffic. A DL transmission burst may refer to a continuous transmission by the base station after a successful LBT.

A wireless device may be scheduled for downlink transmission via a PDCCH of a serving cell. A wireless device may be scheduled for uplink transmission via a PDCCH of one other serving cell, for example, if the PDCCH of an LAA SCell is configured and/or if cross-carrier scheduling applies to uplink transmission. The wireless device may be scheduled for uplink transmission and downlink transmission via its PDCCH, for example, if the PDCCH of an LAA SCell is configured and/or if self-scheduling applies to both uplink transmission and downlink transmission.

FIG. 25 shows an example BWP configuration information element (e.g., a BWP IE). A BWP IE may be used to configure a BWP. The network may configure at least an initial BWP comprising at least a downlink BWP and one (e.g., if the serving cell is configured with an uplink) or two (e.g., if using supplementary uplink (SUL)) uplink BWPs, for example, for each serving cell. The network may configure additional uplink and downlink BWPs for a serving cell.

The BWP configuration may be split into uplink and downlink parameters and/or into common and dedicated parameters. Common parameters (e.g., BWP-UplinkCommon and BWP-DownlinkCommon) may be cell specific and/or the network may ensure the necessary alignment with corresponding parameters of other wireless devices. Common parameters of the initial BWP of the PCell may be provided via system information. The network may provide the common parameters via dedicated signaling.

A field, IE, or prefix (e.g., cyclic prefix) may indicate whether to use the extended cyclic prefix for this BWP. The wireless device may use the normal cyclic prefix (CP), for example, if the CP is not set. Normal CP may be supported for all numerologies and slot formats. Extended CP may be supported only for 60 kHz subcarrier spacing (or some other frequency subcarrier spacing). A parameter (e.g., locationAndBanddwidth) may indicate a frequency domain location and/or a bandwidth of this BWP. The value of the field may be interpreted as a RIV. A first PRB may be a PRB determined by a subcarrier spacing parameter (e.g., subcarrierSpacing) of this BWP and/or an offset parameter (e.g., offsetToCarrier (configured in SCS-SpecificCarrier contained within FrequencyInfoDL)) corresponding to this subcarrier spacing. A BWP-pair (e.g., UL BWP and DL BWP with the same index) may have the same center frequency, for example, based on use of TDD. The subcarrier spacing parameter may indicate subcarrier spacing to be used in this BWP for channels and reference signals unless explicitly configured elsewhere. The value kHz15 may correspond to p=0, kHz30 to p=1, and so on. The values 15, 30, or 60 kHz may be used. A BWP index (e.g., bwp-Id) may indicate an identifier for a BWP.

Other parts of the RRC configuration may use the BWP index (e.g., BWP-Id) to associate with a particular BWP. A BWP ID=0 may be associated with an initial BWP and/or may not be used with other BWPs. The network (NW) may trigger the wireless device to switch UL or DL BWP using a DCI field. The four code points in the DCI field may map to the RRC-configured BWP index (e.g., BWP-Id). The DCI code point may be equivalent to the BWP ID (initial=0, first dedicated=1, . . . ), for example, for up to three configured BWPs (in addition to the initial BWP). The BWPs may be identified by DCI code points 0 to 3, for example, if the NW configures 4 dedicated BWPs. It may not be possible to switch to the initial BWP using the DCI field, for example, with this configuration. The BWP index (e.g., bwp-Id) may indicate an identifier for a BWP. Other parts of the RRC configuration may use the BWP index (e.g., BWP-Id) to associate themselves with a particular BWP. A BWP ID=0 may be associated with the initial BWP and may not be used in other BWPs.

The NW may trigger the wireless device to switch an UL BWP and/or a DL BWP using a DCI field. The four code points in that DCI field may map to the RRC-configured BWP index (e.g., BWP-ID). The DCI code point may be equivalent to the BWP index (e.g., BWP ID where initial=0, first dedicated=1, . . . ), for example, for up to three configured BWPs (in addition to the initial BWP). The BWPs may be identified by DCI code points 0 to 3, for example, if the NW configures four dedicated BWPs. It may not be possible to switch to the initial BWP using the DCI field, for example, with this configuration. A common random access configuration (e.g., rach-ConfigCommon) may indicate configuration of cell specific RA parameters that the wireless device may use for contention based random access, contention free random access, and/or contention based beam failure recovery. The NW may configure SSB-based RA (including RACH-ConfigCommon) for UL BWPs, for example, based on the linked DL BWPs allowing the wireless device to acquire the SSB associated to the serving cell. An uplink control channel configuration (e.g., PUCCH-config) may indicate an uplink control channel configuration (e.g., PUCCH configuration) for one BWP of the regular UL or SUL of a serving cell. The network may configure PUCCH on the BWPs of one of the uplinks (UL or SUL), for example, if the wireless device is configured with SUL.

The network may configure PUCCH-Config for each SpCell. The network may configure one additional SCell of a cell group with an uplink control channel configuration (e.g., PUCCH-Config for a PUCCH SCell), for example, if supported by the wireless device. The IE BWP-Id may be used to refer to BWP. The initial BWP may be referred to by a zero index (e.g., BWP-Id 0). The other BWPs may be referred to by a non-zero index (e.g., BWP-Id 1 to a maximum number/quantity of BWPs (e.g., maxN-rofBWPs)).

FIG. 26 shows an example serving cell configuration information element. A serving cell configuration (e.g., ServingCellConfig IE) may be used to configure (e.g., add or modify) the wireless device with a serving cell. The serving cell may be the SpCell or an SCell of an MCG or SCG. The parameters of the serving cell configuration may comprise wireless device specific parameters and/or cell specific parameters (e.g. additionally configured BWPs).

An inactivity timer (e.g., bwp_InactivityTimer) may be configured to have a duration in milliseconds (ms) after which the wireless device may fall back to the default BWP. A value 0.5 ms may be applicable for carriers greater than 6 GHz. If the network releases the timer configuration, the wireless device may stop the timer without switching to the default BWP.

A default downlink BWP index (e.g., defaultDownlinkBWP-Id) may correspond to a default L1 downlink BWP parameter (e.g., 'default-DL-BWP'). The initial BWP may be referred to by a BWP index (e.g., BWP-Id=0). The ID of the downlink BWP may be used after timer expiry. This ID field may be wireless device specific. The wireless device may use the initial BWP as default BWP, for example, if the field is absent.

A downlink BWP list (e.g., downlinkBWP-ToAddMod-List) may indicate a list of additional downlink BWPs to be added or modified. A downlink BWP release list (e.g., downlinkBWP-ToReleaseList) may indicate a list of additional downlink BWPs to be released.

The active DL BWP index may contain the ID of the DL BWP to be activated, for example, based on or upon performing the reconfiguration in which it is received, for example, if an active DL BWP index (e.g., firstActiveDownlinkBWP-Id) is configured for an SpCell. The RRC reconfiguration may not impose a BWP switch (which may correspond to L1 parameter 'active-BWP-DL-Pcell'), for example, if the field is absent. The field may contain the ID of the downlink BWP to be used upon MAC-activation of an SCell, for example, if configured for an SCell. The initial BWP may be referred to by a zero index (e.g., BWP-Id=0).

An initial DL BWP parameter (e.g., initialDownlinkBWP) may indicate a dedicated (e.g., UE-specific) configuration for the initial downlink bandwidth-part. An active UL BWP index (e.g., firstActiveUplinkBWP-Id) may contain an ID of the DL BWP to be activated upon performing the reconfiguration in which it is received, for example, if configured for an SpCell. The RRC reconfiguration may not impose a BWP switch (e.g., corresponding to L1 parameter 'active-BWP-UL-Pcell'), for example, if the field is absent. The field may contain the ID of the uplink BWP to be used upon MAC-activation of an SCell, for example, if configured for an SCell. The initial BWP may be used in a BWP parameter (e.g., BandwidthPartId=0). An initial uplink BWP parameter (e.g., initialUplinkBWP) may indicate a dedicated (UE-specific) configuration for the initial uplink bandwidth-part.

Figure 27A:
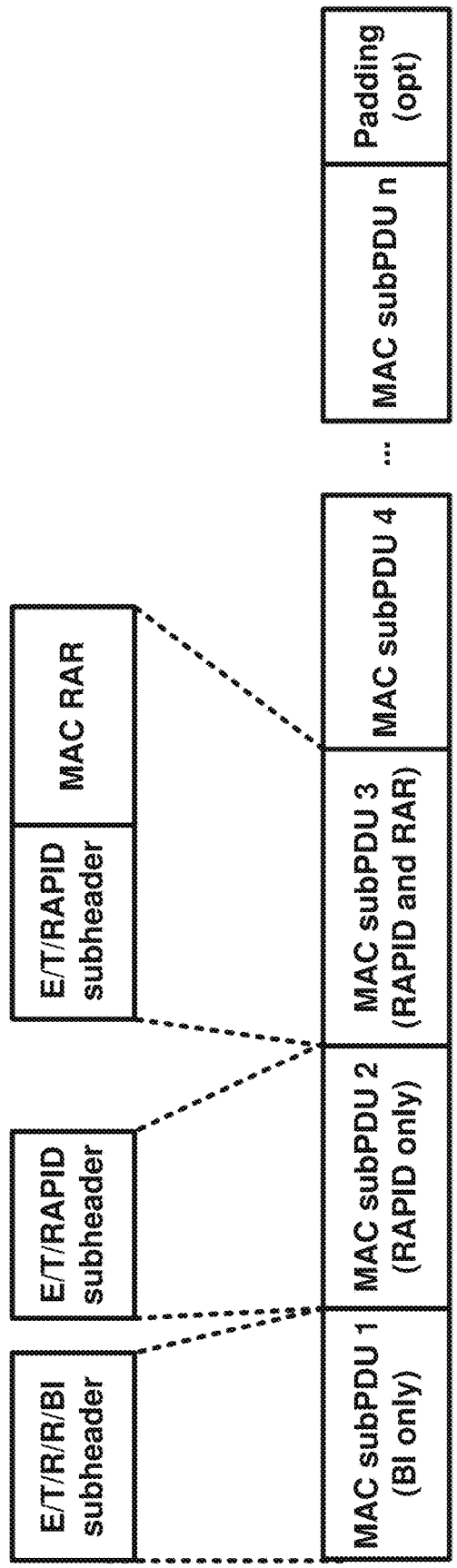
FIG. 27A, FIG. 27B, and FIG. 27C show examples of RA response (RAR), a MAC subheader with backoff indicator (BI), and a MAC subheader with a random access preamble identifier (RAPID), respectively.
Figure 27B:
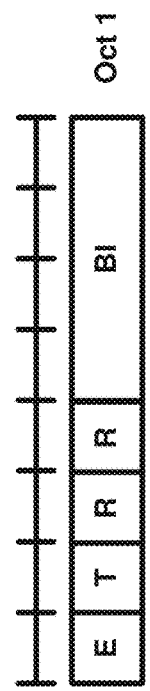
Figure 27C:
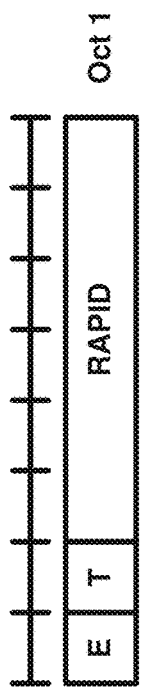

FIG. 27A, FIG. 27B, and FIG. 27C show respectively examples of RAR, MAC subheader with backoff indicator (BI), and a MAC subheader with a RAPID. A wireless device may receive from a base station at least one RAR as a response of Msg1 1220 (as shown in FIG. 12) or two-step Msg1 1620 (shown in FIG. 16) using an RA procedure. An RAR may be in a form of MAC PDU comprising one or more MAC subPDUs and/or (optionally) padding. FIG. 27A is an example of an RAR. A MAC subheader may be octet-aligned. Each MAC subPDU may comprise one or more of the following: a MAC subheader with BI only; a MAC subheader with RAPID only (e.g., acknowledgment for SI request); a MAC subheader with RAPID and MAC RAR. FIG. 27B shows an example of a MAC subheader with BI. A MAC subheader with BI may comprise one or more header fields (e.g., E/T/R/R/BI) as shown in FIG. 27B and described below. A MAC subPDU with BI may be placed at the beginning of the MAC PDU, if included. MAC subPDU(s) with RAPID only, and/or MAC subPDU(s) with RAPID and MAC RAR, may be placed anywhere after a MAC subPDU with BI and, before padding as shown in FIG. 27A. A MAC subheader with RAPID may comprise one or more header fields (e.g., E/T/RAPID) as shown in FIG. 27C. Padding may be placed at the end of the MAC PDU, if present. Presence and length of padding may be implicit, for example, based on TB size, and/or a size of MAC subPDU(s).

A field (e.g., an E field) in a MAC subheader may indicate an extension field that may be a flag indicating if the MAC subPDU (including the MAC subheader) is the last MAC subPDU or not in the MAC PDU. The E field may be set to "1" to indicate at least one more MAC subPDU follows. The E field may be set to "0" to indicate that the MAC subPDU including this MAC subheader is a last MAC subPDU in the MAC PDU. A field (e.g., a T field) may be a flag indicating whether the MAC subheader contains a RAPID or a BI (e.g., one or more backoff values may predefined and BI may indicate one of backoff value). The T field may be set to "0" to indicate the presence of a field (e.g., a BI field) in the subheader. The T field may be set to "1" to indicate the presence of a RAPID field in the subheader. A field (e.g., an R field) may indicate a reserved bit that may be set to "0." A field (e.g., a BI field) may indicate an overload condition in the cell. A size of the BI field may be 4 bits. A field (e.g., a RAPID field) may be a RAPID field that may identify and/or indicate the transmitted RAP. A MAC RAR may not be included in the MAC subPDU, for example, based on the RAPID in the MAC subheader of a MAC subPDU corresponding to one of the RAPs configured for an SI request.

There may be one or more MAC RAR formats. At least one MAC RAR format may be employed in a four-step or a two-step RA procedure.

Figure 28:
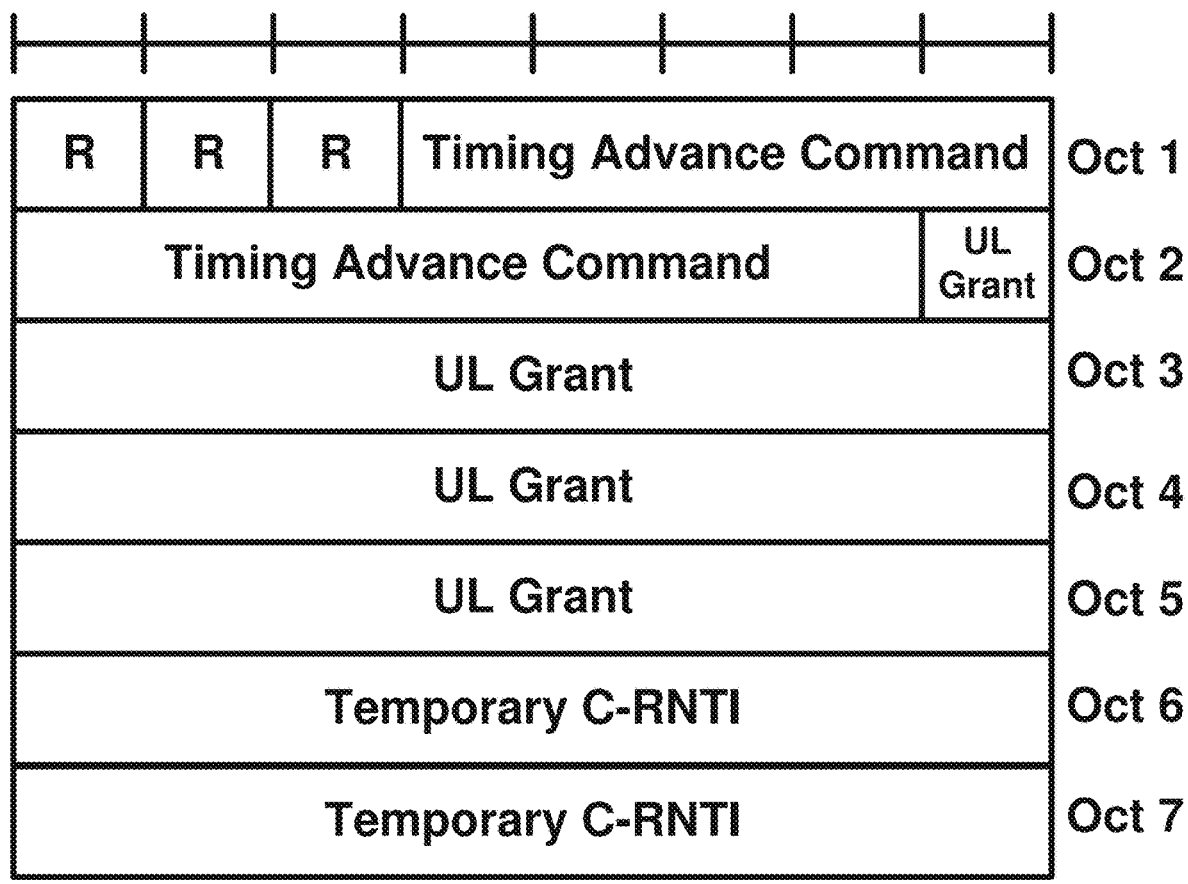
FIG. 28 shows an example MAC RAR format.

FIG. 28 shows an example MAC RAR format. The MAC RAR may be fixed size as shown in FIG. 28. The MAC RAR may comprise one or more of the following fields: an R field that may indicate a reserved bit, which may be set to "0"; a timing advance (TA) command field that may indicate the index value for TA employed to control the amount of timing adjustment; a UL grant field that indicates the resources to be employed on an uplink; and an RNTI field (e.g., temporary C-RNTI and/or C-RNTI) that may indicate an identity that is employed during RA. An RAR may comprise one or more of following for a two-step RA procedure: a UE contention resolution identity, an RV ID for retransmission of one or more TBs, decoding success or failure indicator of one or more TB transmissions, and one or more fields from the MAC RAR formats.

A base station may multiplex, in a MAC PDU, RARs for two-step and/or four-step RA procedures. A wireless device may not use an RAR length indicator field. The wireless device may determine the boundary of each RAR in the MAC PDU based on pre-determined RAR size information, for example, based on RARs for two-step and four-step RA procedures having the same size.

FIG. 29 shows an example RAR format. The RAR format may be employed in a MAC PDU, for example, that may multiplex RARs for two-step and four-step RA procedures. The RAR shown in FIG. 29 may use a fixed size, for example, using the same format for two-step and four-step RA procedures.

Figures 30A, 30B:
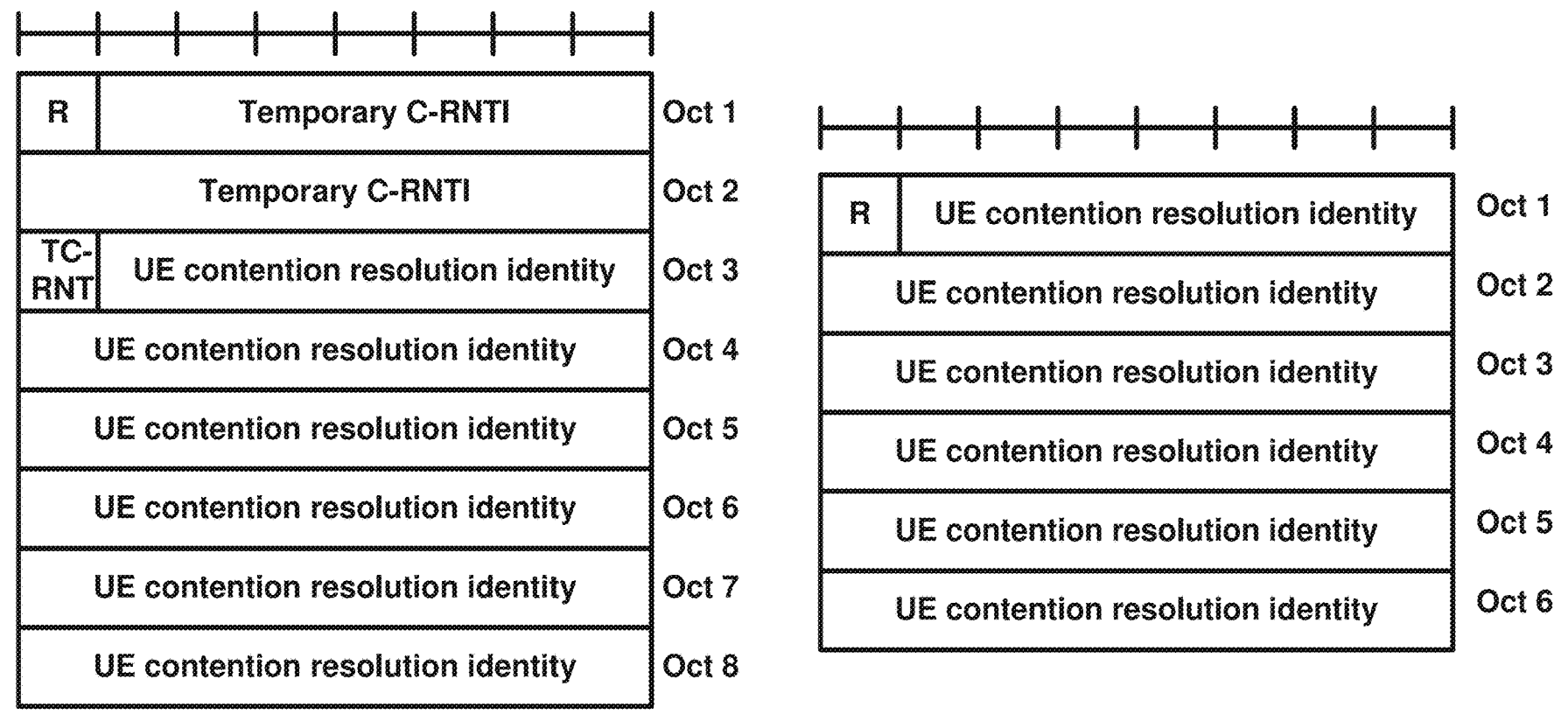

FIG. 30A, and FIG. 30B show example RAR formats. The RAR formats may be employed for a two-step RA procedure. An RAR for a two-step RA procedure may have a different format, size, and/or fields, from an RAR for a four-step RA procedure. An RAR may have a field to indicate a type of RAR (e.g., a reserved "R" field as shown in FIG. 28, for example, based on RARs for two-step and four-step RA procedures being multiplexed into a MAC PDU, and/or the RARs having different formats between two-step and four-step RA procedure). FIG. 30A, and FIG. 30B may be employed to indicate a type of RAR. A field for indicating an RAR type may be in a subheader (such as a MAC subheader) and/or in an RAR. An RAR may comprise different types of fields that may correspond with an indicator in a subheader and/or in an RAR. A wireless device may determine the boundary of one or more RARs in a MAC PDU, for example, based on one or more indicators.

A serving cell may be configured with one or multiple BWPs. a maximum number of BWP per serving cell may be a first number. BWP switching for a serving cell may be used to activate an inactive BWP and deactivate an active BWP at a determined time. BWP switching may be controlled by a PDCCH message (e.g., signal) indicating a downlink assignment or an uplink grant (e.g., by the bwp-InactivityTimer, by RRC signalling, or by the wireless device (e.g., MAC entity of the wireless device) itself upon initiation of RA procedure). The DL BWP and UL BWP indicated by a first active downlink BWP identifier (e.g., firstActiveDownlinkBWP-Id) and a first active uplink BWP identifier (e.g., firstActiveUplinkBWP-Id) respectively may be active without receiving a message (e.g., signal) via PDCCH indicating a downlink assignment or an uplink grant, for example, based on or in response to addition of an SpCell or activation of an SCell. The active BWP for a serving cell may be indicated by either an RRC message or PDCCH message (e.g., signal). A DL BWP may be paired with a UL BWP, and BWP switching may be common for both UL and DL, for example, based on an unpaired spectrum.

An activated serving cell may be configured with a BWP. A BWP may be activated and the wireless device (e.g., MAC entity of the wireless device) may: send (e.g., transmit) via a UL-SCH on the BWP; send (e.g., transmit) via a RACH on the BWP; monitor or continue to monitor the PDCCH on the BWP; send (e.g., transmit) a PUCCH signal on the BWP; send (e.g., transmit) an SRS signal on the BWP; receive a DL-SCH message on the BWP; and/or (re-)initialize any suspended configured uplink grants of configured grant Type 1 on the active BWP. The BWP activation may be based on a stored configuration, if any.

An activated serving cell may be configured with a BWP. The BWP may be deactivated and the wireless device (e.g., MAC entity of the wireless device) may: not send (e.g., transmit) via a UL-SCH on the BWP; not send (e.g., transmit) via a RACH on the BWP; may not monitor or continue to not monitor the PDCCH on the BWP; not send (e.g., transmit) via a PUCCH on the BWP; not report CSI for the BWP; not send (e.g., transmit) an SRS signal on the BWP; not receive a DL-SCH message on the BWP; clear any configured downlink assignment and configured uplink grant of configured grant Type 2 on the BWP; and suspend any configured uplink grant of configured grant Type 1 on the inactive BWP.

The wireless device (e.g., MAC entity of the wireless device) may switch the active UL BWP to BWP indicated by an initial uplink BWP parameter (e.g., initialUplinkBWP), for example, based on or in response to initiation of the RA procedure on a serving cell and/or, PRACH occasions not being configured for the active UL BWP. The wireless device (e.g., MAC entity of the wireless device) may switch the active DL BWP to BWP indicated by an initial downlink BWP parameter (e.g., initialDownlinkBWP), for example, based on the serving cell being a SpCell. The wireless device (e.g., MAC entity of the wireless device) may perform the RA procedure on the active DL BWP of SpCell and active UL BWP of this serving cell.

The wireless device (e.g., MAC entity of the wireless device) may switch the active DL BWP to the DL BWP with the same BWP index (e.g., bwp-Id) as the active UL BWP, for example, based on or in response to initiation of the RA procedure on a serving cell, the PRACH occasions being configured for the active UL BWP, the serving cell is a SpCell, and/or if the active DL BWP does not have the same BWP index (e.g., bwp-Id) as the active UL BWP. The wireless device (e.g., MAC entity of the wireless device) may perform the RA procedure on the active DL BWP of SpCell and active UL BWP of this serving cell.

The wireless device (e.g., MAC entity of the wireless device) may perform BWP switching to a BWP indicated by a PDCCH message, for example, based on the wireless device (e.g., MAC entity of the wireless device) receiving a PDCCH message for BWP switching of a serving cell; there being no ongoing RA procedure associated with this serving cell; and/or the ongoing RA procedure associated with this serving cell being successfully completed upon reception of the PDCCH message addressed to C-RNTI. A wireless device may determine whether to switch BWP or ignore the PDCCH message for BWP switching, for example, based on the wireless device (e.g., MAC entity of the wireless device) receiving a PDCCH message for BWP switching for a serving cell while a RA procedure associated with that serving cell is ongoing in the wireless device (e.g., MAC entity of the wireless device). The wireless device may perform BWP switching to a BWP indicated by the PDCCH message, for example, based on the PDCCH reception for BWP switching addressed to the C-RNTI for successful RA procedure completion. The wireless device (e.g., MAC entity of the wireless device) may stop the ongoing RA procedure and may initiate a RA procedure on the new activated BWP, for example, based on or in response to reception of the PDCCH message for BWP switching other than successful contention resolution, and/or the wireless device (e.g., MAC entity of the wireless device) deciding to perform BWP switching. The wireless device (e.g., MAC entity of the wireless device) may continue with the ongoing RA procedure on the active BWP, for example, based on the wireless device deciding to ignore the PDCCH message for BWP switching.

The wireless device (e.g., MAC entity of the wireless device), for each activated serving cell, may start or restart a BWP inactivity timer (e.g., bwp-InactivityTimer) associated with the active DL BWP. The start or restart may be based on the BWP inactivity timer (e.g., bwp-Inactivity-Timer) being configured, the default downlink BWP parameter (e.g., defaultDownlinkBWP) being configured, and/or the active DL BWP is not the BWP indicated by the default downlink BWP parameter (e.g., defaultDownlinkBWP). The start or restart may be based on the default downlink BWP parameter (e.g., defaultDownlinkBWP) not being configured, and/or the active DL BWP not being the initial downlink BWP parameter (e.g., initialDownlinkBWP). The start or restart may be based on a PDCCH message addressed to C-RNTI or CS-RNTI indicating downlink assignment or uplink grant is received on the active BWP. The start or restart may be based on a PDCCH message addressed to C-RNTI or CS-RNTI indicating downlink assignment or uplink grant being received for the active BWP. The start or restart may be based on a MAC PDU being sent (e.g., transmitted) in a configured uplink grant, and/or received in a configured downlink assignment: if there is no ongoing RA procedure associated with this serving cell; and/or if the ongoing RA procedure associated with this serving cell is successfully completed upon reception of this PDCCH message addressed to C-RNTI.

The wireless device (e.g., MAC entity of the wireless device), for each activated serving cell, may start or restart the BWP inactivity timer (e.g., bwp-InactivityTimer) associated with the active DL BWP, for example, based on the BWP inactivity timer (e.g., bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The start or restart may be based on the default downlink BWP parameter (e.g., defaultDownlinkBWP) not being configured, the active DL BWP not being the initial downlink BWP parameter (e.g., initialDownlinkBWP), a PDCCH message for BWP switching being received on the active DL BWP, and/or the wireless device (e.g., MAC entity of the wireless device) switching the active BWP.

The wireless device (e.g., MAC entity of the wireless device), for each activated serving cell, may stop the BWP inactivity timer (e.g., bwp-InactivityTimer) associated with the active DL BWP of this serving cell, if running, for example, based on the BWP inactivity timer (e.g., bwp-InactivityTimer) being configured, the default downlink BWP parameter (e.g., defaultDownlinkBWP) being configured, and the active DL BWP not being the BWP indicated by the default downlink BWP parameter (e.g., defaultDownlinkBWP), the default downlink BWP parameter (e.g., defaultDownlinkBWP) not being configured, the active DL BWP not being the initial downlink BWP parameter (e.g., initialDownlinkBWP), and/or RA procedure being initiated on this serving cell. The wireless device (e.g., MAC entity of the wireless device) may stop the BWP inactivity timer (e.g., bwp-InactivityTimer) associated with the active DL BWP of SpCell, if running, for example, based on if the serving cell is SCell The wireless device (e.g., MAC entity of the wireless device) may perform BWP switching to a BWP indicated by the default downlink BWP parameter (e.g., defaultDownlinkBWP), for example, based on the BWP inactivity timer (bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The wireless device (e.g., MAC entity of the wireless device) may perform BWP switching to a BWP indicated by the default downlink BWP parameter (e.g., defaultDownlinkBWP), for example, based on the default downlink BWP parameter (e.g., defaultDownlinkBWP) not being configured, the active DL BWP not being the initial downlink BWP parameter (e.g., initialDownlinkBWP), the BWP inactivity timer (e.g., bwp-InactivityTimer) associated with the active DL BWP expiring, and/or the default downlink BWP parameter (e.g., defaultDownlinkBWP) being configured. Otherwise the wireless device (e.g., MAC entity) may perform BWP switching to the initial downlink BWP parameter (e.g., initialDownlinkBWP).

A wireless device, configured for operation in BWPs of a serving cell, may be configured by higher layers for the serving cell a set of at most a first threshold value (e.g., 4, 8, 16, 32 or any other quantity) of BWPs for reception by the wireless device in a DL bandwidth (e.g., a DL BWP set) by a BWP downlink parameter (e.g., BWP-Downlink) and a set of at most a second threshold value (e.g., 4, 8, 16, 32 or any other quantity) BWPs for transmissions by the wireless device in an UL bandwidth (e.g., a UL BWP set) by a BWP uplink parameter (e.g., BWP-Uplink) for the serving cell.

An initial active DL BWP may be defined by a location and number of contiguous PRBs, a subcarrier spacing, and a cyclic prefix, for the control resource set for a downlink common search space (e.g., Type0-PDCCH common search space). A wireless device may be provided (e.g., configured with, indicated by, etc.) an initial active UL BWP by a higher layer initial uplink BWP parameter (e.g., initialuplinkBWP) for example, for operation on the primary cell or on a secondary cell The wireless device may be provided (e.g., configured with, indicated by, etc.) an initial UL BWP on the supplementary carrier by a higher layer initial uplink BWP parameter (e.g., initialUplinkBWP) in a supplementary uplink, for example, based on the wireless device being configured with a supplementary carrier.

The wireless device may be provided by (e.g., configured by, indicated by, etc.) a higher layer first active downlink BWP index parameter (e.g., firstActiveDownlinkBWP-Id) a first active DL BWP for reception and, by a higher layer first active uplink BWP index parameter (e.g., firstActiveUplinkBWP-Id), a first active UL BWP for transmissions on the primary cell, for example, based on a wireless device having a dedicated BWP configuration.

The wireless device may be configured with the following parameters for the serving cell for each DL BWP or UL BWP in a set of DL BWPs or UL BWPs, respectively: a subcarrier spacing provided by (e.g., configured by, stored in, indicated by, etc.) a parameter (e.g., a higher layer parameter such as, for example, subcarrierSpacing); a cyclic prefix provided by (e.g., configured by, stored in, indicated by, etc.) a parameter (e.g., a higher layer parameter such as, for example, cyclicPrefix); a first PRB and a number of contiguous PRBs indicated by a parameter (e.g., a higher layer parameter such as, for example, locationAndBandwidth) that may be interpreted as RIV, setting $N_{BWP}^{size}=275$, and the first PRB being a PRB offset relative to the PRB indicated by parameters (e.g., a higher layer parameter such as, for example, offsetToCarrier and subcarrierSpacing); an index in the set of DL BWPs or UL BWPs via a parameter (e.g., a higher layer parameter such as, for example, bwp-Id); and/or a set of BWP-common and a set of BWP-dedicated parameters via parameters (e.g., a higher layer parameter such as, for example, bwp-Common and bwp-Dedicated).

A DL BWP from the set of configured DL BWPs with index provided by (e.g., configured by, indicated by, etc.) higher layer BWP index parameter (e.g., bwp-Id) for the DL BWP is linked with an UL BWP from the set of configured UL BWPs with index provided (e.g., configured by, indicated by, etc.) by higher layer BWP index parameter (e.g., bwp-Id) for the UL BWP if the DL BWP index and the UL BWP index are equal, for example, based on unpaired spectrum operation A wireless device may not expect to receive a configuration where the center frequency for a DL BWP is different than the center frequency for an UL BWP if the BWP index parameter (bwp-Id) of the DL BWP is equal to the bwp-Id of the UL BWP, for example, based on unpaired spectrum operation.

A wireless device may be configured control resource sets for every type of common search space and for wireless device-specific search space, for example, for each DL BWP in a set of DL BWPs on the primary cell. The wireless device may not expect to be configured without a common search space on the PCell, or on the PSCell, in the active DL BWP. The wireless device may be configured resource sets for PUCCH transmissions, for example, for each UL BWP in a set of UL BWPs.

A wireless device may receive PDCCH messages and PDSCH messages via a DL BWP according to a configured subcarrier spacing and CP length for the DL BWP. A wireless device may send (e.g., transmit) PUCCH messages and PUSCH messages via an UL BWP according to a configured subcarrier spacing and CP length for the UL BWP.

A field (e.g., a BWP indicator field) value may indicate the active DL BWP, from the configured DL BWP set, for DL receptions, for example, based on a BWP indicator field being configured in DCI format 1_1. The BWP indicator field value may indicate the active UL BWP, from the configured UL BWP set, for UL transmissions, for example, based on a BWP indicator field being configured in DCI format 0_1.

The wireless device may prepend zeros to the information field until its size is the one required for the interpretation of the information field for the UL BWP or DL BWP prior to interpreting a DCI format 0_1 or DCI format 1_1 information fields, respectively, for example, based on a BWP indicator field being configured in DCI format 0_1 or DCI format 1_1 and/or indicating an UL BWP or a DL BWP different from the active UL BWP or DL BWP, respectively, for each information field in the received DCI format 0_1 or DCI format 1_1; and/or the size of the information field being smaller than the one required for the DCI format 0_1 or DCI format 1_1 interpretation for the UL BWP or DL BWP that is indicated by the BWP indicator, respectively. The wireless device may use a number of least significant bits of DCI format 0_1 or DCI format 11 equal to the one required for the UL BWP or DL BWP indicated by BWP indicator prior to interpreting the DCI format 0_1 or DCI format 1_1 information fields, respectively, for example, based on the size of the information field being larger than the one required for the DCI format 0_1 or DCI format 1_1 interpretation for the UL BWP or DL BWP that is indicated by the BWP indicator, respectively. The wireless device may set the active UL BWP or DL BWP to the UL BWP or DL BWP indicated by the BWP indicator in the DCI format 0_1 or DCI format 1_1, respectively.

A wireless device may expect to detect a DCI format 01 indicating active UL BWP change, or a DCI format 1_1 indicating active DL BWP change, for example, based on a corresponding PDCCH message being received within a first threshold (e.g., 3, 4, 5, or any other quantity) of symbols of a slot.

A wireless device may be provided by (e.g., configured by, indicated by, etc.) a higher layer default downlink BWP index parameter (e.g., defaultDownlinkBWP-Id) a default DL BWP among the configured DL BWPs, for example, for the primary cell The default DL BWP may be the initial active DL BWP, for example, based on a wireless device not being provided (e.g., configured by, indicated by, etc.) a default DL BWP by higher layer default downlink BWP index parameter (e.g., defaultDownlinkBWP-Id.)

A wireless device may be configured for a secondary cell with higher layer default downlink BWP index parameter (e.g., defaultDownlinkBWP-Id) indicating a default DL BWP among the configured DL BWPs. The wireless device may be configured with higher layer BWP inactivity timer parameter (e.g., bwp-InactivityTimer) indicating a timer value. The wireless device procedures on the secondary cell may be the same as on the primary cell, using a timer value for the secondary cell and the default DL BWP for the secondary cell.

The wireless device may increment a timer every interval of a first duration (e.g., 1 millisecond or any other duration) for frequency range 1, or every second duration (e.g., 0.5 milliseconds or any other duration) for frequency range 2, for example, based on the wireless device being configured by higher layer BWP inactivity timer parameter (e.g., bwp-InactivityTimer), a timer value for the primary cell and the timer is running, the wireless device not detecting a DCI format for PDSCH reception on the primary cell for paired spectrum operation, if the wireless device not detecting a DCI format for PDSCH reception, and/or a DCI format for PUSCH transmission on the primary cell for unpaired spectrum operation during the interval. A wireless device may increment a timer every interval of a first duration (e.g., 1 millisecond or any other duration) for frequency range 1 or every second duration (e.g., 0.5 milliseconds or any other duration) for frequency range 2, for example, based on a wireless device being configured by higher layer BWP inactivity timer parameter (e.g., BWP-InactivityTimer), a timer value for a secondary cell, the timer being running, the wireless device not detecting a DCI format for PDSCH reception on the secondary cell for paired spectrum operation, the wireless device not detecting a DCI format for PDSCH reception, and/or a DCI format for PUSCH transmission on the secondary cell for unpaired spectrum operation during the interval. The wireless device may deactivate the secondary cell if the timer expires.

The wireless device may use the indicated DL BWP and the indicated UL BWP on the secondary cell as the respective first active DL BWP and first active UL BWP on the secondary cell or supplementary carrier, for example, based on a wireless device being configured by a higher layer first active downlink BWP index parameter (e.g., firstActive-DownlinkBWP-Id), a first active DL BWP, and by higher layer first active uplink BWP index parameter (e.g., firstActiveUplinkBWP-Id), and/or a first active UL BWP on a secondary cell or supplementary carrier. A wireless device does not expect to send (e.g., transmit) HARQ-ACK information on a PUCCH resource indicated by a DCI format 1_0 or a DCI format 1_1, for example, based on paired spectrum operation, the wireless device changes its active UL BWP on the PCell between a time of a detection of the DCI format 1_0 or the DCI format 1_1, and/or a time of a corresponding HARQ-ACK information transmission on the PUCCH. A wireless device may not expect to monitor or continue to monitor PDCCH if the wireless device performs RRM via a bandwidth that is not within the active DL BWP for the wireless device.

A type of LBT procedure (e.g., CAT1, CAT2, CAT3, and/or CAT4) may be configured via control messages (e.g., RRC, MAC CE, and/or DCI) per a cell, for example, in an unlicensed band. a type of LBT procedure (e.g., CAT1, CAT2, CAT3, and/or CAT4) may be configured via control messages (e.g., RRC, MAC CE, and/or DCI) per BWP. A type of LBT procedure (e.g., CAT1, CAT2, CAT3, and/or CAT4) may be determined at least based on a numerology configured in a BWP. BWP switching may change a type of LBT procedure.

A wireless device may be configured (e.g., by a base station) with one or more UL carriers associated with one DL carrier of a cell. One of one or more UL carriers configured with a DL carrier may be referred to as a supplementary uplink (SUL) carrier or a normal UL (NUL or may be referred to as a non-SUL) carrier. A base station may enhance UL coverage and/or capacity by configuring an SUL carrier. A base station may configure a BWP configuration per an uplink (e.g., per uplink carrier) associated with a cell. One or more BWPs on an SUL may be configured (e.g., by a base station) separately from one or more BWPs on a NUL. A base station may control an active BWP of an SUL independently of an active BWP of a NUL. A base station may control two or more uplink transmissions on two or more ULs (e.g., NUL and SUL) to avoid overlapping PUSCH transmissions in time.

A base station may avoid configuring parallel uplink transmissions via a SUL and an NUL of a cell, wherein the parallel uplink transmissions may be PUCCH transmissions (and/or PUSCH transmissions) via SUL and PUCCH transmissions (and/or PUSCH) via NUL. A base station may send (e.g., transmit) one or more RRC message (e.g., wireless device specific RRC signaling) to configure and/or reconfigure a location of a PUCCH transmissions on an SUL carrier and/or on a NUL carrier. A wireless device may receive (e.g., from a base station) one or more RRC messages comprising configuration parameters for a carrier. The configuration parameters may indicate at least one of: an RA procedure configuration, BWP configurations (e.g., number of DL/UL BWPs, a bandwidth and/or index of configured DL/UL BWP, and/or initial, default, and/or active DL/UL BWP), a PUSCH configuration, a PUCCH configuration, an SRS configuration, and/or a power control parameter.

An SUL carrier and a NUL carrier may be configured (e.g., by a base station) to support a RA procedure (e.g., initial access). Support for a RA to a cell configured with SUL is shown in FIG. 12, described above. A RACH configuration 1210 of an SUL may be configured (e.g., by a base station) independent of a RACH configuration 1210 of an NUL. One or more parameters associated with Msg1 1220, Msg 2 1230, Msg 3 1240, and/or contention resolution 1250 via an SUL may be configured independent of one or more parameters associated with Msg1 1220, Msg 2 1230, Msg 3 1240, and/or contention resolution 1250 via an NUL. One or more parameters associated with PRACH transmissions in Msg 1 1220 via an SUL may be independent of one or more parameters associated with PRACH transmission via an NUL.

A wireless device may determine which carrier (e.g., between NUL and SUL) to use, for example, based on an RA procedure in licensed bands and/or a measurement (e.g., RSRP) of one or more DL pathloss references a wireless device may select a first carrier (e.g., SUL or NUL carrier) if a measured quality (e.g., RSRP) of DL pathloss references is less than a broadcast threshold (e.g., an RRC parameter, rsrp-ThresholdSSB-SUL in FIG. 18). One or more uplink transmissions associated with the RA procedure may remain on the selected carrier, for example, based on a wireless device selecting a carrier between SUL carrier and NUL carrier for an RA procedure.

An NUL and an SUL may be configured (e.g., by a base station) with a TAG. A wireless device may employ a TA value received during a RA procedure via a second carrier (e.g., NUL) of the cell, for example, based on an uplink transmission of a first carrier (e.g., SUL) of a cell.

Figure 31:
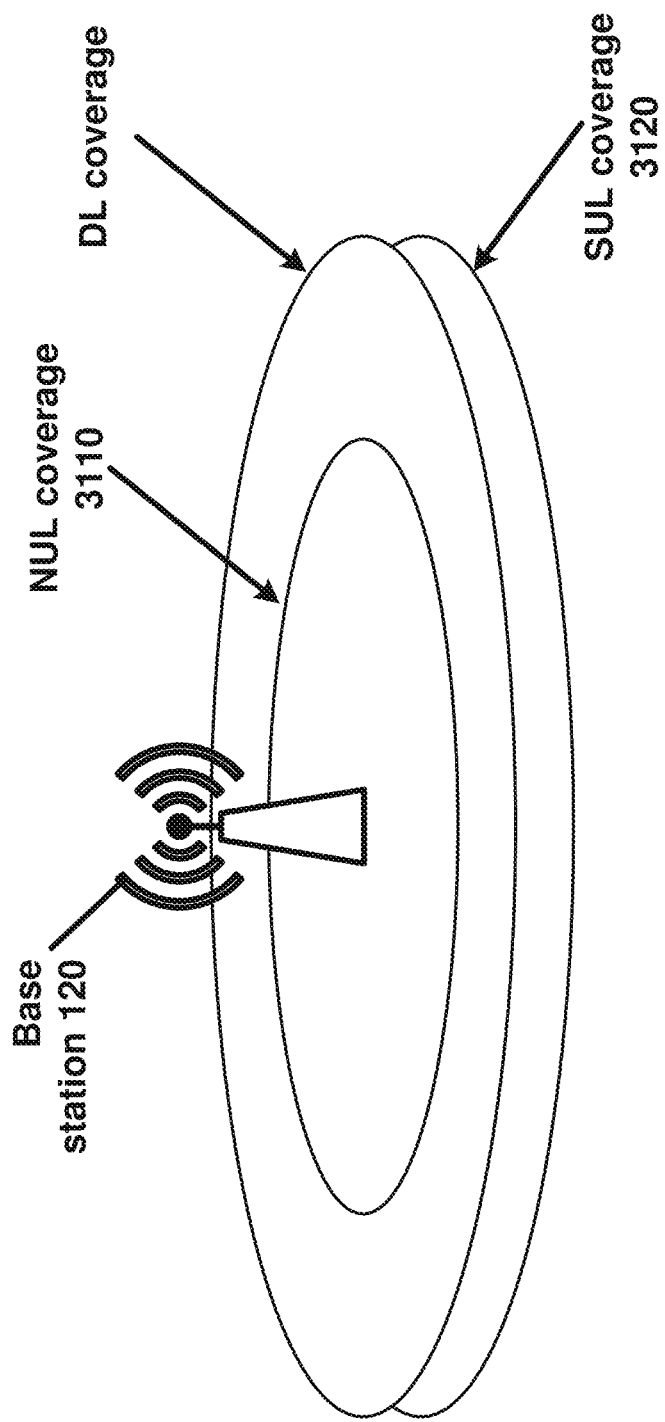
FIG. 31 shows an example of a coverage of a cell configured with a downlink and two uplinks.

FIG. 31 shows an example of a coverage of a cell configured with a DL and two ULs. A base station may configure a NUL and DL over a first frequency (e.g., high frequency). An SUL may be configured over a second frequency (e.g., low frequency) to support uplink transmission (e.g., in terms of coverage and/or capacity) of a cell. A broadcast threshold (e.g., an RRC parameter, rsrp-ThresholdSSB-SUL) for a wireless device to select a carrier may be determined such that a wireless device located outside a NUL coverage 3110 but inside an SUL coverage 3120 may start a RA procedure via an SUL. A wireless device located inside a NUL coverage 3110 may start a RA procedure via a NUL. A wireless device may use a RACH configuration associated with a selected carrier for a RA procedure.

A wireless device may perform a contention based RA procedure and/or a contention free RA procedure. A wireless device may perform a RA procedure on an UL selected based on a broadcast threshold (e.g., rsrp-ThresholdSSB-SUL). A base station may not indicate (e.g., explicitly) to the wireless device which carrier to start a RA procedure. A base station may indicate which carrier a wireless device performs a RA procedure by sending a RACH configuration with an SUL indicator (e.g., 0 may indicates a NUL carrier, 1 may indicate an SUL carrier or vice versa). A base station may indicate (e.g., explicitly) to a wireless device which UL carrier is to be used for a contention free or contention based RA procedure. A base station may indicate a contention free RA procedure by sending a RACH configuration with a dedicated preamble index. A base station may indicate a contention based RA procedure by sending a RACH configuration without a dedicated preamble index.

It may be beneficial for a network to receive one or more measurements of NUL carrier(s) and/or SUL carrier(s) to initiate a (contention free or contention based) RA procedure for a wireless device. A base station may configure a wireless device (e.g., a wireless device in RRC Connected) with one or more measurements on one or more DL reference signals associated with NUL carrier(s) and/or SUL carrier(s) of a cell.

A base station may select a carrier between NUL carrier(s) and/or SUL carrier(s), for example, based on the quality of the one or more measurements and/or if a wireless device sends quality information of one or more measurements on one or more DL reference signals associated with NUL carrier(s) and/or SUL carrier(s). A base station may indicate, to a wireless device, a selected carrier via RRC signaling (e.g., handover) and/or PDCCH order (e.g., SCell addition) for initiating a (contention free or contention based) RA procedure. For load balancing between NUL carrier(s) and/or SUL carrier(s), a base station may select one of NUL and SUL carrier by taking into consideration congestion in NUL carrier(s) and/or SUL carrier(s). A base station may better select a carrier (e.g., NUL or SUL) of a target cell for a (contention free or contention based) RA procedure for a handover, for example, based on one or more measurement reports associated with NUL carrier(s) and/or SUL carrier(s). A base station may better select a carrier (e.g., NUL or SUL) of an SCell (e.g., if the SCell is configured with at least a NUL carrier and an SUL carrier) for a (contention free or contention based) RA procedure for an SCell addition, for example, based on one or more measurement reports associated with NUL carrier(s) and/or SUL carrier(s).

A source base station may make a decision on a handover to one or more target cells, for example, for a handover of a wireless device. A source base station may indicate a handover decision to a target base station associated with one or more target cells that the source base station selects. A target base station may indicate to a wireless device (e.g., through a cell of a source gNB) which carrier (between NUL carrier(s) and SUL carrier(s)) to use via a handover command. A handover command received by a wireless device may comprise an SUL indicator (e.g., 1 bit) along with one or more RACH parameters (e.g., dedicated preamble index, and/or PRACH mask index), wherein the SUL indicator may indicate if the one or more RACH parameters are associated with an SUL or NUL carrier.

It may be useful that a source base station informs a target base station about measured results on NUL carrier(s) and SUL carrier(s), e.g., high frequency carrier(s) and low frequency carrier(s), so that the target base station determines a carrier on which a wireless device may perform a (contention free or contention based) RA procedure for a handover. The source base station may need to know whether SUL carrier(s) is (are) configured in the target gNB, and/or which carrier is allowed to be used for a handover, for example, if a source base station configures DL measurements on one or more cells association with a NUL carrier(s) and/or SUL carrier(s) of a target gNB. A target base station may inform a source base station of one or more configurations of NUL carrier(s) and/or SUL carrier(s) of one or more cells in the target gNB. A source base station may configure DL measurement on one or more cells in the target gNB, based on one or more configurations indicating carrier configurations at the one or more cells in the target gNB.

A base station may be aware of whether SUL carrier(s) is (are) configured in an SCell, and/or which carrier is allowed to be used for an SCell addition. A base station may configure DL measurements on NUL carrier(s) and/or SUL carrier(s). A base station may configure a wireless device with one or more RACH configurations for an SCell, e.g., a first RACH configuration for an SUL carrier, a second RACH configuration for a NUL carrier, and so on. A base station may send (e.g., transmit), to a wireless device via a PDCCH order comprising a parameter indicating in which carrier the wireless device starts a (contention free or contention based) RA procedure. A PDCCH order triggering a (contention free or contention based) RA procedure may comprise one or more parameters indicating at least one of at least one preamble (e.g., preamble index), one or more PRACH resources (e.g., PRACH mask index), an SUL indicator, and/or a BWP indicator. A wireless device receiving a PDCCH order may send (e.g., transmit) at least one preamble via one or more PRACH resources of a BWP indicated by a BWP indicator of a carrier indicated by an SUL indicator, for example, for a RA procedure.

A wireless device may determine a RA procedure unsuccessfully completed. The wireless device may consider the RA procedure unsuccessfully completed, for example, if a wireless device receives no RAR corresponding to one or more preambles sent by the wireless device during a RA procedure. There may be a number of preamble transmissions allowed during a RA procedure (e.g., preambleTransMax in FIG. 20), wherein the number of preamble transmissions may be semi-statically configured by RRC. The wireless device may consider a RA procedure unsuccessfully completed, for example, if a wireless device receives no RAR corresponding to the number of preamble transmissions. A wireless device may indicate a problem to upper layer(s), for example, after an unsuccessful completion of a RA procedure, and after the indicated problem. The upper layers(s) may trigger radio link failure that may lead to prolonged RA delay and degraded user experience.

A base station (source base station and/or a target gNB) configuring a wireless device with a RACH configuration for a RA (for a handover and/or SCell addition) may not allow to reuse the RACH configuration if the RA is unsuccessfully completed.

A failure of a (contention free or contention based) RA may result in a long delay of RA. A wireless device may initiate a contention based RA procedure, for example, if a contention free random access is unsuccessfully completed, instead of a contention free random access. The wireless device may perform an initial access to the target base station based on a contention based random access, for example, if a wireless device fails a contention free random access to a target base station during a handover. A wireless device performing a contention based random access procedure may compete with one or more wireless devices to get an access to a gNB, which may not guarantee a success of the contention based random access procedure, and/or which may take long (e.g., four step procedure of the contention based random access procedure comparing with a contention free random access comprising MSG 1 1220 and MSG 2 1230 transmissions) to receive a corresponding RAR.

The wireless device may wait until a base station sends a message (e.g., PDCCH order) indicating a RACH configuration, for example, based on which the wireless device may initiate a RA for an SCell addition and/or if a wireless device fails a contention free random access for an SCell addition. It may take long for a base station to detect a failure of a RA for an SCell addition. A wireless device may wait for a message (e.g., PDCCH order) sent to a base station for an SCell addition unnecessarily long.

Figure 32:
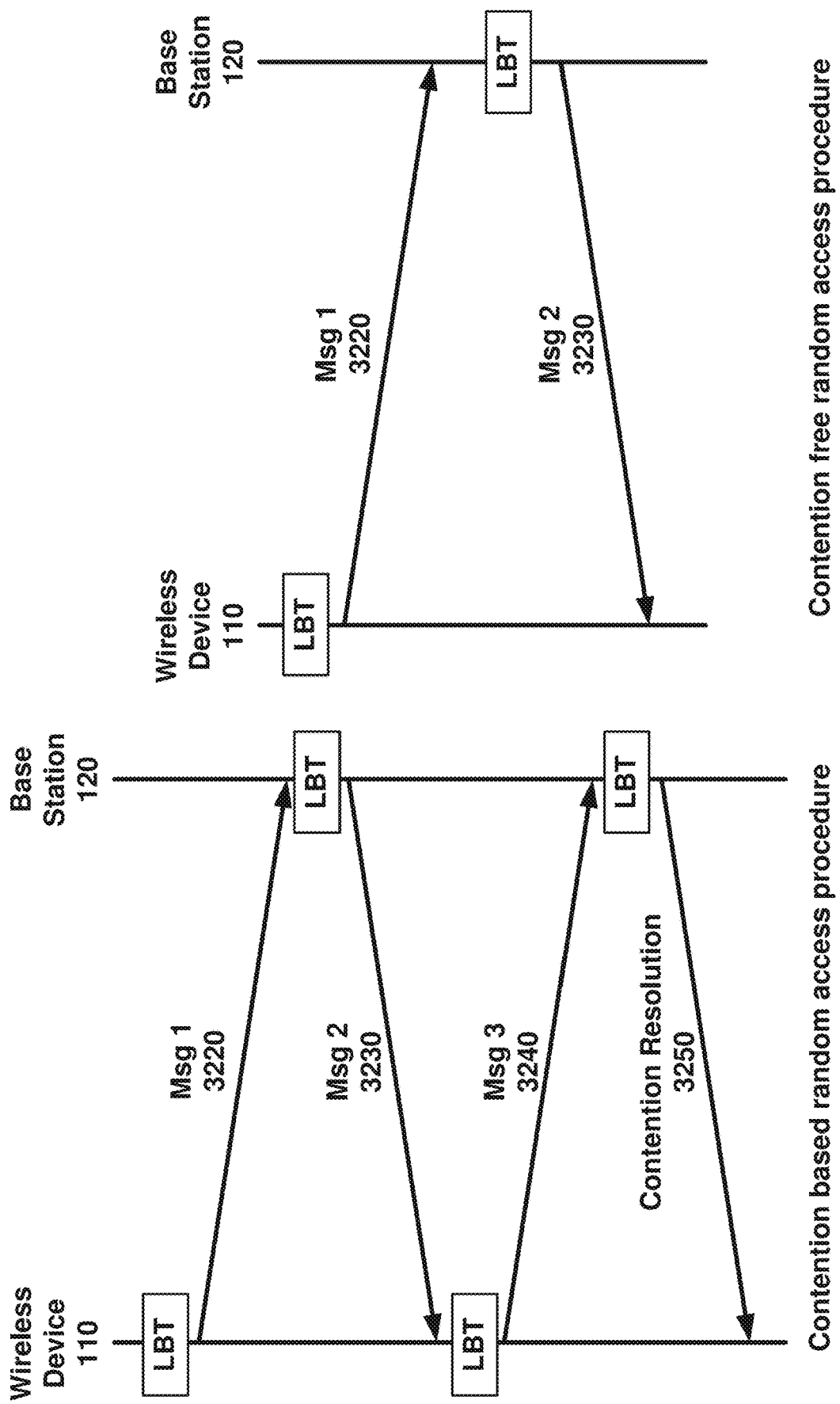
FIG. 32 shows an example of contention based and contention-free random access (RA) procedures with LBT.

FIG. 32 shows contention based and contention-free random access procedures with LBT. A successful contention based random access procedure may use Msg 1 3220, Msg 2 3230, Msg 3 3240, and contention resolution 3250 to perform the RA procedure with the wireless device 110 and base station 120. The wireless device may perform a first LBT, determine that the medium is clear, and send Msg 1 3220 to a base station 120. The base station 120 may perform a second LBT, determine that the medium is clear, and send Msg 2 3230 to the wireless device 110. The wireless device 110 may perform a third LBT, determine the medium is clear, and send Msg 1 3220 to the base station 120. The base station 120 may perform a fourth LBT, determine that the medium is clear, and sends contention resolution 3250 to the wireless device 110.

A successful contention-free based RA procedure may use Msg 1 3220 and Msg 2 3230 to perform the RA procedure with the wireless device 110 and the base station 120. The wireless device 110 may perform a first LBT, determine that the medium is clear, and send Msg 1 3220 to the base station 120. The base station 120 may perform a second LBT, determine that the medium is clear, and send Msg 2 3230 to the wireless device 110.

A failure of a RA may occur due to LBT, for example, in an unlicensed band. At least one LBT may be performed prior to DL and/or UL transmission. Msg 1 1220, Msg 2 1230, Msg 3 1240, and/or contention resolution 1250 may require at least one LBT before the transmission (e.g., at least 4 LBTs), for example, in a contention based random access procedure. Msg 1 1220 and Msg2 1230 may require at least one LBT each (e.g., at least 2 LBTs), for example, for a contention-free random access procedure. A base station and/or a wireless device may not send (e.g., transmit) a message (e.g., Msg 1 3220, Msg 2 3230, Msg 3 3240, and/or contention resolution 3250) for a RA procedure, for example, if the LBT procedure has failed prior to sending the message (e.g., CCA in LBT determines that a channel in unlicensed band is busy (e.g., occupied by another device)).

A failure of an LBT procedure may result in degrading a user experience (e.g., in terms of QoS, capacity (e.g., throughput), and/or coverage). A base station and/or a wireless device may wait until the channel becomes idle. This waiting may result in a latency problem to make a radio link connection between a base station and a wireless device. A failure of an LBT during a RA procedure may lead a long delay for a wireless device to receive an UL grant and/or TA value from a base station. This delay may result in a call drop and/or traffic congestion. A failure of an LBT procedure in a RA procedure for an SCell addition may lead a cell congestion (e.g., load imbalancing) on one or more existing cells (e.g., if an SCell may not take over traffic from the one or more existing cells in time).

An efficiency of RA procedure operating in an unlicensed band may degrade with LBT failure, which may cause a latency/delay, and/or performance degradation. Selecting two or more SSBs and performing one or more LBT procedures via one or more PRACH occasions associated with the two or more SSBs may increase a success rate of LBT procedures. A wireless device may measure a plurality of downlink reference signals (e.g., SSBs or CSI-RSs, if CSI-RS is configured by RRC). The wireless device may select two or more SSBs by comparing RSRPs of the plurality of downlink reference signals and a threshold. The threshold may comprise a RSRP threshold SSB parameter (e.g., rsrp-ThresholdSSB) if the plurality of downlink reference signals are SSBs. The threshold may comprise a RSRP threshold CSI-RS parameter (e.g., rsrp-Threshold-CSI-RS) if the plurality of downlink reference signals are CSI-RSs. The wireless device may select two or more downlink referencing signals (SSBs or CSI-RSs) having RSRPs that are higher than the threshold. The wireless device may determine one or more PRACH occasions associated with the selected two or more downlink reference signals (e.g., SSBs), for example, based on SSBs being configured with the wireless device. The wireless device may determine the one or more PRACH transmissions based on an association between PRACH occasions and SSBs that may be indicated by one or more RRC parameters (e.g., ra-ssb-OccasionMaskIndex). The wireless device may determine one or more PRACH occasions associated with the selected two or more downlink reference signals (e.g., CSI-RSs), for example, based on CSI-RSs being configured with the wireless device. The wireless device may determine the one or more PRACH transmissions based on an association between PRACH occasions and CSI-RSs that may be indicated by one or more RRC parameters (e.g., ra-OccasionList).

Figure 33:
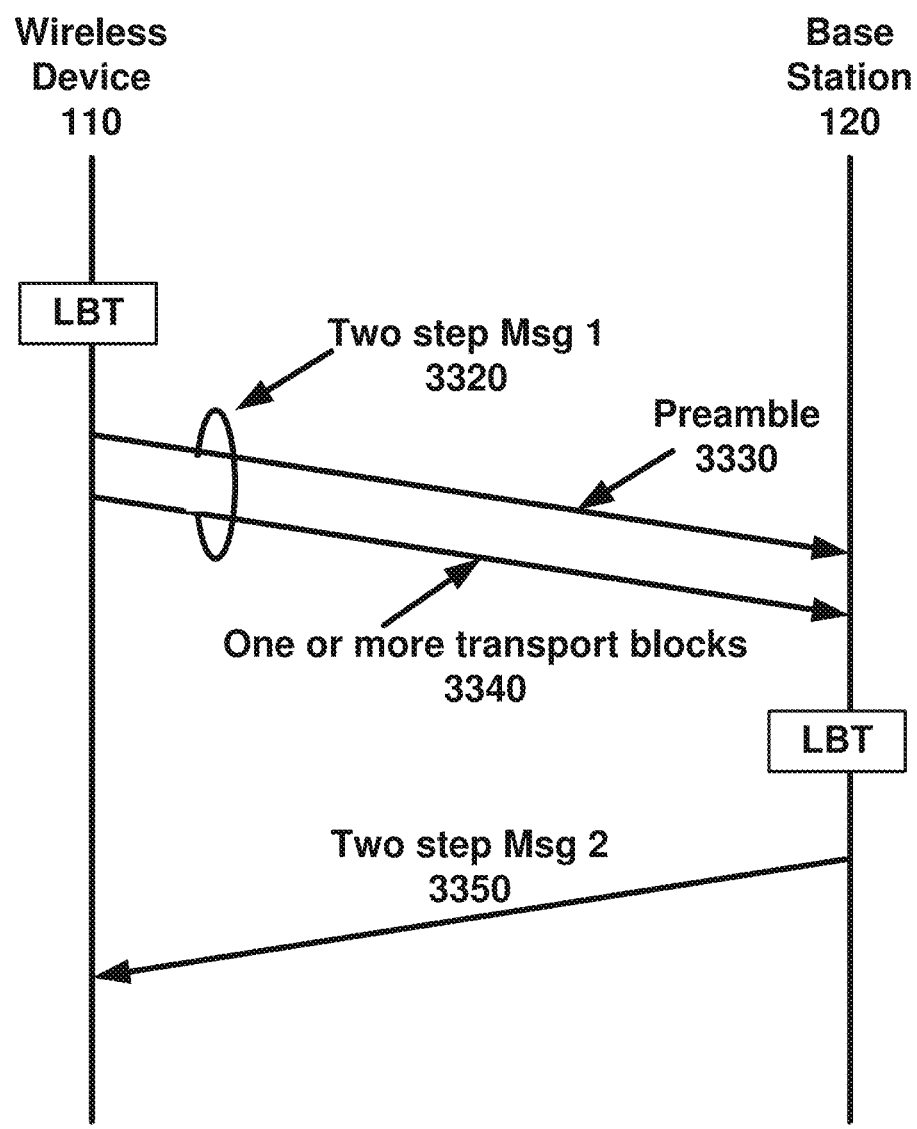
FIG. 33 shows an example of a two-step RA procedure with LBT.

FIG. 33 is an example diagram of a two-step RA procedure with LBT. A two-step RA procedure may employ LBT in an unlicensed band. A base station and/or a wireless device may not send (e.g., transmit) a message (e.g., two-step Msg 1 3320, preamble 3330, one or more TBs 3340, and/or two-step Msg 2 3340) for a RA procedure if LBT is failed prior to sending (e.g., transmitting) the message (e.g., CCA in LBT determines that a channel in unlicensed band is busy, e.g., occupied by other device). The transmissions of the preamble 3330 and for one or more TBs 3340 may have a same LBT procedure and/or different LBT procedures.

Radio resources for transmissions of a preamble 3330 and one or more TBs 3340 may be configured in a same channel (or a same subband or a same BWP or a same UL carrier), where a wireless device performs an LBT procedure for the transmissions (e.g., based on a regulation). An LBT result on the same channel (or the same subband or the same BWP or the same UL carrier) may be applied for transmissions of the preamble 3330 and for one or more TBs 3340.

Figure 34:
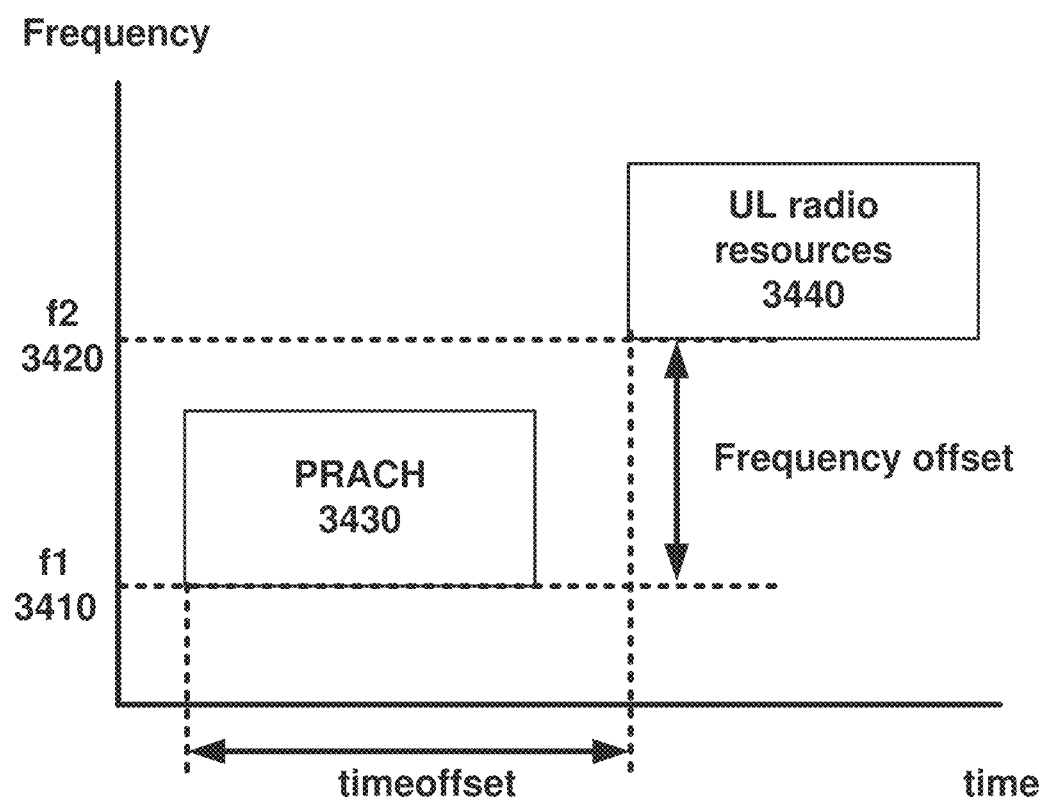
FIG. 34 shows an example of radio resource allocation for a two-step RA procedure.

FIG. 34 is an example of radio resource allocation for a two-step RA procedure. PRACH resource 3430 and UL radio resources 3440 may be time-multiplexed, for example, based on a frequency offset in FIG. 34 being zero. PRACH 3430 resource and UL radio resources 3440 may be frequency-multiplexed, for example, based on a timeoffset in FIG. 34 being zero. The frequency offset in FIG. 34 may be an absolute number in terms of Hz, MHz, and/or GHz, and/or a relative number (e.g., one of index from a set of frequency indices that are predefined/preconfigured). The timeoffset in FIG. 34 may be an absolute number in terms of micro-second, milli-second, and/or second and/or a relative number (e.g., in terms of subframe, slot, mini-slot, OFDM symbol). PRACH resource 3430 for transmission of the preamble 3330 and UL radio resources for transmission of one or more TBs 3340 may be subject to one LBT procedure if f1 3410 and f2 3420 are configured in the same channel (or a same subband or a same BWP or a same UL carrier). One LBT procedure before a PRACH resource 3430 may be performed by a wireless device (e.g., based on a regulation of unlicensed band). A quantity of LBT procedures may be determined based on a value of the timeoffset. One LBT procedure before a PRACH resource 3430 may be performed by a wireless device, for example, if the value of a time offset is equal to and/or less than a threshold (e.g., that may be configured and/or defined by a regulation). The one LBT procedure may determine idle and a wireless device may perform a transmission of the preamble 3330 via PRACH resource 3430 followed by a second transmission of one or more TBs 3340 via the UL radio resources 3440 with no LBT procedure (the transmission order may be switched if the UL radio resources 3440 is allocated before PRACH resource 3430 in time domain). PRACH and UL radio resources may be allocated closely enough in time domain. A wireless device may perform a first LBT procedure before a PRACH resource 3430 and perform a second LBT procedure before Ul radio resources 3440, for example, based on the value of timeoffset being larger than the threshold A bandwidth of BWP and/or UL carrier may be larger than a first value (e.g., 20 MHz). f1 3410 and f2 3420 may be configured in the bandwidth. A wireless device may perform an LBT procedure and apply a result (e.g., idle or busy) of the LBT procedure to the transmission of the preamble 3330 and UL radio resources for transmission of one or more TBs 3340. A wireless device may perform the transmissions of the preamble 3330 and for one or more TBs 3340. If the channel is busy, a wireless device may not perform the transmissions of the preamble 3330 and for one or more TBs 3340, for example, based on the channel being idle.

A bandwidth of BWP and/or UL carrier may be less than a first value (e.g., 20 MHz). f1 3410 and f2 3420 may be configured in the bandwidth. A wireless device may perform an LBT procedure and apply a result (e.g., idle or busy) of the LBT procedure to the transmission of the preamble 3330 and UL radio resources for transmission of one or more TBs 3340. A wireless device may perform a first transmission of the preamble 3330 followed by a second transmission of one or more TBs 3340, for example, based on if the channel being idle. A wireless device may not perform the transmissions of the preamble 3330 and for one or more TBs 3340, for example, based on the channel being busy.

Radio resources for transmissions of the preamble 3330 and one or more TBs 3340 may be configured in different channels, different subbands, different BWPs, and/or different UL carriers (e.g., one in NUL and the other one in SUL) that may require separate LBT procedures. A wireless device may perform a LBT procedure per one or more channels, per one or more subbands, per one or more BWPs, and/or per one or more UL carriers.

Figure 35:
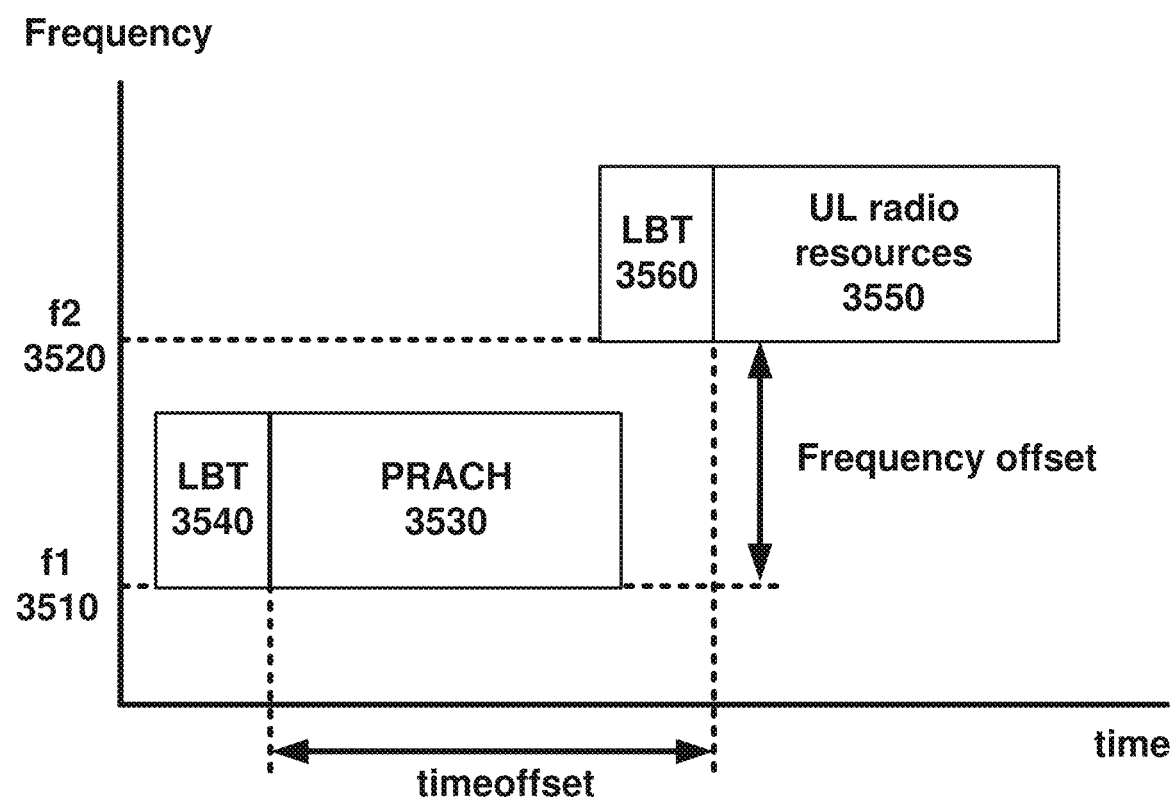
FIG. 35 shows an example of one or more LBT procedures for a two-step RA procedure.

FIG. 35 shows an example of one or more LBT procedures performed for a two-step RA procedure UL radio resources 3550 may be allocated before or aligned with PRACH resources 3530 in time. A wireless device may perform a first LBT procedure (e.g., LBT 3540 in FIG. 35) before a first transmission of preamble 3330 (e.g., via PRACH resources 3530) and perform a second LBT procedure (e.g., LBT 3560 in FIG. 35) before a second transmission of one or more TBs 3340 (e.g., via UL radio resources 3550). A wireless device may perform none of, one of, or both of the first transmission and the second transmission, depending on results of the first LBT procedure and second LBT procedure. Separate LBTs before a PRACH message and/or data may provide benefits, such as: earlier transmission of the first transmission and/or second transmission by a wireless device, earlier transmission of a preamble than if a larger LBT were used, and increased probability that a transmission will be successful.

The first transmission may be performed if a first result of the first LBT procedure is idle. The second transmission may be independent of the first result. The second transmission may be performed if a second result of the second LBT procedure is idle. A wireless device may send (e.g., transmit) the preamble 3330, for example, in response to the first LBT procedure being idle. The wireless device may not be able to send (e.g., transmit) one or more TBs 3340 in response to the second LBT procedure being busy. A wireless device may not send (e.g., transmit) the preamble 3330 in response to the first LBT procedure being busy. The wireless device may send (e.g., transmit) one or more TBs 3340 in response to the second LBT procedure being idle. In a two-step RA procedure, one or more TBs may comprise an identifier of the wireless device, for example, so that a base station may identify and/or indicate which wireless device sent (e.g., transmitted) the one or more TBs. The identity may be configured by the base station and/or may be at least a portion of wireless device-specific information (e.g., resume ID, DMRS sequence/index, IMSI, etc). A base station may identify and/or indicate the wireless device based on the identity in the one or more TBs, for example, based on a wireless device sending (e.g., transmitting) one or more TBs with no preamble 3330 (e.g., if a channel, e.g. PRACH 3530 is busy).

Separate LBT procedures for transmissions of a preamble and one or more TBs may be performed, for example, based on a two-step RA procedure configured in an unlicensed band. A wireless device may be configured (e.g., by a base station) with separate LBT procedures for a wideband operation (e.g., based on a bandwidth greater than 20 MHz). A wireless device may be configured (e.g., by a base station) with a wideband comprising one or more subbands and/or one or more BWPs, for example, based on wideband operation. Some of the one or more subbands may overlap in the frequency domain. Some of the one or more subbands may not overlap in the frequency domain. Some of the one or more BWPs overlap in the frequency domain. Some of the one or more BWPs may not overlap in the frequency domain. Separate LBT procedures may be used for transmissions via the two radio resources, for example, based on a wideband operation and/or two radio resources being allocated with a space larger than a threshold (e.g., 20 MHz). A wideband may comprise one or more subbands, and two radio resources may be allocated in different subbands. A first transmission scheduled in a first subband may use a first LBT procedure, and a second transmission scheduled in a second subband may use an second LBT procedure. The first LBT procedure and the second LBT procedure may be independent of each other.

UL radio resources for transmission of one or more TBs 3340 may be subject to a first LBT procedure (e.g., LBT 3560) and be independent of a second LBT procedure (e.g., LBT 3540) for transmission of the preamble 3330. PRACH resources 3530 for transmission of the preamble 3330 may be subject to a second LBT procedure (e.g., LBT 3560) and be independent of a first LBT procedure (e.g., LBT 3560) for transmission of one or more TBs 3340. A wireless device may perform separate LBT procedures for a first transmissions of the preamble 3330 and a second transmission of one or more TBs 3340, for example, based on f1 3410 and f2 3420 being configured in different channels, different subbands, different BWPs, and/or different UL carriers.

Figure 36A:
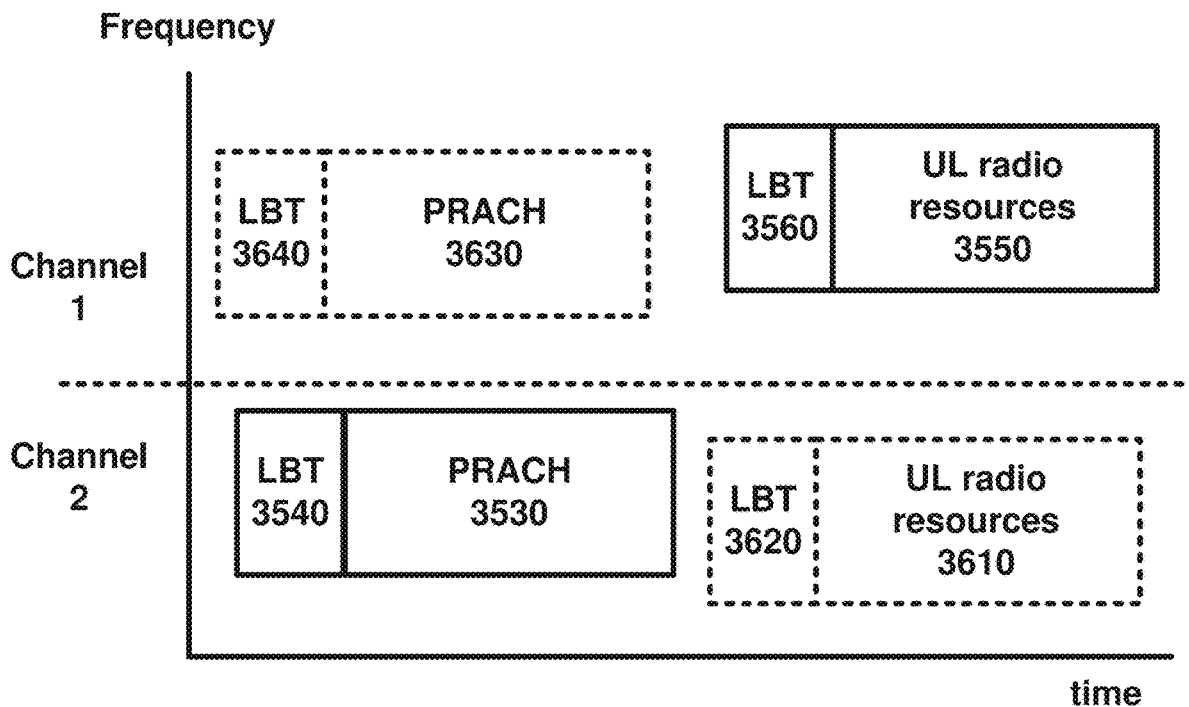
FIG. 36A and FIG. 36B show examples of one or more LBT procedures for a two-step RA procedure in an unlicensed band.
Figure 36B:
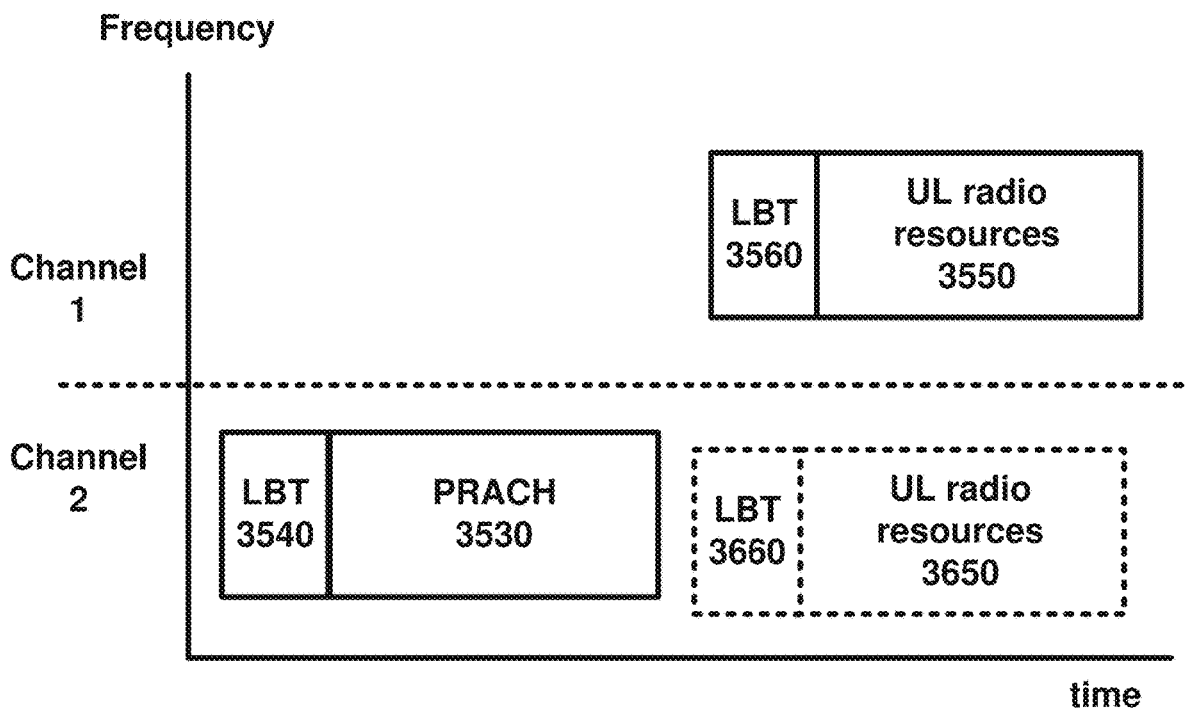

FIG. 36A and FIG. 36B are examples of one or more LBT procedures performed for a two-step RA procedure in an unlicensed band. The resource allocation and the separate LBT procedures in FIG. 35 may be resulted from FIG. 36A and/or FIG. 36B. A wireless device may be configured (e.g., by a base station) with one or more PRACH resources and one or more UL radio resources in different channels (BWPs and/or UL carriers). The wireless device may one or more first opportunities to send (e.g., transmit) preambles and one or more second opportunities to send (e.g., transmit) one or more TBs. A wireless device may have two opportunities via random access resources (e.g., PRACH resource 3630 and PRACH resource 3530) for preamble transmission, for example, as shown in FIG. 36A. A wireless device may select one of two opportunities, for example, based on LBT results. A wireless device may perform a first LBT procedure (e.g., LBT 3640) and a second LBT procedure (e.g., LBT 3540 as shown in FIG. 36A). A wireless device may select one of PRACH resources associated either a first LBT procedure or a second LBT procedure (e.g., based on random selection), for example, based on the results of the first and second LBT procedures being idle. A wireless device may select a PRACH resource associated with the LBT result being idle for preamble transmission, for example, based on one of LBT result being idle and the other of LBT result being busy. A wireless device may not send (e.g., transmit) a preamble and may perform one or more LBT procedures for one or more TB transmissions, for example, based on the first and second LBT procedure results being busy.

A wireless device may have one or more opportunities for transmission of one or more TBs via UL radio resources (e.g., in a similar way that a wireless device has for preamble transmission above). The one or more opportunities for transmission of one or more TBs may be independent of one or more opportunities for transmission of preamble. The wireless device may perform one or more LBT procedures to gain access to a channel to send (e.g., transmit) one or more TBs, for example, based on a wireless device not sending (e.g., transmitting) a preamble due to a result (e.g., busy) of LBT procedure. A wireless device may perform a first LBT procedure (e.g., LBT 3620) followed by a first transmission opportunity of one or more TBs via first UL radio resources 3610 and a second LBT procedure (e.g., LBT 3560 in FIG. 36A) followed by a second transmission opportunity of one or more TBs via second UL radio resources 3550, as shown in FIG. 36A. A wireless device may select one of the opportunities, for example, depending on LBT results. A wireless device may send (e.g., transmit) one or more TBs via UL radio resources 3550, for example, based on LBT 3620 being busy and/or LTB 3560 being idle as shown in FIG. 36A. A wireless device may not send (e.g., transmit) any preamble, for example, based on one or more LBT procedures (e.g., LBT 3540 and LBT 3640 in FIG. 36A) to gain access for sending (e.g., transmitting) a preamble result in busy. A wireless device may perform one or more second LBT procedures (e.g., LBT 3620 and LBT 3560 in FIG. 36A) for transmission of one or more TBs.

The wireless device may receive, from a base station, one or more control message (e.g., RRC messages and/or PDCCH messages) indicating one or more associations between PRACH resources and UL radio resources, for example, before a wireless device initiates a two-step RA procedure. The associations may be one-to-one, multi-to-one, one-to-multi, and/or multi-to-multi between one or more PRACHs resources and one or more UL radio resources. A wireless device may determine which UL radio resources and/or which PRACH resources to select, for example, based on the associations. The associations may indicate one-to-multi association from PRACH resource 3530 to UL radio resources 3550 and UL radio resources 3610, for example, as shown in FIG. 36A. The associations may indicate one-to-one association from PRACH resources 3630 to UL radio resources 3550. A wireless device may perform one or more LBT procedures (depending on a regulation and/or resource allocation whether the resources are in the same channel) for transmission of one or more TBs depending on a selection of PRACH resources. A wireless device may perform two LBT procedures (LBT 3540 and LBT 3640), for example, as shown in FIG. 36A. A wireless device may send (e.g., transmit) a preamble via PRACH resources 3530, for example, based on LBT 3540 being idle but LBT 3640 being busy. The wireless device may determine (e.g., select) one or more candidate UL radio resources based on a configured association of PRACH resources 3530, which may be one-to-multi from PRACH resources 3530 to UL radio resources 3550 and UL radio resources 3610. The wireless device may perform LBT 3620 and LBT 3560 based on the configured association. A wireless device may send (e.g., transmit) one or more TBs, depending on the results of the LBT procedures. FIG. 36B is an example of a two-step RA procedure. UL radio resources are associated with one PRACH resource. An association may be configured (e.g., by a base station) from PRACH resource 3530 to UL radio resource 3550 and UL radio resources 3650.

The PRACH resource and/or UL radio resources in FIG. 34, FIG. 35, FIG. 36A, and/or FIG. 36B may be associated with at least one reference signal configuration (e.g., SSB, CSI-RS, DM-RS). A wireless device may receive (e.g., from a base station) at least one control message to indicate such an association. A configuration of each reference signal may have an association with at least one PRACH resource, that may be configured by RRC message and/or PDCCH signals, for example, based on the base station sending (e.g., transmitting) a plurality of reference signals. In one or more downlink channels, there may be a plurality of PRACH resources and a plurality of UL radio resources associated with the plurality of PRACH resources.

A failure of a LBT procedure may result in degrading a user experience (e.g., in terms of QoS, capacity (throughput), and/or coverage). A base station and/or a wireless device may wait until the channel becomes idle. This wait may result in a latency problem to make a radio link connection between a base station and a wireless device. A failure of an LBT procedure during a RA procedure may lead a long delay for a wireless device to receive an UL grant and/or TA value from a base station. This failure may result in a call drop and/or traffic congestion. A failure of an LBT in a RA procedure for an SCell addition may lead to cell congestion (e.g., load imbalancing) on one or more existing cells, for example, because an SCell may not take over traffic from the one or more existing cells in time.

Figure 37:
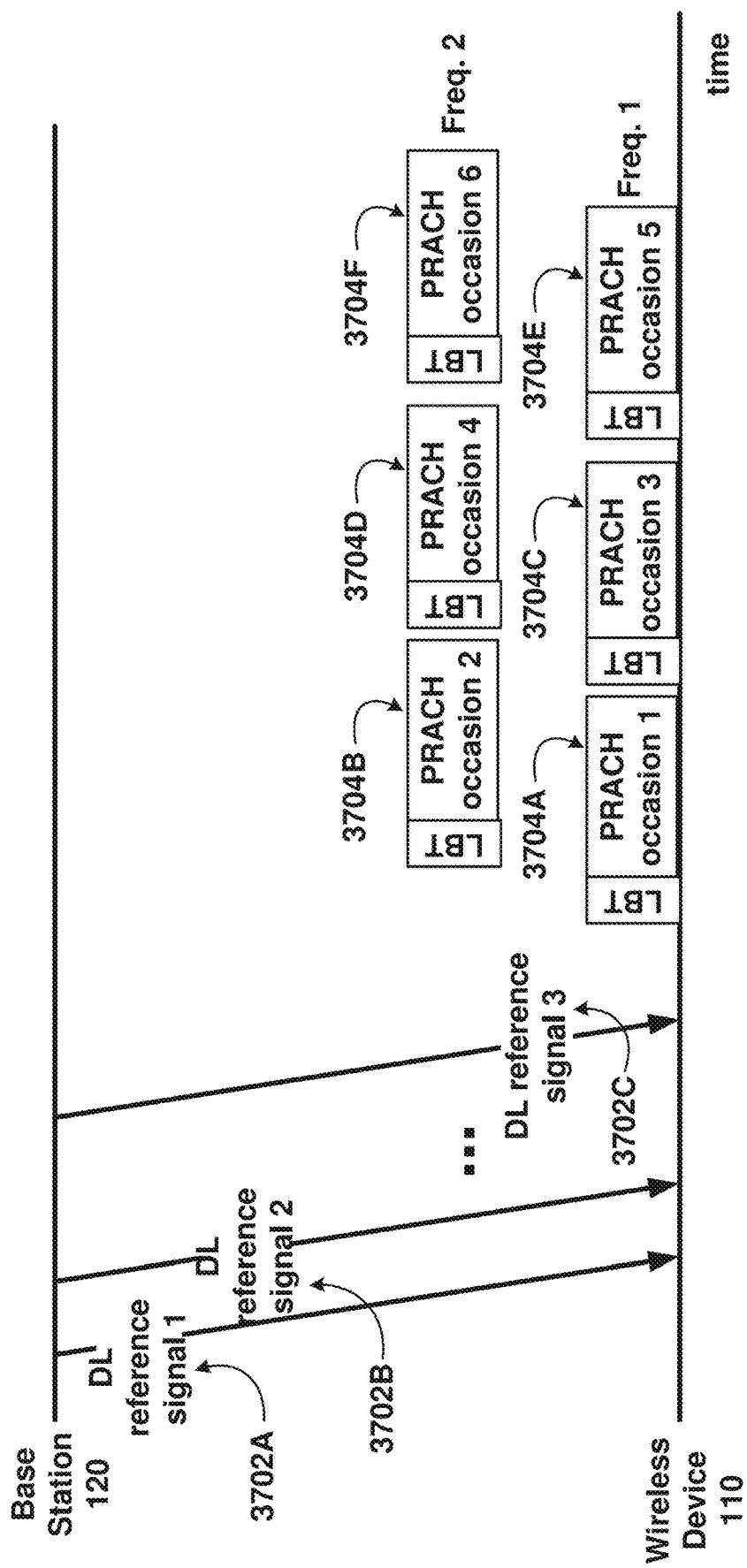
FIG. 37 shows an example of one or more PRACH occasion configurations.

FIG. 37 shows an example of an association between downlink reference signals and random access resource (e.g., PRACH) occasions. A base station 120 may send a plurality (e.g., a burst, such as up to K quantity) of DL reference signals 3702A-3702K. A wireless device 110 may select one or more random access resources (e.g., PRACH occasions 3704A-3704K that may each correspond to at least one of a K quantity of DL reference signals 3702A-3702K) to attempt a RA procedure (e.g., send a RAP). The wireless device 110 may perform the RA procedure on a first available (e.g., clear) random access resource.

An association between a DL reference signal and random access resources (e.g., PRACH occasions) may be one-to-one mapping and/or multi-to-one mapping between DL reference signals and random access resource occasions (e.g., PRACH occasions). A wireless device 110 may measure k DL reference signals. A wireless device 110 may select DL reference signal 1 3702A, DL reference signal 2 3702B, and DL reference signal 3 3702C. The wireless device 110 may perform up to a particular quantity of LBT procedures (e.g., at most 3 LBTs). Each LBT procedure may be performed prior to each of the selected random access resource occasions (e.g., PRACH occasions), for example, if random access resource occasion (e.g., PRACH occasion) 1 3704A, random access resource occasion (e.g., PRACH occasion) 2 3704B, and random access resource occasion (e.g., PRACH occasion) 3 3704C are associated with DL reference signal 1 3702A, DL reference signal 2 3702B, and DL reference signal 3 3702C, respectively.

A type of LBT may be pre-defined and/or semi-statically by a base station. A base station may indicate a type of LBT of random access resource occasions (e.g., PRACH occasions) in a RACH configuration. The type may be one of CAT 1, CAT 2, CAT 3, CAT 4 (or long LBT and/or short LBT).

A wireless device may send (e.g., transmit) one or more preambles via the first random access resource occasion (e.g., PRACH occasion). The wireless device may not perform one or more LBT procedures in other random access resource occasions (e.g., PRACH occasions) that may be available after the first random access resource occasions (e.g., PRACH occasions) in the same PRACH burst, for example, if an LBT success occurs (e.g., channel is idle) in a first random access resource occasion (e.g., PRACH occasion). The wireless device may not perform another LBT procedure on random access resource occasion (e.g., PRACH occasion) 3 3704C, for example, if the wireless device selects random access resource occasion (e.g., PRACH occasion) 1 3704A and a random access resource occasion (e.g., PRACH occasion) 3 3704C, and an LBT procedure on random access resource occasion (e.g., PRACH occasion) 1 3704A is successful. The wireless device may perform one or more LBT procedures prior to each of random access resource occasions (e.g., PRACH occasions) in a first frequency (e.g., Freq. 1) at least until an LBT procedure is successful, for example, if a wireless device selects all random access resource occasions (e.g., PRACH occasions) in the first frequency (e.g., Freq. 1 in FIG. 37). The wireless device may send (e.g., transmit) one or more preambles associated with a random access resource occasion (e.g., PRACH occasion) if the LBT procedure is successful, for example, based on or in response to the LBT procedure being successful.

A wireless device may perform an LBT procedure for the one or more random access resource occasions (e.g., PRACH occasions) FDM-ed, which may be firstly available and/or may be randomly selected, for example, if one or more random access resource occasions (e.g., PRACH occasions) are frequency domain multiplexed (FDM-ed), e.g., random access resource occasion (e.g., PRACH occasion) 1 3704A and random access resource occasion (e.g., PRACH occasion) 2 3704B. A wireless device may (e.g., based on RSRPs of DL reference signals) select random access resource occasion (e.g., PRACH occasion) 1 3704A and random access resource occasion (e.g., PRACH occasion) 2 3704B FDM-ed. The wireless device may perform LBT procedure(s) on random access resource occasion (e.g., PRACH occasion) 1 3704A and random access resource occasion (e.g., PRACH occasion) 2 3704B. The wireless device may randomly select one of these random access resource occasions, for example, if both LBT procedures are successful. The wireless device may select an available random access resource occasion first in time domain, for example, if both LBT procedures are successful. The wireless device may select a random access resource occasion corresponding to a DL reference signal having an RSRP that is greater than other DL reference signals, for example, if both LBT procedures are successful. Random access resource occasion (e.g., PRACH occasion) 1 3704A and random access resource occasion (e.g., PRACH occasion) 2 3704B may be FDM-ed within a threshold (e.g., less than a bandwidth threshold). The wireless device may perform a wideband LBT procedure that may cover a frequency range of random access resource occasion (e.g., PRACH occasion) 1 3704A and random access resource occasion (e.g., PRACH occasion) 2 3704B. The wireless device may select one of the random access resource occasions (e.g., PRACH occasions) based on: a random selection, time location of random access resource occasions (e.g., PRACH occasions), and/or RSRPs of corresponding DL reference signals, for example, if the wideband LBT procedure is successful.

A wireless device may perform a long LBT on a first random access resource occasion (e.g., PRACH occasion) firstly available. The wireless device may perform a short LBT on a second random access resource occasion (e.g., PRACH occasion) following (e.g., after) the first random access resource occasion (e.g., PRACH occasion), for example, if the LBT on the first random access resource occasion (e.g., PRACH occasion) fails (e.g., a long LBT procedure for random access resource occasion (e.g., PRACH occasion) 1 3704A fails and/or a short LBT procedure for random access resource occasion (e.g., PRACH occasion) 3 3704C fails). A type of LBT procedure on the second random access resource occasion (e.g., PRACH occasion) may be configured by a base station. A type of LBT procedure on the second random access resource occasion (e.g., PRACH occasion) may be determined by a time difference of two random access resource occasions (e.g., PRACH occasions). The first random access resource occasion (e.g., PRACH occasion) and the second random access resource occasion (e.g., PRACH occasion) may have a guard time less than a threshold (e.g., configurable or pre-defined, such as 25 μs, 16 μs, or any other duration). The wireless device may perform a short LBT procedure on the second random access resource occasion (e.g., PRACH occasion), for example, if the first random access resource occasion and the second random access resource occasion have a guard time less than a threshold. The wireless device may perform a long LBT procedure, for example, if the first random access resource occasion and the second random access resource occasion have a guard time greater than or equal to the threshold.

The wireless device 110 may perform an LBT procedure before each selected random access resource occasion, for example, at least until successful or until an LBT procedure before each of the selected random access resource occasions have failed. The wireless device 110 may perform a RA procedure on a random access resource occasion associated with a successful LBT procedure. The two or more random access resource occasions (e.g., PRACH occasions) 3704A-3704F may not be aligned.

A wireless device may select two or more random access resource occasions (e.g., PRACH occasions), for example, based on RSRPs of DL reference signals. A wireless device may select random access resource occasion (e.g., PRACH occasion) 1 3704A, random access resource occasion (e.g., PRACH occasion) 2 3704B, and/or random access resource occasion (e.g., PRACH occasion) 3 3704C. The wireless device may perform a first LBT procedure on a first random access resource occasion (e.g., PRACH occasion) available firstly in time (e.g., random access resource occasion (e.g., PRACH occasion) 1 3704A). The wireless device may determine a second LBT procedure on a second random access resource occasion (e.g., PRACH occasion), for example, based on the first LBT procedure. The wireless device may send (e.g., transmit) a preamble via the first random access resource occasion (e.g., PRACH occasion), for example, if the first LBT procedure was successful. The wireless device may determine to perform a second LBT procedure on a second random access resource occasion (e.g., PRACH occasion) available firstly after the first random access resource occasion (e.g., PRACH occasion) (e.g., random access resource occasion (e.g., PRACH occasion) 2 3704B), for example, if the first LBT procedure was not successful. The wireless device may perform a third LBT procedure on a third random access resource occasion (e.g., PRACH occasion), for example, if the second LBT procedure on the second random access resource occasion (e.g., PRACH occasion) has failed. The wireless device may perform a wideband LBT, for example, if one or more FDM-ed random access resource occasions (e.g., PRACH occasions) are configured within a guard time less than a threshold. The wireless device may perform LBT procedures on the one or more FDM-ed random access resource occasions (e.g., PRACH occasions). A wireless device may send (e.g., transmit) a plurality of preambles via a plurality of random access resource occasions (e.g., PRACH occasions).

Figure 38:
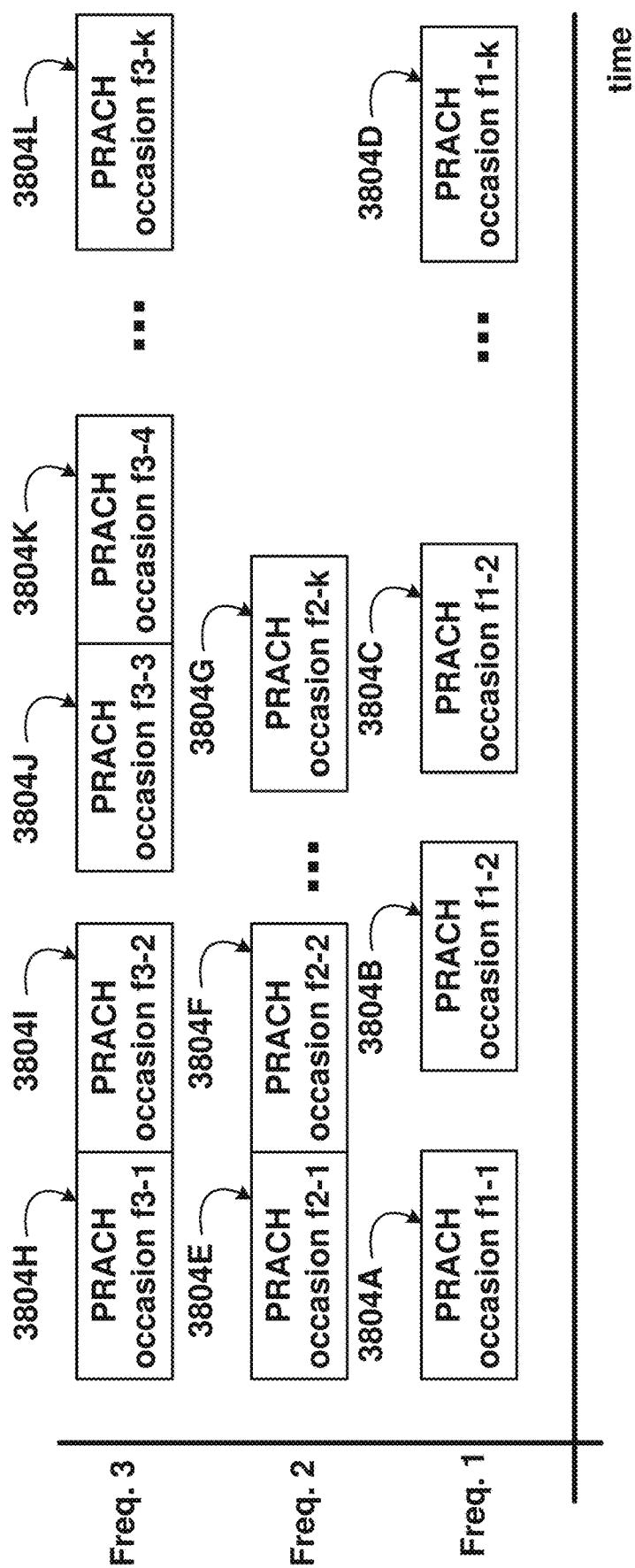
FIG. 38 shows an example of one or more PRACH occasion configurations.

FIG. 38 shows an example one or more random access resource occasion configurations (e.g., PRACH occasions). The random access resource occasions may be separated by time and/or frequencies (e.g., TDM-ed and/or FDM-ed). The random access resource occasions may be separated by gaps (e.g., PRACH occasions 3804A-3804D via freq. 1). The random access resources may not be separated by gaps (e.g., PRACH occasions 3804E-3804G via freq. 2). Groups of random access resources occasions may be separated by gaps (e.g., PRACH occasions 3804H-3804L via freq. 3). The random access resources occasions may occur in different frequencies (e.g., PRACH occasions 3804A-3804D via freq. 1, PRACH occasions 3804E-3804G via freq. 2, and/or PRACH occasions 3804H-3804L via freq. 3).

Random access resource occasions (e.g., PRACH occasions) may be time division multiplexed (TDM-ed) with a guard time (e.g., a time difference or gap), for example, via Freq 1. A wireless device may perform an LBT procedure in each random access resource occasion (e.g., PRACH occasion) in a first frequency (e.g., Freq. 1), for example, for multiple preamble transmissions. A wireless device may perform a long LBT procedure and/or short LBT procedure, for example, depending on the guard time between two random access resource occasions (e.g., PRACH occasions). A wireless device may perform a short LBT procedure (or no LBT procedure) on a random access resource occasion (e.g., PRACH occasion) available later than the other, for example, if the guard time (e.g., time difference) is less than a threshold (25 µs, 16 µs, or any other duration). The wireless device may perform a long LBT procedure, for example, if the guard time (e.g., time difference) is greater than or equal to the threshold. A type of LBT procedure in each random access resource occasion (e.g., PRACH occasion) may be configured by an RRC message. A type of LBT procedure in each random access resource occasion (e.g., PRACH occasion) may be determined by a wireless device by comparing with a guard time between random access resource occasions (e.g., PRACH occasions) and the threshold.

One or more random access resource occasions (e.g., PRACH occasions) may be TDM-ed without a guard time (or less than a threshold), for example, via a second frequency (e.g., Freq 2 in FIG. 38). A wireless device may perform an LBT procedure on the first random access resource occasion (e.g., PRACH occasion) that occurs firstly among the selected random access resource occasions (e.g., PRACH occasions) via the second frequency (e.g., Freq 2). A wireless device may avoid performing an LBT procedure if the LBT on the first random access resource occasion (e.g., PRACH occasion) was successful, for example, for subsequent random access resource occasions (e.g., PRACH occasions) followed by the first random access resource occasion (e.g., PRACH occasion) via the second frequency (e.g., Freq 2). The LBT procedure on the first random access resource occasion (e.g., PRACH occasion) may be a long LBT procedure. An LBT procedure on subsequent random access resource occasions (e.g., PRACH occasions) may be a short LBT procedure if the LBT on the first random access resource occasion (e.g., PRACH occasion) was successful. A wireless device may perform a long LBT or a short LBT, for example, if the selected random access resource occasions (e.g., PRACH occasions) are not contiguous in time. A type of LBT may be configured by a base station and/or determined based on a time difference of the selected random access resource occasions (e.g., PRACH occasions) that may be non-contiguous. One or more random access resource occasions (e.g., PRACH occasions) may be grouped without a guard time, for example, via a third frequency (e.g., Freq 3 in FIG. 38). There may be a guard time between two groups as shown in random access resource occasion (e.g., PRACH occasion) f3-2 38041 and random access resource occasion (e.g., PRACH occasion) f3-3 3804J in FIG. 38. Similar procedures for determining an LBT procedure via a second frequency (e.g., Freq. 2) and via a first frequency (e.g., Freq. 1) may be applied to the grouped PRACH occasions via the first frequency (e.g., Freq. 3), for example, using no LBT procedure, a long LBT procedure, or a short LBT procedure, for example, based on gaps and/or timing.

A wireless device may send (e.g., transmit), via a random access resource occasion (e.g., PRACH occasion), a preamble (e.g., dedicated preamble or a preamble selected (e.g., randomly selected from a plurality of preambles) that may be configured by a base station (e.g., if an LBT procedure is successful), for example, if a wireless device identifies at least on clear channel based on the LBT procedure. The wireless device may start to monitor a PDCCH channel for an RAR during an RAR window, for example, after or in response to sending the preamble. The wireless device may perform one or more preamble transmission attempts before starting the RAR window, for example, depending on one or more result(s) of one or more LBT procedures. The wireless device may attempt a preamble transmission based on or in response to performing an LBT procedure. The wireless device may attempt another preamble transmission based on or in response to the LBT procedure having failed (e.g., a channel may be busy). The wireless device may send (e.g., transmit) one preamble (e.g., may not perform multiple preamble transmissions), for example, before starting the RAR window. A start timing of the RAR window may be determined based on time index of the random access resource occasion (e.g., PRACH occasion) and/or an offset (e.g., 3 TTIs predefined and/or semi-statically configured).

A wireless device may receive, from a base station, a message comprising configuration parameters indicating: a plurality of reference signals; one or more preambles; an association between the plurality of reference signals and the one or more preambles; and/or a first threshold. The wireless device may select a plurality of first reference signals of the plurality of reference signals, wherein received signal strengths of the plurality of first reference signals may be greater than the first threshold. The wireless device may perform a first LBT procedure corresponding to a first transmission of a first preamble, wherein the first preamble may be associated with at least a first one of the plurality of first reference signals. The wireless device may perform (e.g., based on or in response to a failure of the first listen-before-talk) a second LBT procedure corresponding to a second transmission of a second preamble, wherein the second preamble may be associated with at least second one of the plurality of first reference signals. The wireless device may send (e.g., transmit) the second preamble, for example, based on or in response to a success of the second LBT procedure.

A wireless device may start to monitor a downlink control channel, for example, based on or in response to sending the second preamble. The one or more reference signals may be synchronization signals. The one or more reference signals may be channel state information reference signals. The configuration parameters may indicate: one or more random access channels; and/or an association between the one or more reference signals and the one or more random access channels. A first radio channel via which the first LBT procedure was performed may be TDM-ed with a second radio channel. A first radio channel via which the first LBT procedure was performed may be FDM-ed with a second radio channel. A first radio channel via which the first LBT was performed may be TDM-ed and FDM-ed with a second radio channel. The second preamble may be sent via a random access channel associated with the at least second one of the plurality of reference signals. The first LBT procedure may be one of a CAT1, CAT2, CAT3, and/or CAT4. The second LBT procedure may be one of a CAT1, CAT2, CAT3, and/or CAT4.

The wireless device may send (e.g., transmit) at least one preamble via a PRACH occasion (if a LBT procedure is successful) and/or at least one TB via UL radio resources (if a LBT procedure is successful). The wireless device may start to monitor or continue to monitor a DL control channel (e.g., PDCCH) for an RAR during an RAR window, for example, based on or in response to sending (e.g., transmitting) the preamble and/or the at least one TB.

Figure 39A:
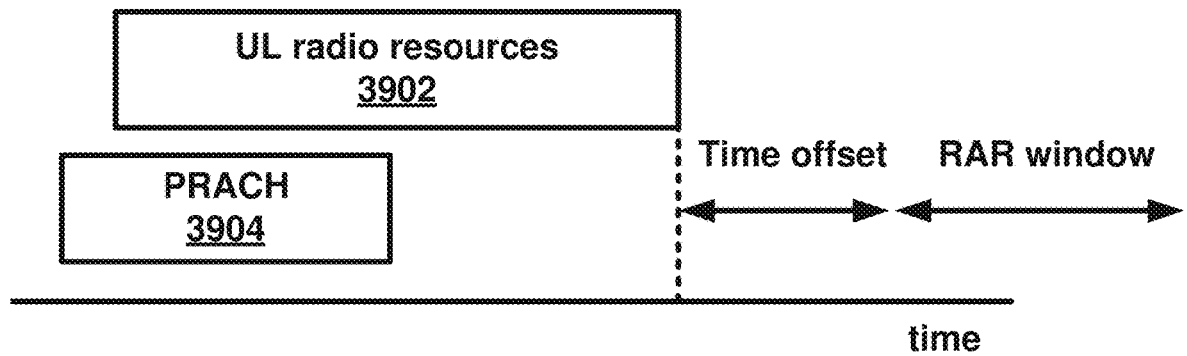
FIG. 39A and FIG. 39B show examples of start timing of an RAR window.
Figure 39B:
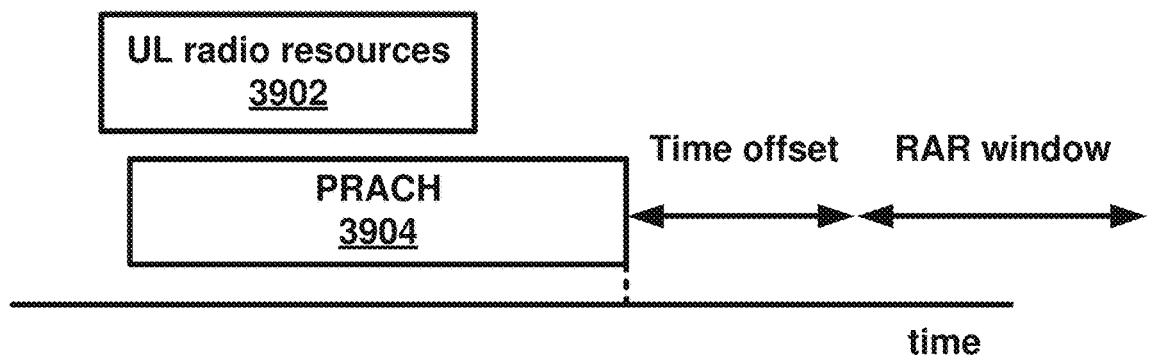

FIG. 39A and FIG. 39B show examples of start timing of an RAR window. One or more methods may be used to determine start timing of the RAR window, for example, using a RA contention resolution timer parameter (e.g., ra-ContentionResolutionTimer shown in FIG. 18) and/or a RAR window parameter (e.g., ra-ResponseWindow shown in FIG. 20). The wireless device may start the RAR window from the end of the preamble transmission with a time offset (e.g., configured and/or predefined), for example, based on a wireless device sending (e.g., transmitting) a preamble and a TB. The time offset may be zero. The wireless device may start the RAR window from the end of the TB transmission with a time offset (configured and/or predefined), for example, based on a wireless device sending (e.g., transmitting) a preamble and a TB. The wireless device may start the RAR window from the end of the preamble transmission or the TB transmission, for example, whichever finished later as shown in FIG. 39A and FIG. 39B and/or based on a wireless device sending (e.g., transmitting) a preamble and a TB. A wireless device may perform at least two LBT procedures (one for preamble transmission, and the other one for TB transmission), and one of the at least two LBT procedures may be successful (e.g., clear, unoccupied or idle). In this case, the wireless device may start the RAR window in response to determining a second LBT result of the at least two LBT procedures being failed (e.g., busy or occupied). There may be a time offset (configured and/or predefined) before starting the RAR window.

Figure 40A:
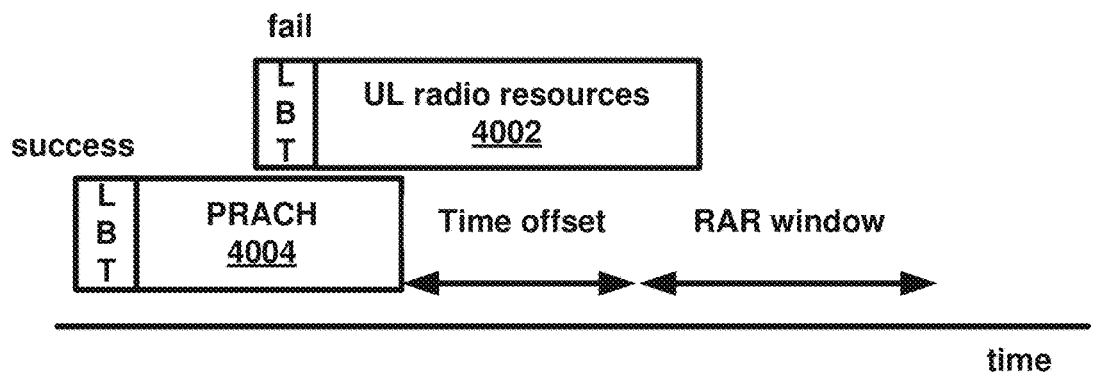
FIG. 40A, FIG. 40B, and FIG. 40C show examples of start timing of an RAR window.
Figure 40B:
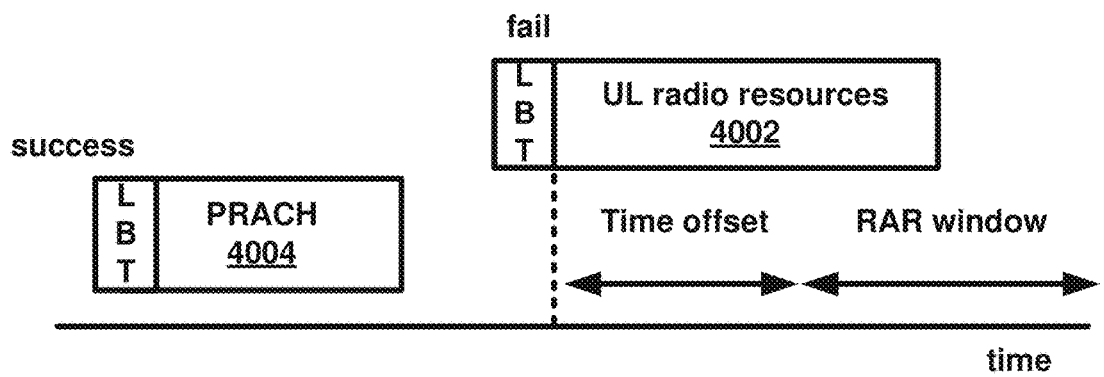
Figure 40C:
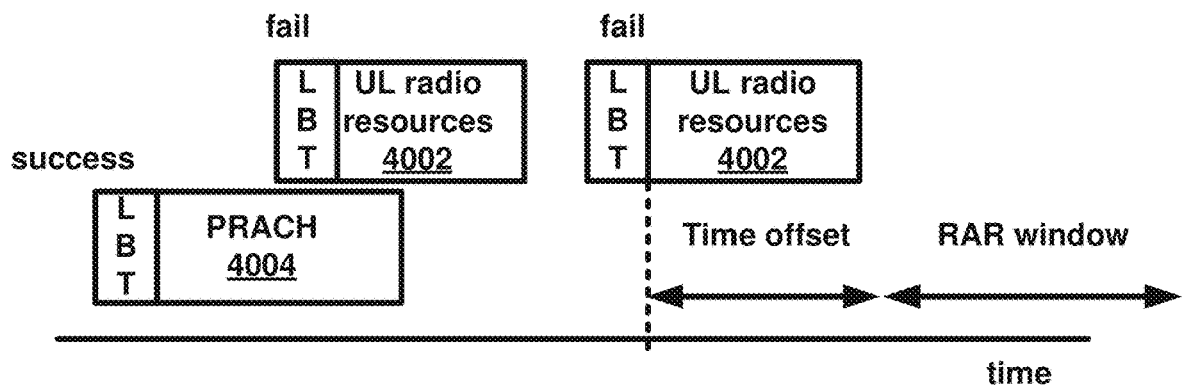

FIG. 40A, FIG. 40B, and FIG. 40C show examples of start timing of RAR window. A wireless device may send (e.g., transmit) a preamble without a TB transmission, for example, based on an LBT procedure for the preamble being idle and an LBT procedure for the TB transmission being busy. A wireless device may send (e.g., transmit) a TB without preamble transmission, for example, based on an LBT procedure for the preamble being busy and an LBT procedure for the TB transmission being idle. PRACH resources 4004 and UL radio resources 4002 in FIG. 40A, FIG. 40B, and FIG. 40C may be switched. An LBT procedure for preamble transmission may be successful but an LBT procedure for TB transmission may have failed, for example, as shown in FIG. 40A. A wireless device may start the RAR window with a time offset from either the end of preamble transmission or after the wireless device determines a failure of LBT procedure for TB transmission, whichever finished later. A wireless device may start the RAR window in response to the end of the preamble transmission with a time offset (e.g., that may be zero or any other value), for example, based on the preamble transmission finishing later than determining a failure of LBT procedure for TB transmission as shown in FIG. 40A. A wireless device may start the RAR window in response to determining a failure of LBT procedure for TB transmission, for example, based on a failure of LBT procedure for TB transmission being determined later than the preamble transmission as shown in FIG. 40B. A PRACH resource 4004 may be associated with two UL radio resources 4002, as shown in FIG. 40C. A wireless device may start the RAR window from either the end of preamble transmission or after a wireless device determines a failure of gaining access to channels of two UL radio resources 4002 for TB transmission. The two UL radio resources 4002 may use one LBT procedure or separate LBT procedures (each one located before a UL radio resource), for example, based on a configuration and/or regulation.

A wireless device may monitor or continue to monitor DL control channel(s) (e.g., PDCCH, dedicated CORESET, common search space, and/or wireless device-specific search space) to detect at least one RAR corresponding to at least one of a preamble 3330 (if sent) and/or one or more TBs 3350 (if sent), for example, within the RAR window. The wireless device may determine that an RAR reception is not successful, for example, based on a wireless device receiving no RAR within the RAR window. The wireless device may determine that an RAR reception is not successful, for example, based on none of the RARs received by the wireless device comprising a preamble index (or indicator) indicating the preamble that the wireless device sends (e.g., transmits), and/or comprising an identifier of the wireless device (e.g., sent via one or more TBs).

Figure 41:
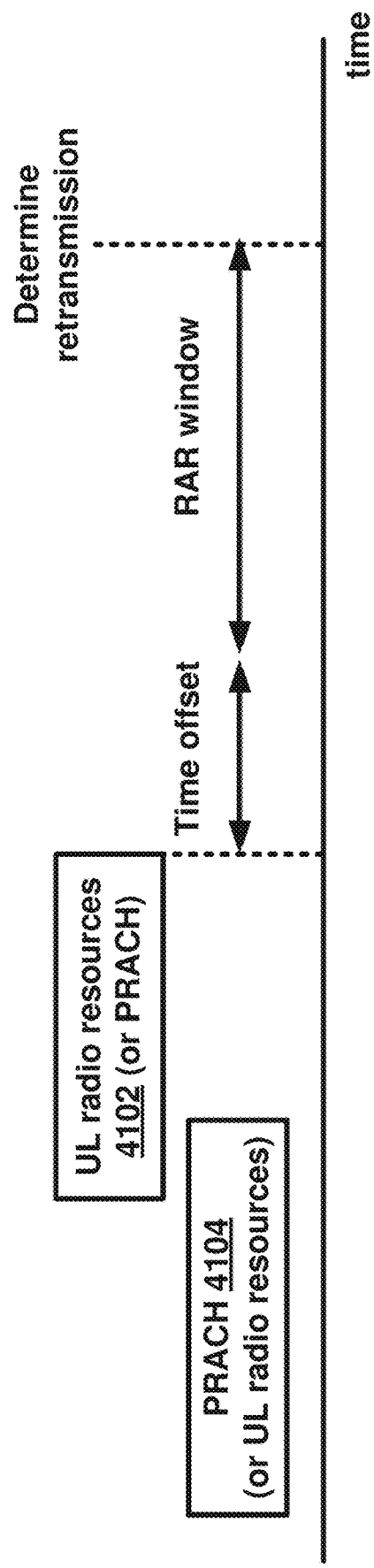
FIG. 41 shows an example of a determination of a retransmission.

FIG. 41 shows an example of determining a retransmission. The wireless device may determine that an RAR reception is not successful, for example, as part of a two-step RA procedure configured in unlicensed band and shown in FIG. 41. The wireless device may determine that an RAR reception is not successful, for example, after the wireless device sends (e.g., transmits) at least one preamble and/or sends (e.g., transmits) at least one TB. The wireless device may determine that an RAR reception is not successful, for example, after the wireless device sends (e.g., transmits) at least one preamble and/or does not send (e.g., transmit) at least one TB (e.g., due to a failure of LBT procedure for a transmission of the at least one TB). The wireless device may determine that an RAR reception is not successful, for example, after the wireless device does not send (e.g., transmit) at least one preamble (e.g., due to a failure of LBT for a transmission of the at least one preamble) and sends (e.g., transmits) at least one TB. A wireless device may attempt a retransmission of at least one preamble and/or at least one TB, for example, based on one or more failures (e.g., such as described above). The wireless device may increase a power (e.g., transmission power) for at least one preamble and/or at least one TB transmission during the retransmission. A wireless device may attempt a retransmission of at least one preamble and/or at least one TB, for example, after a failure of a transmission of at least one preamble and at least one TB. One or more LBT procedures for the at least one preamble and the at least one TB may fail, and the wireless device may wait for a next one or more transmission occasions for a retransmission of the at least one preamble and the at least one TB. The wireless device may not increase a power (e.g., transmission power) for at least one preamble and/or at least one TB transmission during the retransmission.

One or more methods may be used to increase the power (e.g., transmission power) of a two step Msg 1 in a two-step RA procedure. A wireless device may increase a power ramping counter (e.g., PREAMBLE_POWER_RAMPING_COUNTER) by one (or any other value or quantity). The power ramping counter may be shared between preamble transmission and TB transmission of a two step Msg 1 in a two-step RA procedure. The power ramping counter may be employed for the preamble transmission in a two-step RA procedure. Preamble transmission and TB transmission of a two step Msg 1 may have separate power ramping counters. A wireless device may increment both separate power ramping counters in a two-step RA procedure. A wireless device may increment the separate power ramping counters, for example, based on or in response to whether an associated transmission is performed in a two-step RA procedure. The wireless device may increment a first power ramping counter for a preamble transmission, for example, if a retransmission of a two-step RA procedure is based on or in response to a preamble transmission with a TB transmission and/or a corresponding RAR not being received. The wireless device may increment a second power ramping counter for a TB transmission, for example, if a retransmission is based on or in response to a preamble transmission with a TB transmission and/or a corresponding RAR not being received. The wireless device may increment a first power ramping counter for a preamble transmission and may not increment a second power ramping counter for a TB transmission, for example, based on a retransmission of a two-step RA procedure being in response to a preamble transmission without a TB transmission and/or in response to no reception of corresponding RAR. The wireless device may not increment a first power ramping counter for a preamble transmission and may increment a second power ramping counter for a TB transmission, for example, based on a retransmission being in response to a TB transmission without a preamble transmission and/or in response to no reception of corresponding RAR. A wireless device may determine an amount of power ramping, for example, based on a power ramping counter and/or a ramping step, such as: (power ramping counter−1)*ramping step. The ramping step may be shared between preamble and TB transmissions of a two step Msg 1 in a two-step RA procedure.

A wireless device may determine a power (e.g., transmission power) based on the updated power ramping counter, for example, for a preamble transmission. A preamble received target power parameter (e.g., PREAMBLE_RECEIVED_TARGET_POWER) may be determined based on the preamble received target power parameter, delta preamble parameter, preamble power ramping counter parameter and/or preamble power ramping step parameter, such as: PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP).

A wireless device may determine, based on a preamble received target power parameter (e.g., PREAMBLE_RECEIVED_TARGET_POWER), a transmission power for a PRACH, $P_{PRACH,b,f,c}(i)$, on an active UL BWP b of a carrier f based on a current SS/PBCH block determination for serving cell c in transmission occasion i, such as:

$$P_{PRACH,b,f,c}(i) = \min\{P_{CMAX,f,c}(i), P_{PRACH,target,f,c} + PL_{b,f,c}\} \text{ [dBm]},$$

in which: $P_{CMAX,f,c}(i)$ may be the transmission power configured by a base station for a carrier f of a serving cell c within transmission occasion i, $P_{PRACH,target,f,c}$ may be the PRACH preamble target reception power parameter (e.g., PREAMBLE_RECEIVED_TARGET_POWER) provided (e.g., configured, indicated, etc.) above for the UL BWP b of carrier f of serving cell c, and $PL_{b,f,c}$ may be a pathloss for the UL BWP b of carrier f for the current SS/PBCH block of serving cell c determined by the wireless device in dB as a reference signal parameter (e.g., referenceSignalPower— higher layer filtered RSRP). A reference signal parameter (e.g., referenceSignalPower) may be provided by (e.g., configured by, indicated by, etc.) an SS PBCH block power parameter (e.g., ss-PBCH-BlockPower), for example, based on the PRACH transmission from the wireless not being based on a detection of a PDCCH order by the wireless device. A reference signal parameter (e.g., referenceSignalPower) may be provided by (e.g., configured by, indicated by, etc.) an SS PBCH block power parameter (e.g., ss-PBCH-BlockPower), for example, based on or in response to a detection of a PDCCH order by the wireless device that triggers a contention based RA procedure.

A reference signal power parameter (e.g., referenceSignalPower) may be provided by (e.g., configured by, indicated by, etc.) the SS PBCH block power parameter (e.g., ss-PBCH-BlockPower), for example, based on the PRACH transmission from the wireless device being in response to a detection of a PDCCH order by the wireless that triggers a non-contention based RA procedure, and/or the DL RS being quasi-collocated with the DM-RS of the PDCCH order. A reference signal parameter (e.g., referenceSignalPower) may be obtained by parameters (e.g., a higher layer parameter such as, for example, parameter (e.g., a higher layer parameter such as, for example, ss-PBCH-BlockPower and powerControlOffsetSS), for example, after the wireless device may be configured resources for a periodic CSI-RS reception. A reference signal power parameter (e.g., referenceSignalPower) may be obtained by parameter (e.g., a higher layer parameters such as, for example, ss-PBCH-BlockPower and powerControlOffsetSS), for example, in which power control offset SS parameter (e.g., powerControlOffsetSS) may provide (e.g., configure, indicate, etc.) an offset of CSI-RS transmission power relative to SS/PBCH block transmission power. The wireless device may determine an offset of 0 dB, for example, based on a power control offset SS parameter (e.g., powerControlOffsetSS) not being provided to (e.g., configured by, indicated by, etc.) the wireless device.

A wireless device may determine a power (e.g., transmission power) for one or more TBs in a retransmission. The wireless device may determine a power (e.g., transmission power) based on a PUSCH power calculation. An updated power ramping counter may be used to update a preamble received target power parameter (PREAMBLE_RECEIVED_TARGET_POWER) for the power calculation (e.g., PUSCH power calculation). A wireless device may determine a preamble received target power parameter (e.g., PREAMBLE_RECEIVED_TARGET_POWER) based on preamble received target power parameter, delta preamble parameter, preamble ramping counter parameter, preamble ramping step parameter (e.g., preambleReceivedTarget-Power+DELTA_PREAMBLE+(PREAMBLE_POWER_RAMPING_COUNTER−1)×PREAMBLE_POWER_RAMPING_STEP)). The preamble power ramping counter parameter (e.g., PREAMBLE_POWER_RAMPING_COUNTER) may be replaced by another ramping counter for the one or more TB transmission, if it exists (e.g., as described above with two separate ramping counters).

A wireless device may determine power (e.g., PUSCH power), described below, as a transmission power for one or more TBs for a retransmission of a two-step RA procedure, for example, based on a preamble received target power (e.g., PREAMBLE_RECEIVED_TARGET_POWER). A wireless device may scale a linear value PUSCH $\hat{P}_{PUSCH,f,c}(i, j, q_d, l)$ of the power (e.g., transmit power) $P_{PUSCH,f,c}(i, j, q_d, l)$, with parameters in the following, by the ratio of the number of antenna ports with a non-zero PUSCH transmission to the number of configured antenna ports for the transmission scheme, for example, based on a PUSCH transmission. The resulting scaled power may be split across the antenna ports on which the non-zero PUSCH may be sent (e.g., transmitted). The formula and one or more components in the formula may be defined per BWP.

The wireless device may determine the PUSCH transmission power $P_{PUSCH,f,c}(i, j, q_d, l)$ in PUSCH transmission period i and based on a wireless device sending (e.g., transmitting) a PUSCH on carrier f of serving cell c using parameter set configuration with index j and PUSCH power control adjustment state with index l, as $$P_{PUSCH,f,c}(i, j, q_d, l) = \min \begin{cases} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{cases} [dBm]$$

$P_{CMAX,f,c}(i)$ may be the configured wireless device power (e.g., transmission power) for carrier f of serving cell c in PUSCH transmission period i. $P_{O\_PUSCH,f,c}(j)$ may be a parameter comprising the sum of a component $P_{O\_NOMINAL\_PUSCH,f,c}(j)$ and a component $P_{O\_UE\_PUSCH,f,c}(j)$ where j∈ {0, 1, . . . , J−1}. The wireless device may set $P_{O\_UE\_PUSCH,f,c}(0)=0$, and $P_{O\_NOMINAL\_PUSCH,f,c}(0)=P_{O\_PRE}+\Delta_{PREAMBLE\_Msg\ 3}$, wherein the preamble initial received target parameter (e.g., preambleInitialReceivedTargetPower) (for $P_{O\_PRE}$) and delta preamble message three parameter (e.g., Delta-preamble-msg3 or $\Delta_{PREAMBLE\_Msg\ 3}$) may be provided by (e.g., configured by, indicated by, etc.) higher layers for carrier f of serving cell c, for example, based on a PUSCH transmission or retransmission corresponding to a RAR grant, j=0. A preamble message parameter (e.g., Delta-preamble-msg3 or $\Delta_{PREAMBLE\_Msg\ 3}$) may be configured at least for one or more TB transmission of two-step RA procedure. If the preamble message parameter (e.g., Delta-preamble-msg3 or $\Delta_{PREAMBLE\_Msg\ 3}$) is configured only for a Msg3 1240, a wireless device may ignore this value for determining a PUSCH power for one or more TB transmissions in a two-step RA procedure. A PUSCH transmission or retransmission may correspond to a grant-free configuration or semi-persistent grant, and j=1, $P_{O\_NOMINAL\_PUSCH,f,c}(1)$ may be provided by (e.g., configured by, indicated by, etc.) a parameter (e.g., a higher layer parameter such as, for example, p0-nominal-pusch-without-grant) and $P_{O\_UE\_PUSCH,f,c}(1)$ may be provided by (e.g., configured by, indicated by, etc.) a parameter (e.g., a higher layer parameter such as, for example, p0-ue-pusch for carrier) f of serving cell c. For j∈ {2 . . . , J−1}=$S_j$, a $P_{O\_NOMINAL\_PUSCH,f,c}(j)$ value, applicable for all j∈ $S_j$, may be provided by (e.g., configured by, indicated by, etc.) a parameter (e.g., a higher layer parameter such as, for example, e.g., p0-nominal-pusch-withgrant) for each carrier f of serving cell c and a set of $P_{O\_UE\_PUSCH,f,c}(j)$ values may be provided by (e.g., configured by, indicated by, etc.) a set of one or more parameters (e.g., higher layer parameters such as, for example, e.g., p0-pusch-alpha-set and a respective index by a parameter (e.g., a higher layer parameter such as, for example, p0alphasetindex), for carrier f of serving cell c where the size of the set may be J−2 and may be indicated by a parameter (e.g., a higher layer parameter such as, for example, e.g., num-p0-alpha-sets).

$M_{RB,f,c}^{PUSCH}(i)$ may be a bandwidth of the PUSCH resource assignment expressed in number of resource blocks for PUSCH transmission period i on carrier f of serving cell c. p may be predefined and/or semi-statistically configured by one or more parameters.

For j=0, the wireless device may set $\alpha_{f,c}(j)=1$. For j=1, $\alpha_{f,c}(1)$ may be provided by (e.g., configured by, indicated by, etc.) a parameter (e.g., a higher layer parameter such as, for example, e.g., alpha). For j∈ $S_j$, a set of $\alpha_{f,c}(j)$ values may be provided by (e.g., configured by, indicated by, etc.) a set of parameters (e.g., a higher layer parameter such as, for example, e.g., p0-pusch-alpha-set) and a respective index by a parameter (e.g., a higher layer parameter such as, for example, p0alphasetindex) for carrier f of serving cell c where the size of the set may be J−2 and may be indicated by a parameter (e.g., a higher layer parameter such as, for example, num-p0-alpha-sets).

$PL_{f,c}(q_d)$ may be a downlink path-loss estimate in dB determined (e.g., calculated) by the wireless device using a reference signal (RS) resource $q_d$ for carrier f of serving cell c, in which the wireless device may be configured with a quantity (e.g., number) of RS resources by one or more parameters (e.g., a higher layer parameter such as, for example, num-pusch-pathlossReference-rs) and a respective set of RS configurations for the number of RS resources may be provided by (e.g., configured by, indicated by, etc.) a parameter (e.g., a higher layer parameter such as, for example, pusch-pathloss-Reference-rs that may comprise one or both of a set of SS/PBCH block indexes provided by (e.g., configured by, indicated by, etc.) a parameter (e.g., a higher layer parameter such as, for example, pusch-pathlossReference-SSB) and a set of CSI-RS configuration indexes provided by (e.g., configured by, indicated by, etc.) a parameter (e.g., a higher layer parameter such as, for example, e.g., pusch-pathlossReference-CSI-RS). The wireless device may indicate (e.g., identify) a RS resource in the set of RS resources to correspond to a SS/PBCH block or to a CSI-RS configuration as provided by (e.g., configured by, indicated by, etc.) a parameter (e.g., a higher layer parameter such as, for example, e.g., pusch-pathlossreference-index). If the wireless device is configured by a parameter (e.g., a higher layer parameter such as, for example, e.g., SRS-SpatialRelationInfo), a mapping between a set of SRS resources and a set of RS resources for obtaining a downlink path-loss estimate, the wireless device may employ the RS resources indicated by a value of a field (e.g., a SRI field) in one or more DCI formats, e.g., DCI format 0_0 or DCI format 0_1, that may schedule the PUSCH transmission to obtain the downlink path-loss estimate.

$PL_{f,c}(q_d)$ may be based on a reference signal power parameter (e.g., referenceSignalPower) and a higher layer filtered RSRP parameter, for example, $PL_{f,c}(q_d)$=referenceSignalPower—higher layer filtered RSRP, in which the reference signal power parameter (e.g., referenceSignalPower) may be provided by (e.g., configured by, indicated by, etc.) higher layers and RSRP may be defined for the reference serving cell and the higher layer filter configuration may be for the reference serving cell. For j=0, the reference signal power parameter (referenceSignalPower) may be configured by a parameter (e.g., a higher layer parameter such as, for example, e.g., SS-PBCHBlockPower). For j>0, the reference signal power parameter (referenceSignalPower) may be configured by a parameter (e.g., a higher layer parameter such as, for example, e.g., SS-PBCHBlockPower) or, after periodic CSI-RS transmission may be configured, by a parameter (e.g., a higher layer parameter such as, for example, e.g., Pc-SS) providing (e.g., configuring, indicating, etc.) an offset of the CSI-RS transmission power relative to the SS/PBCH block transmission power. A wireless device may employ a same RS resource index as for a corresponding PRACH transmission, for example, based on the PUSCH transmission being an Msg3 1240 PUSCH transmission. A wireless device may employ a same RS resource index as for a corresponding PRACH transmission of preamble 1630, for example, based on the PUSCH being one or more TB 1640. A wireless device may employ a same RS resource index as for a corresponding PRACH transmission of preamble 1630, for example, based on the PUSCH transmission being one or more TB 1640 and a base station not having configured a RS resource index for the one or more TB transmissions 1640. A wireless device may employ the configured RS resource index, for example, based on a base station configuring an RS resource index for the one or more TB transmission 1640 and if the PUSCH being one or more TB 1640.

The wireless device may set $\Delta_{TF,f,c}(i)$ as:

$$\Delta_{TF,f,c}(i)=10\log_{10}((2^{BPRE\cdot K_s}-1)\cdot\beta_{offset}^{PUSCH})$$

For $K_S=1.25$ and $\Delta_{TF,f,c}(i)=0$ and for $K_S=0$, in which $K_S$ may be provided by (e.g., configured by, indicated by, etc.) a parameter (e.g., a higher layer parameter such as, for example, e.g., deltaMCS-Enabled) provided (e.g., configured, indicated, etc.) for a carrier f and serving cell c. The wireless device may set $\Delta_{TF,f,c}(i)=0$, for example, based on the PUSCH transmission being over more than one layers.

BPRE and $\beta_{offset}^{PUSCH}$, for a carrier f and a serving cell c, may be computed as follows. The wireless device may set $$BPRE = \sum_{r=0}^{C-1} K_r/N_{RE}$$

for PUSCH transmission with UL-SCH data and $BPRE=O_{CSI}/N_{RE}$ for CSI transmission via a PUSCH resource without UL-SCH data, where C may be the number of code blocks, $K_r$ may be the size for code block r, $O_{CSI}$ may be the number of CSI part 1 bits including CRC bits, and $N_{RE}$ may be the number of resource elements determined as $N_{RE}=M_{RB,f,c}^{PUSCH}(i)\cdot N_{symb,f,c}^{PUSCH}(i)$ excluding REs used for DM-RS transmission, where $N_{symb,f,c}^{PUSCH}(i)$ may be a number of symbols for PUSCH transmission period i on carrier f of serving cell c and C, $K_r$ may be predefined and/or semi-statistically configured. The wireless device may set $\beta_{offset}^{PUSCH}=1$ based on the PUSCH transmission comprising UL-SCH data, and the wireless device may set $\beta_{offset}^{PUSCH}=\beta_{offset}^{CSI,1}$ based on the PUSCH transmission comprising CSI and not including UL-SCH data.

For the PUSCH power control adjustment state for carrier f of serving cell c in PUSCH transmission period i, $\delta_{PUSCH,f,c}(i-K_{PUSCH},l)$ may be a correction value, also may be referred to as a TPC command, and may be via a PDCCH transmission with one or more DCI formats (e.g., DCI format 0_0 or DCI format 0_1) that may schedule the PUSCH transmission period i on carrier f of serving cell c or jointly coded with other TPC commands in a PDCCH transmission with one or more DCI formats (e.g., DCI format 2_2) having CRC parity bits scrambled by a RNTI (e.g., TPC-PUSCH-RNTI) that may be received by the wireless device prior to the PUSCH transmission.

The PUSCH power control adjustment state for carrier f of serving cell c in PUSCH transmission period i, $f_{f,c}(i,l)=f_{f,c}(i-1,l)+\delta_{PUSCH,f,c}(i-K_{PUSCH},l)$ may be the PUSCH power control adjustment state for carrier f of serving cell c and PUSCH transmission period i based on accumulation being enabled based on an accumulation enabled parameter (e.g., Accumulation-enabled) provided by (e.g., configured by, indicated by, etc.) higher layers, for example, in which $l\in\{1, 2\}$ if the wireless device is configured with a parameter (e.g., a higher layer parameter such as, for example, e.g., num-pusch-pcadjustment-states) otherwise, l=1. The value of $l\in\{1, 2\}$ may be provided (e.g., configured, indicated, etc.) to the wireless device by a parameter (e.g., a higher layer parameter such as, for example, e.g., PUSCH-closed-loop-index), for example, based on a PUSCH (re)transmission corresponding to a grant-free configuration or semi-persistent grant. The wireless device may set $\delta_{PUSCH,f,c}(i-K_{PUSCH},l)=0$ dB if the wireless device may not detect a TPC command for carrier f of serving cell c. If the PUSCH transmission is in response to a PDCCH decoding with a DCI format (e.g., DCI format 0_0, DCI format 0_1, or DCI format 2_2) having CRC parity bits scrambled by a RNTI (e.g., TPC-PUSCH-RNTI) the respective $\delta_{PUSCH,f,c}$ accumulated values may be predefined. A wireless device may map a field (e.g., a TPC Command Field) (e.g., in DCI format 0_0, DCI format 0_1, DCI format 2_2, or DCI format 2_3) having CRC parity bits scrambled by a RNTI (e.g., TPC-PUSCH-RNTI or TPC-SRS-RNTI) to absolute and accumulated $\delta_{PUSCH,c}$ values. $f_{f,c}(0,1)$ may be a first value after reset of accumulation. Positive TPC commands for carrier f of serving cell c may not be accumulated, for example, based on the wireless device having reached $P_{CMAX,f,c}(i)$ for carrier f of serving cell c. Negative TPC commands for carrier f of serving cell c may not be accumulated, for example, based on a wireless device having reached minimum power for carrier f of serving cell c. A wireless device may reset accumulation for carrier f of serving cell c, after $P_{O\_UE\_PUSCH,f,c}(j)$ value is changed by higher layers, and/or if $\alpha_{f,c}(j)$ value is changed by higher layers.

For the PUSCH power control adjustment state for carrier f of serving cell c in PUSCH transmission period i, $f_{f,c}(i,l)=\delta_{PUSCH,f,c}(i-K_{PUSCH},l)$ may be the PUSCH power control adjustment state for carrier f of serving cell c and PUSCH transmission period i based on accumulation not being enabled based on the accumulation enabled parameter (e.g., Accumulation-enabled) provided by (e.g., configured by, indicated by, etc.) higher layers. If the PUSCH transmission is in response to a PDCCH decoding with a DCI format (e.g., DCI format 0_0, DCI format 0_1, or DCI format 2_2) having CRC parity bits scrambled by a RNTI (e.g., TPC-PUSCH-RNTI) the respective or absolute values may be predefined. The wireless device may set $f_{f,c}(i,l)=f_{f,c}(i-1,l)$ for a PUSCH transmission period where the wireless device may not detect a DCI format (e.g., DCI format 0_0, DCI format 0_1, or DCI format 2_2), having CRC parity bits scrambled by a RNTI (e.g., TPC-PUSCH-RNTI) for carrier f of serving cell c.

For the PUSCH power control adjustment state for carrier f of serving cell c in PUSCH transmission period i, and/or for both types of $f_{f,c}(*)$ (accumulation or current absolute) the first value may be set as follows: If $P_{O\_UE\_PUSCH,f,c}(j)$ value is changed by higher layers and/or serving cell c is the primary cell or, if $P_{O\_UE\_PUSCH,f,c}(j)$ value is received by higher layers and serving cell c is a secondary cell, the wireless device may set $f_{f,c}(0,l)=0$. Else, if the wireless device receives the RAR message for carrier f of serving cell c, the wireless device may set $f_{f,c}(0,l)=\Delta P_{rampup,f,c}+\delta_{msg2,f,c}$, in which $\delta_{msg2,f,c}$ may be the TPC command indicated in the RAR corresponding to the RAP sent (e.g., transmitted) for carrier f in the serving cell c, and $$\Delta P_{rampup,f,c} = \min\left[\left\{\max\left(0, P_{CMAX,f,c} - \left(\begin{array}{c} 10\log_{10}(2^\mu \cdot M_{RB,f,c}^{PUSCH}(0)) + \\ P_{O\_PUSCH,f,c}(0) + \alpha_{f,c}(0) \cdot PL_c + \\ \Delta_{TF,f,c}(0) + \delta_{msg2,f,c} \end{array}\right)\right)\right\}, \Delta P_{rampuprequested,c}\right]$$

and $\Delta P_{rampuprequested,f,c}$ may be provided by (e.g., configured by, indicated by, etc.) higher layers and corresponds to the total power ramp-up requested by higher layers from the first to the last RAP for carrier f in the serving cell c, $M_{RB,f,c}^{PUSCH}(0)$ may be the bandwidth of the PUSCH resource assignment expressed in number of resource blocks for the first PUSCH transmission in carrier f of serving cell c, and $\Delta_{TF,f,c}(o)$ may be the power adjustment of first PUSCH transmission in carrier f of serving cell c. A power ramping counter may not be shared between preamble and TB transmission in a two-step RA procedure. $\Delta P_{rampuprequested,f,c}$ may correspond to the total power ramp-up requested from the first to the last TB transmissions for carrier f in the serving cell c. A single power ramping counter may be shared between preamble and TB transmission in a two-step RA procedure. $\Delta P_{rampuprequested,f,c}$ may correspond to the total power ramp-up requested from the first to the last random access preamble for carrier f in the serving cell c.

A wireless device may receive, from a base station, a message comprising configuration parameters of two step RA procedure. The configuration parameters may indicate: random access channel of a preamble transmission of the two step RA procedure; and/or uplink resources of a data transmission of the two step RA procedure. The wireless device may perform: a first listen-before-talk of the preamble transmission; and a second listen-before-talk of the data transmission. The wireless device may send (e.g., transmit) data via the uplink resources in response to: a failure of the first listen-before-talk; and/or a success of the second listen-before-talk. The wireless device may monitor or continue to monitor corresponding RAR during a RAR window. The wireless device may increment a power ramping counter of the preamble transmission, for example, based on or in response to receiving no corresponding RAR.

The wireless device may start to monitor or continue to monitor a downlink control channel for the corresponding RAR, for example, based on or in response to sending (e.g., transmitting) the data.

PRACH and PUSCH transmissions may form a part of a two step RA procedure. PRACH and PUSCH transmissions may be two-step Msg 1 (or MsgA) transmission of a two step RA procedure. RAR monitoring may start or continue after or in response to a PUSCH transmission. This procedure may comprise different behavior from a four step RA procedure, as RAR monitoring may occur between PRACH and PUSCH.

Figure 42:
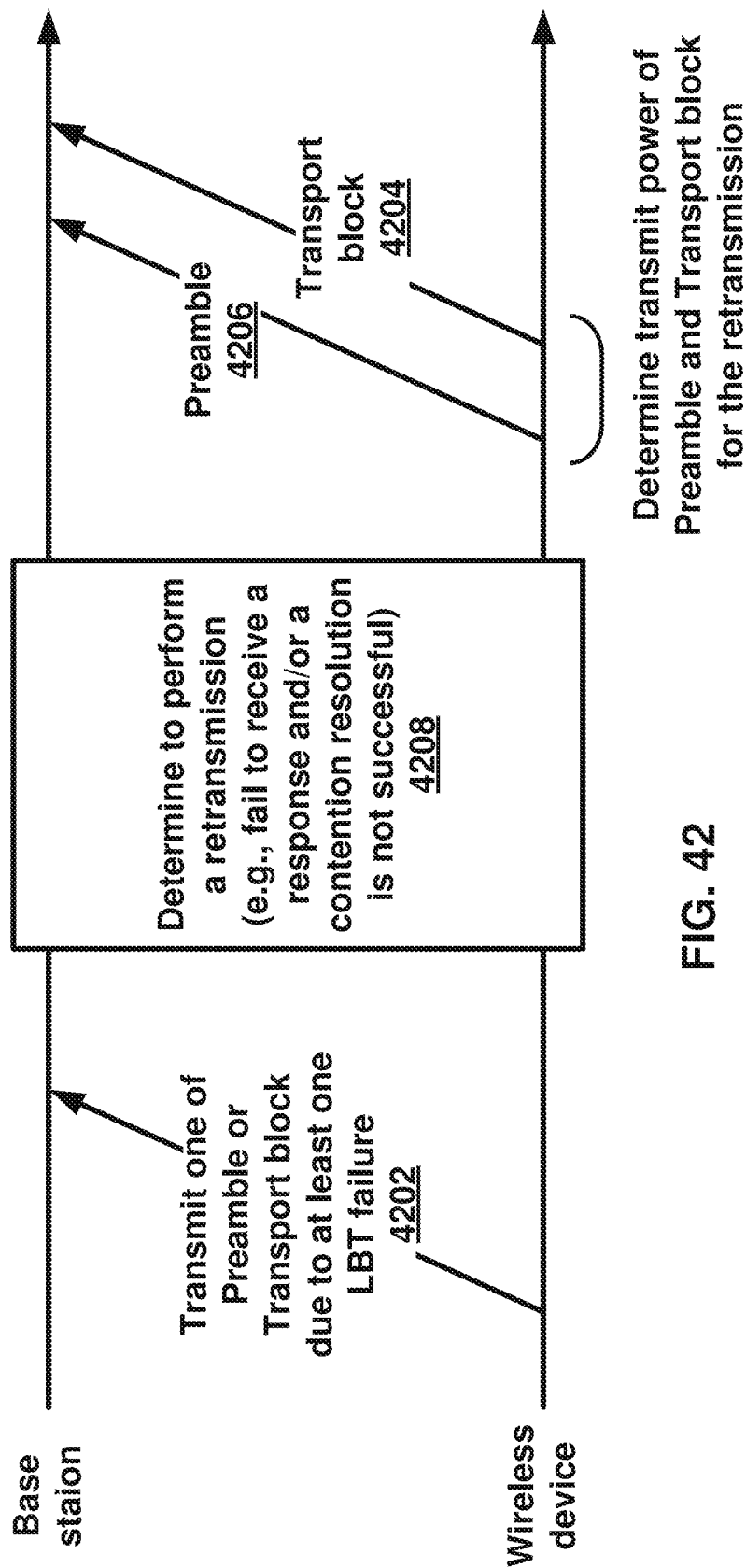
FIG. 42 shows an example of a retransmission procedure using power adjustment.

FIG. 42 shows an example of a retransmission procedure with power adjustment for a two step RA procedure. The procedure may be performed by devices such as those shown in FIG. 1, including wireless devices 110 and base stations 120. A wireless device may send (e.g., transmit) 4202 at least one of a preamble or TB(s) on an unlicensed band or spectrum, for example, as a two step Msg 1 (e.g., MsgA) during a two step RA procedure and/or based on a failure of at least one LBT procedure. The wireless device may determine 4208 to perform a retransmission, for example, based on a failure to receive a response and/or a contention resolution that was not successful. The retransmission may comprise at least one of a preamble transmission (e.g., preamble 4206 in FIG. 42) and/or a TB transmission (e.g., transport block 4204 in FIG. 42), for example, as two step Msg 1 (e.g., MsgA) retransmission. The wireless device may determine a power (e.g., transmission power) of the preamble and/or TB for the retransmission. The wireless device may send (e.g., transmit) the preamble 4206 and/or the TB 4204 with the determined power (e.g., transmission power) as a retransmission procedure. The wireless device may perform a retransmission of a preamble and/or a TB. The preambles 4206 and 4202 may not be the same. TBs 4202 and 4204 may not be the same.

An efficiency of an RA procedure operating in an unlicensed band may degrade with LBT failure, which may cause a latency, delay, and/or performance degradation of wireless communications. A failure of an LBT during a RA procedure may lead to a long delay for a wireless device to receive an UL grant and/or TA value from a base station. This delay may result in a call drop and/or traffic congestion. A failure of an LBT procedure in a RA procedure for an SCell addition may lead a cell congestion (e.g., load imbalancing) on one or more existing cells (e.g., if an SCell may not take over traffic from the one or more existing cells in time). Increasing power to a retransmission during a RA procedure may reduce a number of retransmissions, for example, such that after a medium may become available, the transmission may be less likely to fail because of interference, low power, and/or other problems related to transmission power. This increased power may allow a trade of a decrease in latency, delay, call drop, and/or performance degradation for a temporary increase in power consumption for a retransmission.

The wireless device may perform one of a preamble transmission and TB transmission, for example, in a two step RA procedure, as a two step Msg 1 (e.g., Msg A) transmission, based on one or more LBT procedures performed for the preamble transmission and/or based on the TB transmission. A wireless device may send (e.g., transmit) a preamble without sending (e.g., transmitting) one or more TBs, for example, based on an LBT procedure indicating that a channel (e.g., PUSCH) for transmission of the one or more TBs is occupied (e.g., busy). A wireless device may send (e.g., transmit) one or more TBs without sending (e.g., transmitting) a preamble, for example, based on an LBT procedure indicating that a channel (e.g., PRACH) for transmission of the preamble is occupied (e.g., busy). The wireless device may determine a retransmission of a preamble and/or one or more TBs, for example, based on no reception of RAR and/or a contention resolution being failed.

Problems in determining a transmission or retransmission power may occur, for example, if power is based on a quantity of transmissions or retransmissions (e.g., a quantity of preamble transmissions) performed. The quantity of retransmissions may comprise a quantity of retransmissions (e.g., actual transmissions) performed, for example, based on an LBT procedure indicating a channel that is non-occupied (e.g., idle). The quantity of retransmissions may not comprise a quantity of retransmission attempts (e.g., a quantity of LBT procedures performed). The wireless device may increment one of preamble transmission or retransmission power and TB transmission or retransmission power, for example, based on no reception of RAR, a contention resolution being failed, and/or one of preamble transmission or retransmission and TB transmission or retransmission (e.g., as described above) being performed. Incrementing one of a preamble transmission or retransmission power and TB transmission or retransmission power may change one of PRACH and/or PUSCH uplink coverage and may result in a PRACH and/or PUSCH coverage mismatch problem. One of PRACH and/or PUSCH coverages may be adjusted properly, for example, based on the incremented power but the other is not. One of PRACH and/or PUSCH coverages may become too large (e.g., overshooting) but the other does not, for example, based on the incremented transmission power on one of preamble and TB transmissions. A base station may receive one of a preamble and a TB (e.g., which transmitted with an incremented transmission power) and may fail to receive the other of the preamble and the TB (e.g., which transmitted without an incremented transmission power). The base station may send, to a wireless device, an indication to fallback to a four step RA procedure and/or retransmission of the other (e.g., which may be transmitted without an incremented transmission power) that the base station couldn't receive. This procedure may cause a latency, delay, and/or performance degradation of wireless communications.

Carefully determining one or more parameter values (e.g., a ramping power counter value) for a retransmission based on a type of RA procedure (e.g., a two step RA procedure) and/or a result (success or failure) of LBT procedure may reduce latency, delay, and/or performance degradation of wireless communications. A power control mechanism for preamble and TB transmission or retransmission of a two step RA procedure may be used. The wireless device may determine a retransmission power of a first transmission (e.g., preamble transmission) based on a second transmission (e.g., TB transmission), for example, based on or in response to the first transmission not being performed in a previous transmission. The first transmission may not be performed in a previous transmission, for example, based on one or more LBT procedures indicating a first channel for the first transmission being busy and a second channel for the second transmission being idle. The wireless device may determine a transmission or retransmission power of the first transmission properly, for example, by referring the second transmission. This may result in a two step RA procedure complete without an unnecessary one or more retransmissions. These procedures may improve a latency, delay, and/or battery power consumption.

The wireless device may determine a PRACH retransmission power and/or a PUSCH retransmission power, for example, based on a previous transmission power of a PRACH transmission and/or a PUSCH transmission. The change in power from a prior transmission, or prior retransmission, to a next transmission may be referred to as power ramping. A power ramping counter may count a quantity of times a transmission and/or retransmission has failed. A power ramping step may provide (e.g., configure, indicate, etc.) a value for which power may be changed. Power ramping of a transmission may be determined by multiplying a power ramping counter value by a power ramping step value. Power ramping of a transmission may be determined (e.g., calculated) by multiplying a power ramping counter value by a power ramping step value and adding a base value.

A wireless device may have separate power ramping counters and/or power ramping step values for a preamble transmission (e.g., which may be sent via a PRACH resource) and a TB transmission (e.g., which may be sent via a PUSCH resource). The wireless device may use a power ramping counter and/or power ramping step value associated with the resource (e.g., PRACH resource or PUSCH resource) that failed and/or succeeded. A wireless device may use one power ramping counter and/or one power ramping step value; one power ramping counter and/or multiple power ramping step values, multiple power ramping counters and/or one power ramping step value; multiple power ramping counters and/or multiple power ramping step values, or other configurations.

FIG. 43A and FIG. 43B show examples of retransmission procedures with power adjustment and one or more LBT procedures. The retransmission procedures may be performed by devices such as those shown in FIG. 1, including wireless devices 110 and base stations 120. FIG. 43A shows a retransmission procedure using power ramping based on a successful preamble transmission. An LBT procedure before a PRACH resource 4302 may be successful (e.g., the medium is determined to be clear) and the wireless device may send a preamble via the PRACH resource 4302. An LBT procedure before a PUSCH resource 4304 may be unsuccessful (e.g., the medium is determined to be busy) and the wireless device may send no transmission via the PUSCH resource 4304.

The wireless device may determine 4310 to perform a retransmission, for example, based on a failure to receive a response and/or a contention resolution that was not successful. The preamble transmission via the PRACH resource 4302 may be used to determine powers for transmission (e.g., transmit powers) of the preamble and TB for the retransmission. A power ramping step value and/or a power ramping counter associated with the PRACH resource 4302 may be used in determining (e.g., calculating) the powers for transmission (e.g., transmit powers) of the retransmissions of the preamble and TB.

The wireless device may perform a first LBT procedure before a retransmission of the preamble via a PRACH resource 4306. The wireless device may send, or may not send, the retransmission of the preamble via a PRACH resource 4306, for example, based on the outcome of the first LBT procedure. The wireless device may perform a second LBT procedure before a retransmission of the TB via a PUSCH resource 4308. The wireless device may send, or may not send, the retransmission of the TB via the PUSCH resource 4308, for example, based on the outcome of the second LBT procedure.

FIG. 43B shows a retransmission procedure using power ramping based on a successful TB transmission. The retransmission procedures may be performed by devices such as those shown in FIG. 1, including wireless devices 110 and base stations 120. An LBT procedure before the PRACH resource 4312 may be unsuccessful (e.g., the medium is determined to be busy) and the wireless device may send no transmission(s) via the PRACH resource 4312. An LBT procedure before the PUSCH resource 4314 may be successful (e.g., the medium is determined to be clear) and the wireless device may send a TB transmission via the PUSCH resource 4314.

The wireless device may determine 4320 to perform a retransmission, for example, based on a failure to receive a response and/or a contention resolution that was not successful. The TB transmission via the PUSCH resource 4314 may be used to determine powers of transmissions (e.g., transmission powers) of the preamble and TB for the retransmission. A power ramping step value and/or a power ramping counter associated with the PUSCH resource 4314 may be used in determining the powers of transmissions (e.g., transmission powers) of the retransmission of the preamble and TB.

The wireless device may perform a first LBT procedure before a retransmission of the preamble via a PRACH resource 4316. The wireless device may send, or may not send, the retransmission of the preamble via a PRACH resource 4316, for example, based on the outcome of the first LBT procedure. The wireless device may perform a second LBT procedure before a retransmission of the TB via a PUSCH resource 4318. The wireless device may send, or may not send, the retransmission of the TB via the PUSCH resource 4318, for example, based on the outcome of the second LBT procedure.

Figure 44:
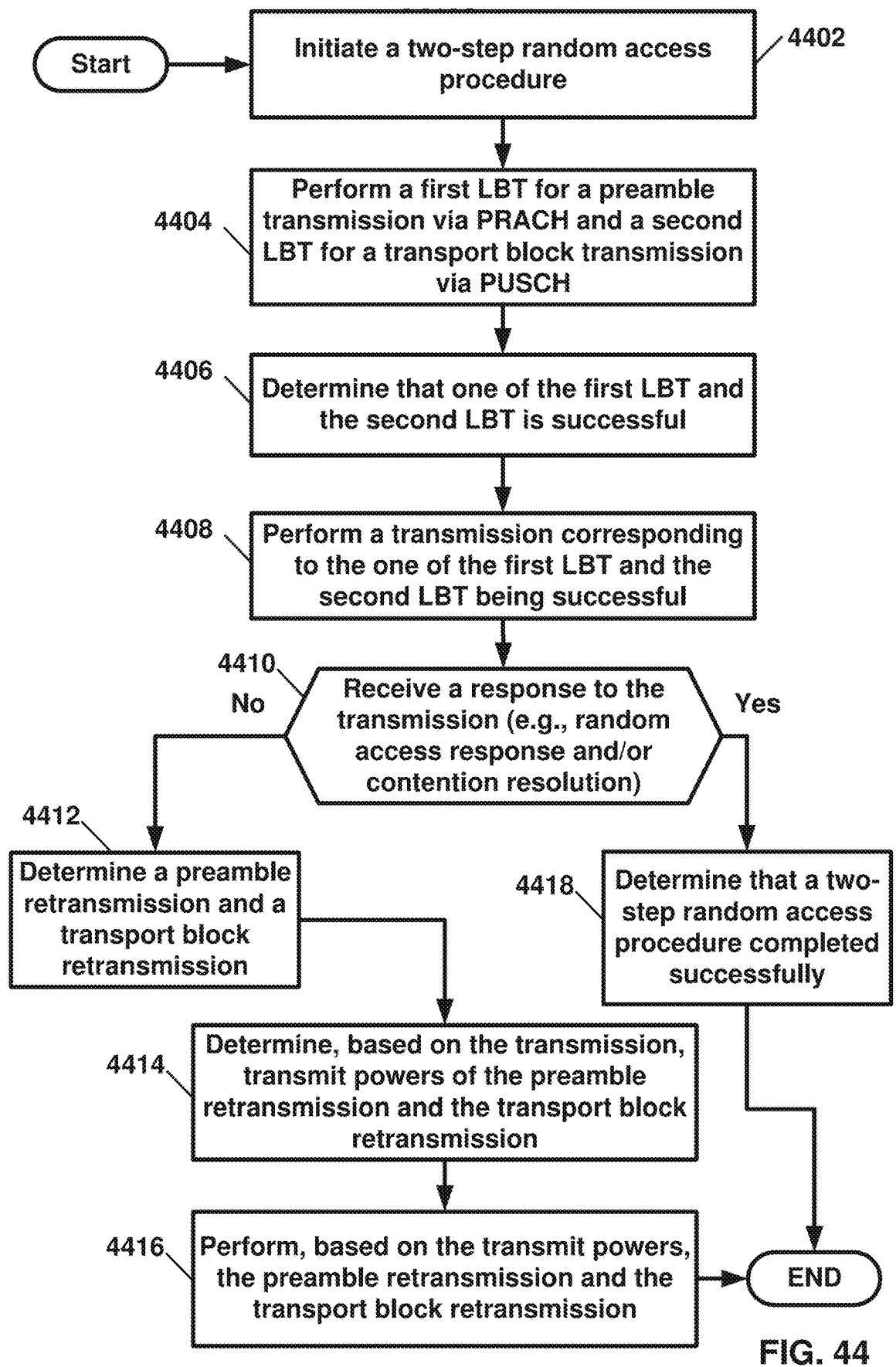
FIG. 44 shows an example of a RA retransmission procedure using power adjustment.

FIG. 44 shows an example of a performing an RA retransmission procedure with power adjustment. The retransmission procedures may be performed by devices such as those shown in FIG. 1, including wireless devices 110 and base stations 120. At step 4402, a wireless device may initiate a two-step RA procedure. At step 4404, the wireless device may perform a first LBT for a preamble transmission via a PRACH resource and a second LBT for a TB transmission via a PUSCH resource. At step 4406, the wireless device may determine that one of the first LBT and the second LBT is successful. At step 4408, the wireless device may perform a transmission corresponding to the one of the first LBT and the second LBT being successful. At step 4410, the wireless device may not receive a response to the transmission (e.g., RAR and/or contention resolution). At step 4412, the wireless device may determine a preamble retransmission and a TB retransmission. At step 4414, the wireless device may determine, based on the transmission, powers of transmissions (e.g., transmission powers) of the preamble retransmission and the TB retransmission. At step 4416, the wireless device may perform, based on the powers of transmissions (e.g., transmission powers), the preamble retransmission and the TB retransmission.

Alternatively, at step 4410, a wireless device may receive a response to the transmission (e.g., RAR and/or contention resolution). At step 4418, a wireless device may determine that a two-step RA procedure completed successfully.

Figure 45:
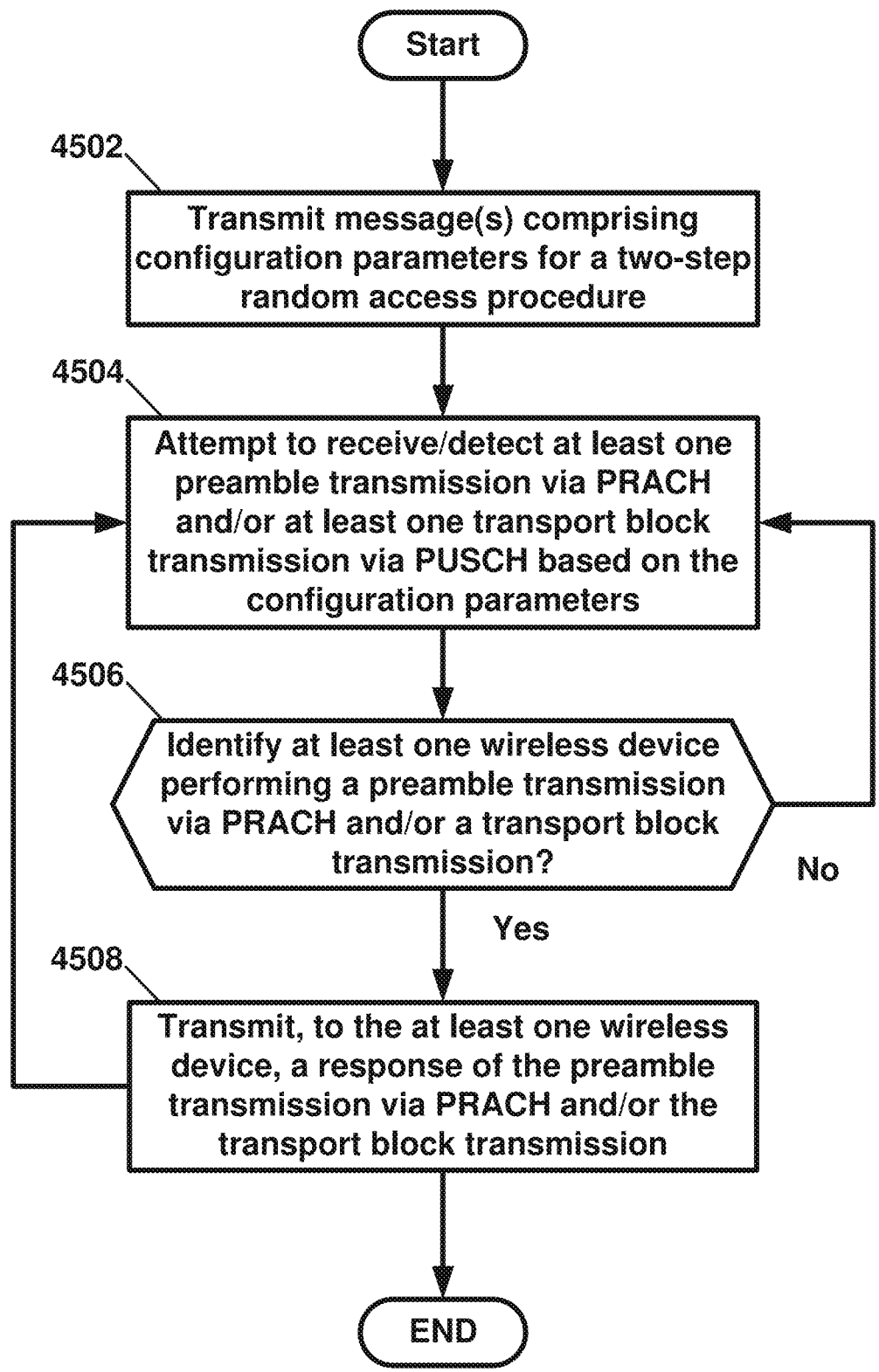
FIG. 45 shows an example of a RA retransmission procedure using power adjustment.

FIG. 45 shows an example of responding to a RA retransmission procedure with power adjustment. The retransmission procedures may be performed by devices such as those shown in FIG. 1, including wireless devices 110 and base stations 120. At step 4502, a base station may send (e.g., transmit) message(s) comprising configuration parameters for a two-step RA procedure. At step 4504, the base station may attempt to receive and/or detect at least one preamble transmission via a PRACH resource and/or at least one TB transmission via a PUSCH resource based on the configuration parameters. At step 4506, the base station may identify at least one wireless device performing a preamble transmission via a PRACH resource and/or a TB transmission via an uplink resource. At step 4508, the base station may send (e.g., transmit), to the at least one wireless device, a response of the preamble transmission resource, and/or the TB transmission.

Alternatively, at step 4506, a base station may not identify at least one wireless device performing a preamble transmission via PRACH and/or a TB transmission. The base station may then return step 4504 and proceed as described.

A wireless device may perform a method comprising multiple operations. The wireless device may perform a first listen-before-talk (LBT) procedure for transmission of a first preamble of a first message. The wireless device may perform a second LBT procedure for transmission of the first transport block of the first message. The wireless device may, based on a clear channel indicated by the second LBT procedure and a busy channel indicated by the first LBT procedure, transmit, using a first transmission power, the first transport block. The wireless device may determine that a response to the first transport block has not been received by a time duration. The wireless device may ramp, based on the first transmission power, a second transmission power and a third transmission power. The wireless device may transmit, using the ramped second transmission power, the first preamble. The wireless device may transmit, using the ramped third transmission power, a second transport block.

The wireless device may also perform one or more additional operations or include additional elements in conjunction with the described method. The wireless device may receive configuration parameters indicating a first random access channel for transmission of the first preamble, and a first uplink channel for transmission of the first transport block. The wireless device may monitor, during a time duration, a downlink control channel for the response. The wireless device may determine, based on not receiving the response during the time duration, an unsuccessfully completed reception. The wireless device may ramp the second transmission power based on the unsuccessfully completed reception. The wireless device may determine that a contention resolution is unsuccessfully completed based on not receiving the response. The wireless device may ramp the second transmission power based on the unsuccessfully completed contention resolution. The wireless device may increment, based on transmitting the first transport block, a first counter for transmission of the first preamble. The wireless device may increment, based on transmitting the first transport block, a second counter for transmission of the second transport block. The wireless device may ramp the second transmission power and the third transmission power based on a prior transmission power.

A wireless device may perform a method comprising multiple operations. The wireless device may determine, based on a first listen-before-talk (LBT) procedure for transmission of a first preamble of a first message, a busy channel indication. The wireless device may determine, based on a second LBT procedure and for transmission of a first transport block of the first message, a clear channel indication. The wireless device may transmit, based on the clear channel indication, and using a first transmission power, the first transport block. The wireless device may determine that a time duration for receiving a response to the first transport block expired The wireless device may ramp, based on the first transmission power, a second retransmission power and a third retransmission power. The wireless device may transmit, using the ramped second transmission power, the first preamble. The wireless device may transmit, using the ramped third transmission power, a second transport block.

The wireless device may also perform one or more additional operations or include additional elements in conjunction with the described method. The wireless device may receive configuration parameters indicating a first random access channel for transmission of the first preamble; and a first uplink channel for transmission of the first transport block. The wireless device may monitor, during a time duration, a downlink control channel for the response. The wireless device may determine, based on not receiving the response during the time duration, an unsuccessfully completed reception. The wireless device may ramp, based on the unsuccessfully completed reception, the second transmission power. The wireless device may determine, based on not receiving the response, that a contention resolution is unsuccessfully completed. The wireless device may ramp, based on the unsuccessfully completed contention resolution, the second transmission power. The wireless device may increment, based on transmitting the first transport block, a counter for transmission of the first preamble. The wireless device may increment, based on transmitting the first transport block, a counter for transmission of the second transport block. The wireless device may ramp, based on a power ramping step value and a counter value associated with the transmission of the first transport block, the second transmission power and the third transmission power.

A wireless device may perform a method comprising multiple operations. The wireless device may determine, by a wireless device, that a first random access channel resource, for transmission of a first preamble of a first message, is occupied. The wireless device may transmit, via a first uplink channel resource sensed as clear, a first transport block of the first message. The wireless device may determine a power ramping counter value based on transmitting the first transport block and on not receiving a response to the first transport block. The wireless device may transmit, via a second random access channel resource, and using a transmission power based on the power ramping counter value, the first preamble. The wireless device may transmit, via a second uplink channel resource, a second transport block.

The wireless device may also perform one or more additional operations or include additional elements in conjunction with the described method. The wireless device may receive, by the wireless device, a message comprising random access configuration parameters that indicate the first random access channel resource for transmission of the first preamble; and the first uplink channel resource for transmission of the first transport block. The wireless device may monitor, during a time interval, a downlink control channel for the response. The wireless device may determine, based on not receiving the response during the time interval, an unsuccessfully completed reception. The wireless device may ramp, based on the unsuccessfully completed reception, the transmission power. The wireless device may determine, completed based on not receiving the response, that a contention resolution is unsuccessfully. The wireless device may ramp, based on the unsuccessfully completed contention resolution, the transmission power. The wireless device may increment, based on transmission of the first preamble via the second random access channel resource, a second power ramping counter value. The wireless device may base transmission power on a power ramping step value and the power ramping counter value.

A wireless device may perform a method comprising multiple operations. The wireless device may perform a first listen-before-talk (LBT) for transmission of a first preamble of a first message, the first message comprising the first preamble and a first transport block. The wireless device may perform a second LBT for transmission of the transport block. The wireless device may determine that one of the first LBT or the second LBT indicates a clear channel. The wireless device may determine that another one of the first LBT or the second LBT indicates a busy channel. The wireless device may transmit one of the first preamble or the transport block. The wireless device may determine a retransmission of the first message based on not receiving a response to the transmitting. The wireless device may ramp a first transmission power and a second transmission power. The wireless device may transmit a second preamble using the ramped first transmission power; and a second transport block using the ramped second transmission power.

The wireless device may also perform one or more additional operations or include additional elements in conjunction with the described method. The one of the first preamble or the transport block may be the first preamble. The wireless device may transmit the preamble via the clear channel. The one of the first preamble or the transport block may be the transport block. The wireless device may transmit the transport block via the clear channel. The wireless device may receive configuration parameters indicating a first random access channel for transmission of the first preamble; and a first uplink channel for transmission of the transport block. The clear channel may be the first random access channel. The one of the first preamble or the transport block may be the first preamble. The clear channel may be the first uplink channel. The one of the first preamble or the transport block may the transport block. The wireless device may monitor a downlink control channel for the response during a time interval starting in response to transmitting the one of the first preamble or the transport block. The wireless device may determine that reception of the response unsuccessfully completed based on not receiving the response. The wireless device may ramp in response to determining that reception of the response unsuccessfully completed. The wireless device may determine that a contention resolution is unsuccessfully completed based on not receiving the response. The wireless device may ramp in response to the contention resolution. The wireless device may perform a third LBT for transmission of the second preamble indicating a clear channel. The wireless device may perform a fourth LBT for transmission of the transport block indicating a clear channel. The wireless device may increment a first counter for transmission of the second preamble in response to transmitting the one of the first preamble or the transport block. The wireless device may increment a second counter for transmission of the transport block in response to transmitting the one of the first preamble or the transport block. The wireless device may increment a third counter for transmission of the second preamble and the transport block in response to transmitting the one of the first preamble or the transport block.

Systems, devices and media may be configured with the methods. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to receive the second preamble. A computer-readable medium may store instructions that, when executed, cause performance of the described method, additional operations and/or include the additional elements.

Figure 46:
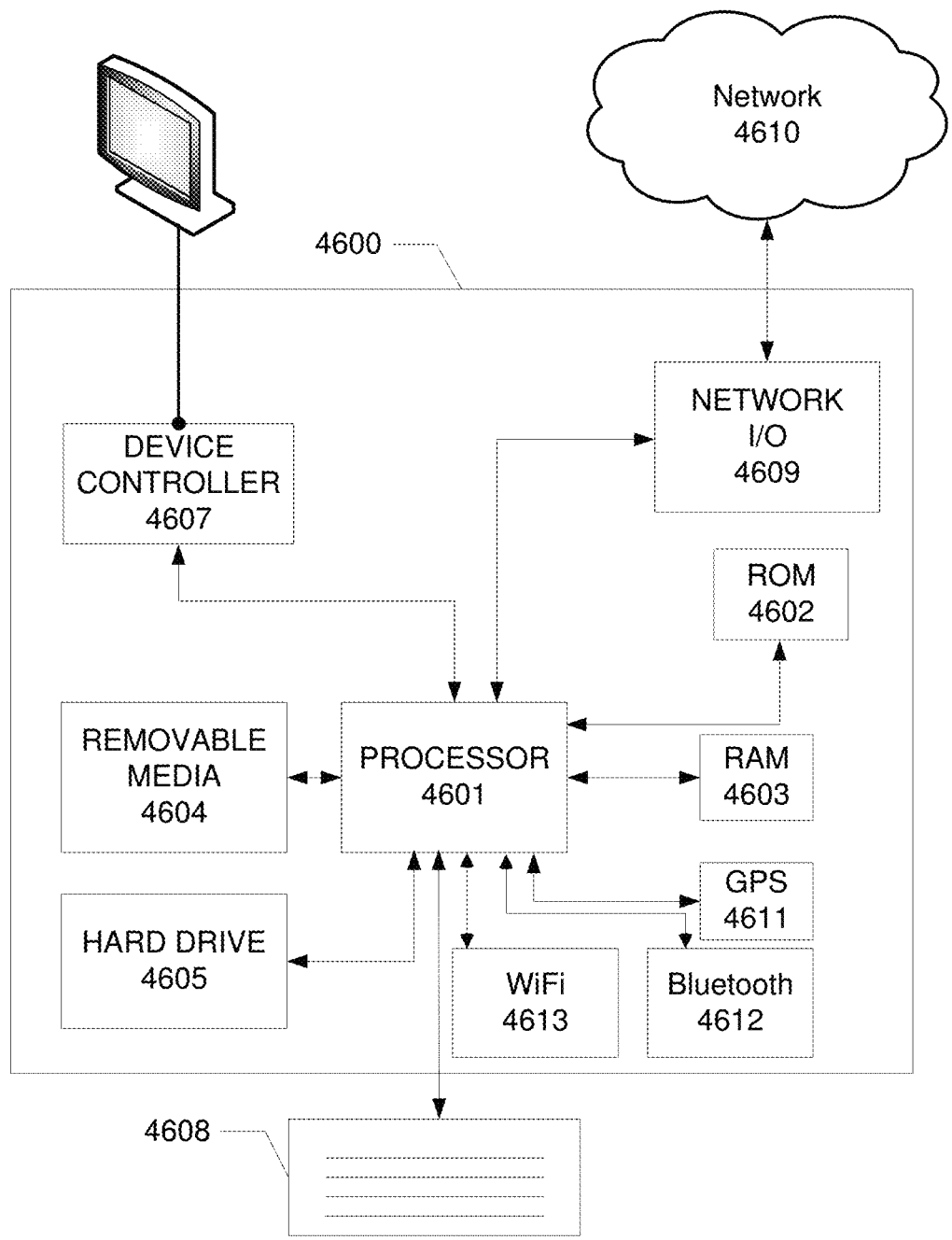
FIG. 46 shows example elements of a computing device that may be used to implement any of the various devices described herein.

FIG. 46 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 4600 may include one or more processors 4601, which may execute instructions stored in the random access memory (RAM) 4603, the removable media 4604 (such as a Universal Serial Bus (USB) drive, compact disk (CD) or digital versatile disk (DVD), or floppy disk drive), or any other desired storage medium. Instructions may also be stored in an attached (or internal) hard drive 4605. The computing device 4600 may also include a security processor (not shown), which may execute instructions of one or more computer programs to monitor the processes executing on the processor 4601 and any process that requests access to any hardware and/or software components of the computing device 4600 (e.g., ROM 4602, RAM 4603, the removable media 4604, the hard drive 4605, the device controller 4607, a network interface 4609, a GPS 4611, a Bluetooth interface 4612, a WiFi interface 4613, etc.). The computing device 4600 may include one or more output devices, such as the display 4606 (e.g., a screen, a display device, a monitor, a television, etc.), and may include one or more output device controllers 4607, such as a video processor. There may also be one or more user input devices 4608, such as a remote control, keyboard, mouse, touch screen, microphone, etc. The computing device 4600 may also include one or more network interfaces, such as a network interface 4609, which may be a wired interface, a wireless interface, or a combination of the two. The network interface 4609 may provide an interface for the computing device 4600 to communicate with a network 4610 (e.g., a RAN, or any other network). The network interface 4609 may include a modem (e.g., a cable modem), and the external network 4610 may include communication links, an external network, an in-home network, a provider's wireless, coaxial, fiber, or hybrid fiber/coaxial distribution system (e.g., a DOCSIS network), or any other desired network. Additionally, the computing device 4600 may include a location-detecting device, such as a global positioning system (GPS) microprocessor 4611, which may be configured to receive and process global positioning signals and determine, with possible assistance from an external server and antenna, a geographic position of the computing device 4600.

The example in FIG. 46 may be a hardware configuration, although the components shown may be implemented as software as well. Modifications may be made to add, remove, combine, divide, etc. components of the computing device 4600 as desired. Additionally, the components may be implemented using basic computing devices and components, and the same components (e.g., processor 4601, ROM storage 4602, display 4606, etc.) may be used to implement any of the other computing devices and components described herein. For example, the various components described herein may be implemented using computing devices having components such as a processor executing computer-executable instructions stored on a computer-readable medium, as shown in FIG. 46. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
performing, by a wireless device, a first channel access procedure for transmission of a first preamble of a message;
performing a second channel access procedure for transmission of a first transport block of the message;
transmitting, based on the first channel access procedure indicating a clear channel and the second channel access procedure indicating a busy channel, a portion of the message comprising the first preamble;
based on an expiration of a time duration for reception of the message:
transmitting, using a first ramped transmission power, a second preamble; and
transmitting, using a second ramped transmission power, the first transport block.

2. The method of claim 1, further comprising:
adjusting, based on the transmitting the portion of the message comprising the first preamble, a power ramping counter; and
determining, based on the adjusted power ramping counter, the first ramped transmission power and the second ramped transmission power.

3. The method of claim 1, further comprising receiving configuration parameters that indicate:
a first random access channel for transmission of the first preamble, and
a first uplink channel for transmission of the first transport block.

4. The method of claim 1, further comprising:
monitoring, during the time duration, a downlink control channel for an indication of reception of the message; and
determining, based on the expiration of the time duration for reception of the message, an unsuccessfully completed reception,
wherein the transmitting the second preamble and the transmitting the first transport block are further based on the unsuccessfully completed reception.

5. The method of claim 1, further comprising:
determining, based on the expiration of the time duration for reception of the message, that a contention resolution is unsuccessfully completed, wherein the transmitting the second preamble and the transmitting the first transport block are further based on the unsuccessfully completed contention resolution.

6. The method of claim 1, further comprising:
determining, based on a transmission power of the transmitting the portion of the message comprising the first preamble, the first ramped transmission power and the second ramped transmission power.

7. The method of claim 1, wherein the first channel access procedure comprises a first listen-before-talk (LBT) procedure and the second channel access procedure comprises a second LBT procedure.

8. The method of claim 1, further comprising:
determining, based on the expiration of the time duration for reception of the message, the first ramped transmission power and the second ramped transmission power.

9. The method of claim 1, further comprising:
based on the clear channel indicated by the first channel access procedure, determining to transmit the first preamble of the message; and
based on the busy channel indicated by the second channel access procedure, determining not to transmit the first transport block of the message.

10. The method of claim 1, wherein the expiration of the time duration for reception of the message comprises not receiving a response to the message by the time duration.

11. A wireless device comprising:
one or more processors; and
memory storing instructions that, when executed by the one or more processors, cause configure the wireless device to:
perform a first channel access procedure for transmission of a first preamble of a message;
perform a second channel access procedure for transmission of a first transport block of the message;
transmit, based on the first channel access procedure indicating a clear channel and the second channel access procedure indicating a busy channel, a portion of the message comprising the first preamble;
based on an expiration of a time duration for reception of the message:
transmit, using a first ramped transmission power, a second preamble; and
transmit, using a second ramped transmission power, the first transport block.

12. The wireless device of claim 11, wherein the instructions, when executed by the one or more processors, configure the wireless device to:
adjust, based on transmitting the portion of the message comprising the first preamble, a power ramping counter; and
determine, based on the adjusted power ramping counter, the first ramped transmission power and the second ramped transmission power.

13. The wireless device of claim 11, wherein the instructions, when executed by the one or more processors, configure the wireless device to:
receive configuration parameters that indicate:
a first random access channel for transmission of the first preamble, and
a first uplink channel for transmission of the first transport block.

14. The wireless device of claim 11, wherein the instructions, when executed by the one or more processors, configure the wireless device to:
monitor, during the time duration, a downlink control channel for an indication of reception of the message;
determine, based on the expiration of the time duration for reception of the message, an unsuccessfully completed reception;
transmit the second preamble by transmitting, based on the unsuccessfully completed reception, the second preamble using the first ramped transmission power; and
transmit the first transport block by transmitting, based on the unsuccessfully completed reception, the first transport block using the second ramped transmission power.

15. The wireless device of claim 11, wherein the instructions, when executed by the one or more processors, configure cause the wireless device to:
determine, based on the expiration of the time duration for reception of the message, that a contention resolution is unsuccessfully completed;
transmit the second preamble by transmitting, based on the unsuccessfully completed contention resolution, the second preamble using the first ramped transmission power; and
transmit the first transport block by transmitting, based on the unsuccessfully completed contention resolution, the first transport block using the second ramped transmission power.

16. The wireless device of claim 11, wherein the instructions, when executed by the one or more processors, configure the wireless device to:
determine, based on a transmission power of transmitting the portion of the message comprising the first preamble, the first ramped transmission power and the second ramped transmission power.

17. The wireless device of claim 11, wherein the first channel access procedure comprises a first listen-before-talk (LBT) procedure and the second channel access procedure comprises a second LBT procedure.

18. The wireless device of claim 11, wherein the instructions, when executed by the one or more processors, configure the wireless device to:
determine, based on the expiration of the time duration for reception of the message, the first ramped transmission power and the second ramped transmission power.

19. The wireless device of claim 11, wherein the instructions, when executed by the one or more processors, configure the wireless device to:
based on the clear channel indicated by the first channel access procedure, determine to transmit the first preamble of the message; and
based on the busy channel indicated by the second channel access procedure, determine not to transmit the first transport block of the message.

20. The wireless device of claim 11, wherein the expiration of the time duration for reception of the message comprises not receiving a response to the message by the time duration.

21. A non-transitory computer-readable medium storing instructions that, when executed, cause a wireless device to:
perform a first channel access procedure for transmission of a first preamble of a message;
perform a second channel access procedure for transmission of a first transport block of the message;
transmit, based on the first channel access procedure indicating a clear channel and the second channel access procedure indicating a busy channel, a portion of the message comprising the first preamble;
based on an expiration of a time duration for reception of the message:
transmit, using a first ramped transmission power, a second preamble; and
transmit, using a second ramped transmission power, the first transport block.

22. The non-transitory computer-readable medium of claim 21, wherein the instructions, when executed, cause the wireless device to:
adjust, based on transmitting the portion of the message comprising the first preamble, a power ramping counter; and
determine, based on the adjusted power ramping counter, the first ramped transmission power and the second ramped transmission power.

23. The non-transitory computer-readable medium of claim 21, wherein the instructions, when executed, cause the wireless device to receive configuration parameters that indicate:
a first random access channel for transmission of the first preamble, and
a first uplink channel for transmission of the first transport block.

24. The non-transitory computer-readable medium of claim 21, wherein the instructions, when executed, cause the wireless device to:

monitor, during the time duration, a downlink control channel for an indication of reception of the message;

determine, based on the expiration of the time duration for reception of the message, an unsuccessfully completed reception;

transmit the second preamble by transmitting, based on the unsuccessfully completed reception, the second preamble using the first ramped transmission power; and transmit the first transport block by transmitting, based on the unsuccessfully completed reception, the first transport block using the second ramped transmission power.

25. The non-transitory computer-readable medium of claim 21, wherein the instructions, when executed, cause the wireless device to:

determine, based on the expiration of the time duration for reception of the message, that a contention resolution is unsuccessfully completed;

transmit the second preamble by transmitting, based on the unsuccessfully completed contention resolution, the second preamble using the first ramped transmission power; and transmit the first transport block by transmitting, based on the unsuccessfully completed contention resolution, the first transport block using the second ramped transmission power.

26. The non-transitory computer-readable medium of claim 21, wherein the instructions, when executed, cause the wireless device to:

determine, based on a transmission power of transmitting the portion of the message comprising the first preamble, the first ramped transmission power and the second ramped transmission power.

27. The non-transitory computer-readable medium of claim 21, wherein the first channel access procedure comprises a first listen-before-talk (LBT) procedure and the second channel access procedure comprises a second LBT procedure.

28. The non-transitory computer-readable medium of claim 21, wherein the instructions, when executed, cause the wireless device to:

determine, based on the expiration of the time duration for reception of the message, the first ramped transmission power and the second ramped transmission power.

29. The non-transitory computer-readable medium of claim 21, wherein the instructions, when executed, cause the wireless device to:

based on the clear channel indicated by the first channel access procedure, determine to transmit the first preamble of the message; and based on the busy channel indicated by the second channel access procedure, determine not to transmit the first transport block of the message.

30. The non-transitory computer-readable medium of claim 21, wherein the expiration of the time duration for reception of the message comprises not receiving a response to the message by the time duration.

* * * * *